US008302085B2

(12) United States Patent
Schellekens

(10) Patent No.: US 8,302,085 B2
(45) Date of Patent: Oct. 30, 2012

(54) METHOD FOR DEVELOPING SOFTWARE CODE AND ESTIMATING PROCESSOR EXECUTION TIME

(75) Inventor: Michel Schellekens, County Cork (IE)

(73) Assignee: University College Cork—National University of Ireland, Cork (IE)

( * ) Notice: Subject to any disclaimer, the term of this patent is extended or adjusted under 35 U.S.C. 154(b) by 1393 days.

(21) Appl. No.: 11/883,938

(22) PCT Filed: Feb. 16, 2006

(86) PCT No.: PCT/IE2006/000012
§ 371 (c)(1),
(2), (4) Date: Aug. 8, 2007

(87) PCT Pub. No.: WO2006/087693
PCT Pub. Date: Aug. 24, 2006

(65) Prior Publication Data
US 2008/0295071 A1    Nov. 27, 2008

Related U.S. Application Data

(60) Provisional application No. 60/653,092, filed on Feb. 16, 2005.

(30) Foreign Application Priority Data

Feb. 28, 2005   (IE) ...................................... 2005/0104

(51) Int. Cl.
G06F 9/44        (2006.01)
G06F 9/45        (2006.01)

(52) U.S. Cl. .......................... 717/143; 717/131; 717/154

(58) Field of Classification Search ........................ None
See application file for complete search history.

(56) References Cited

U.S. PATENT DOCUMENTS 6,102,968 A * 8/2000 Colby et al. ................... 717/126

OTHER PUBLICATIONS

XP009085469, Flajolet et al., Theoretical Computer Science 79 (1991) 37-109 North-Holland, Automatic average-case analysis of algorithms.

(Continued)

*Primary Examiner* — Chuck Kendall
(74) *Attorney, Agent, or Firm* — Jacobson Holman PLLC

(57) ABSTRACT

A method (1) of developing software code for executing on a target digital processor uses a memory in which it maintains data structures having elements, each of the elements storing data which is represented by a label, and at least some links between the elements are created by the target processor as data is being processed. The method comprises the step (3) of writing the software code with data structure processing operations which comply with random structure preservation rules (2). A static analysis timing tool automatically parses (4) the code developed in step (2) to identify all operations. It determines (7) from an operation and all possible input states for that operation an average time value for execution of the operation by a target data processor, and stores (9) said average time value. It determines (8) from the operation and all possible input states all possible output states for that operation. The timing tool repeats steps (7 and 8) for each next operation, using the all possible output states determined in step (8) as all possible input states. It generates (11) an output total average time which is a sum of all average times stored in step (9).

21 Claims, 12 Drawing Sheets

OTHER PUBLICATIONS

XP-002438293, Schellekens et al., 1-4, *ACETT*, a Linearly-Compositional Programming Language (semi-) automated Average-Case analysis.

XP-002438294, Schellekens, Oct. 6, 2004, p. 1, Compositional Average Time Analysis: Towards a Calculus for Software Timing.

XP-002438295, Centre for Efficiency-Oriented Languages "Towards improved software timing", Feb. 12, 2005, 1-3.

XP-002438296, Heyer, Mar. 2005, i-iv, 1-60, Randomness Preserving Deletions on Special Binary Search Trees.

XP-002438297, Boubekeur et al., 1-8, Modular Average-Case Timing in Real-Time Languages, Jun. 8, 2012.

XP-002438298, Boubekeur et al., 1-6,Towards Modular Average-Case Timing in Real-Time Languages: An Application to Real-Time Java.

XP-002438352, Creed et al., Mar. 23, 2004, 1-87, Generating Functions and their application to the Average-Case Time Complexity Analysis of Algorithms.

XP-002438353, Centre for Efficiency-Oriented Languages "Towards improved software timing", Feb. 12, 2005, 1-3.

(MR98), Martinez et al., Jan. 31, 1997, 1-32, Ranomdomized Binary Search Trees.

Davey et al., 1-21, Introduction to Lattices and Order.

Motwani et al., 197-201, Randomized Algorithms.

* cited by examiner

Product Examples

Take a discrete finite partial order $(X, \sqsubseteq)$ over the set $\{x_1, x_2, x_3, x_4, x_5, x_6\}$ with the following labeling:

```
 7      6      5      4      3      2
 o      o      o      o      o      o
x₁     x₂     x₃     x₄     x₅     x₆
```

Take two subsets of $X$, set $A$ and set $B$, where $A = \{x_1, x_2\}$ and $B = \{x_3, x_4, x_5\}$.

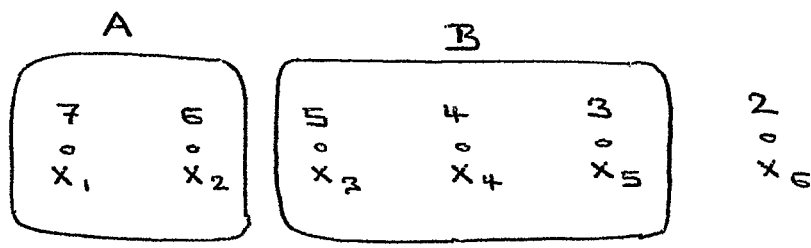

Perform a product between $A$ and $B$, letting $A$ be the set producted above $B$.

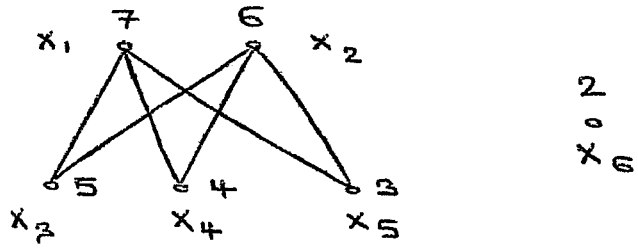

Take the result of this product, itself the set $B \otimes A$ and the set $C$, where $C = \{x_6\}$.

Fig. 3(a)

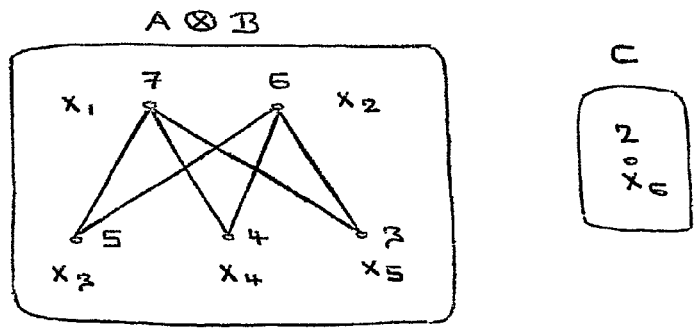

Perform a product between $C$ and $B \otimes A$ letting $C$ be the set producted above $A \otimes B$.

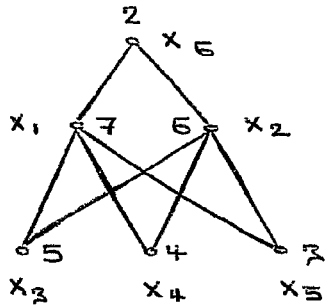

The product of $C$ over $B \otimes A$ in this labeling will *Push-Down* the label value of $C$ to an appropriate position.

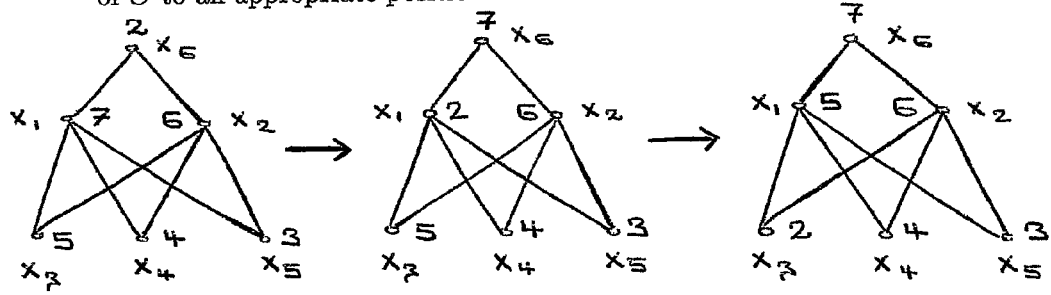

Now take two subsets of $X$, set $E$ and set $D$, where $E = \{x_3\}$ and $D = \{x_4\}$.

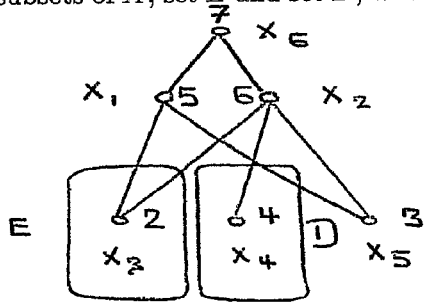

Perform a product between $E$ and $D$, letting $E$ be the set producted above $D$.

Fig. 3 (b)

The product of *E* over *D* in this labeling will *Push-Up* the label value of *D* to an appropriate position.

Notice how a product between E and F, where $F = \{x_5\}$, fails because all of product's requirements of E and F *are not* satisfied, i.e $\lfloor F \rfloor \neq \lfloor E \rfloor$

Split Examples

Take a discrete finite partial order $(X, \sqsubseteq)$ over the set $\{x_1, x_2, x_3, x_4, x_5, x_6\}$ with the following labeling:

Perform a split on $x_3$.

Perform a split on $x_4$.

Take a finite partial order $(X, \sqsubseteq)$ over the set $\{x_1, x_2, x_3, x_4, x_5, x_6\}$ with the following ordering and labeling:

Perform a split on $x_5$.

Projection Examples

Take a finite partial order $(X, \sqsubseteq)$ over the set $\{x_1, x_2, x_3, x_4, x_5\}$ with the following ordering and labeling:

Take the isolated subset $I$ and do a projection of $I$ to get $J$.

Take the isolated subset $I$, where $I$ is the entire partial order $X$, and do a projection of $I$ to get $J$.

Delete Over Entire Partial Order Examples

Take a finite partial order $(X, \sqsubseteq)$ over the set $\{x_1, x_2, x_3, x_4, x_5, x_6, x_7\}$ with the following ordering and labeling:

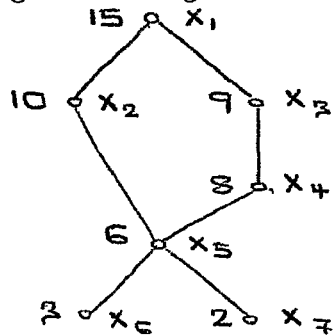

Perform a delete on the third largest label in X. In this instance, this is 9. 9 is attached to $x_3$, which is not a minimal or maximal element in X. Therefore, the label 9 is treated as smaller than any other label in $X$, represented here as $9^-$ and push down is now called on $9^-$.

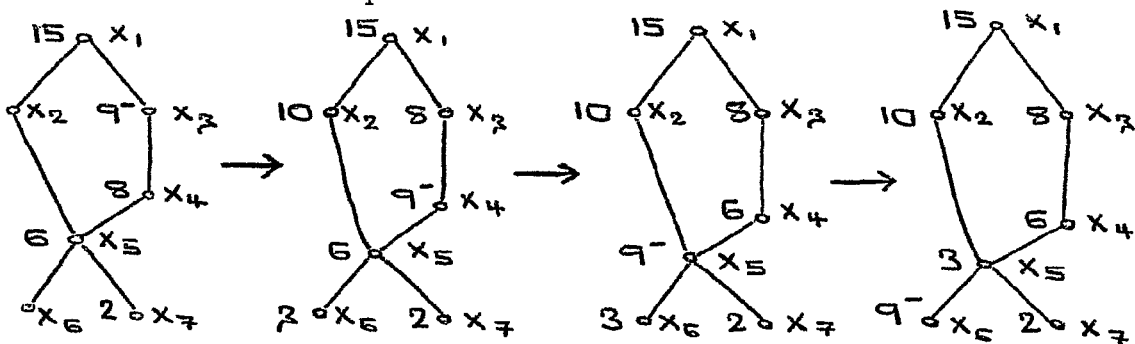

Now the element with the smallest label in $X$, $x_6$ with the label $9^-$ is deleted.

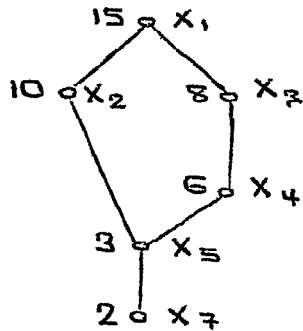

Take the original finite partial order $(X, \sqsubseteq)$ at the start of this example and instead of deleting the third largest label, delete the the largest. In this instance, this is 15. 15 is attached to $x_1$, which is a maximal element in X. Therefore it is simply removed.

Fig. 6(a)

Delete Over Strict Subset Of Partial Order Examples

Take a finite partial order $(X, \sqsubseteq)$ over the set $\{x_1, x_2, x_3, x_4, x_5, x_6, x_7\}$ with the following ordering and labeling:

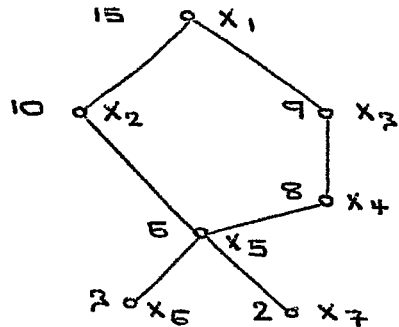

Take the subset $SI$ of $X$, which is strictly isolated, where $SI = \{x_1, x_2, x_3, x_4\}$.

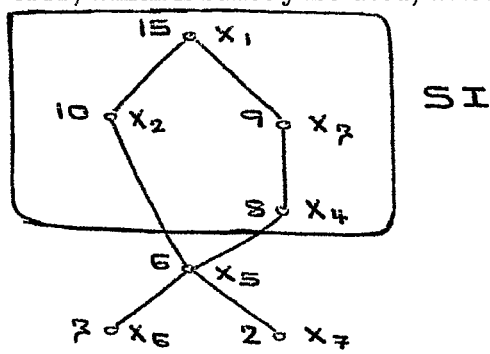

Perform a delete on the second smallest label in $SI$. In this instance, this is 9. 9 is attached to $x_3$, which is not a minimal or maximal element in $SI$. Therefore, the label 9 is treated as smaller than any other label in $SI$, represented here as $9^-$, and *Push-Down* is now called on $9^-$ until it is attached to a minimal element in $SI$. (The other solution would be to treat the label 9 as greater than any other label in $SI$, represented as $9^+$, and *Push-Up* is called on $9^+$ until it is attached to a maximal element in $SI$.)

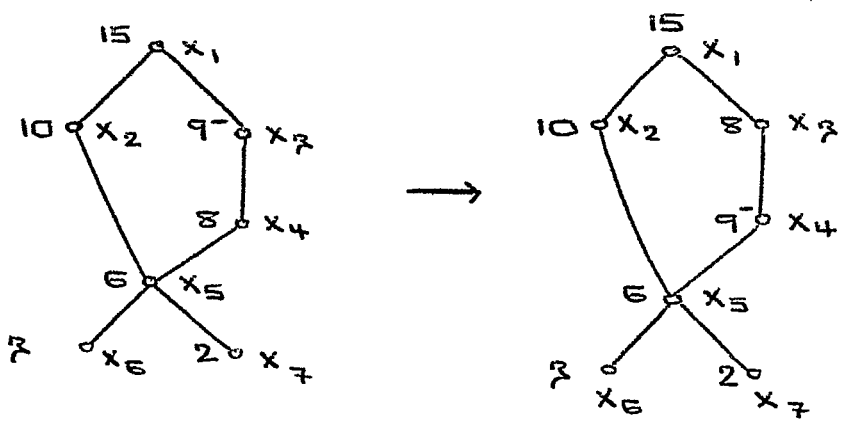

Fig. 7(a)

Now the element with the smallest label in $SI$, $x_4$ with the label $9^-$, is deleted. (Or the element with the largest label in $SI$ is deleted.)

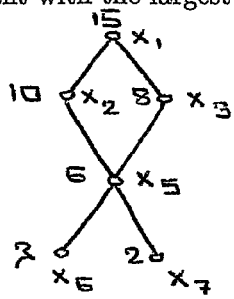

Take the original finite partial order $(X, \sqsubseteq)$ and the subset $SI$ at the start of this example and instead of deleting the second smallest label in $SI$, delete the smallest label in $SI$. In this instance, this is 8. 8 is attached to $x_4$, which is the minimal element in $SI$. Therefore it is simply removed.

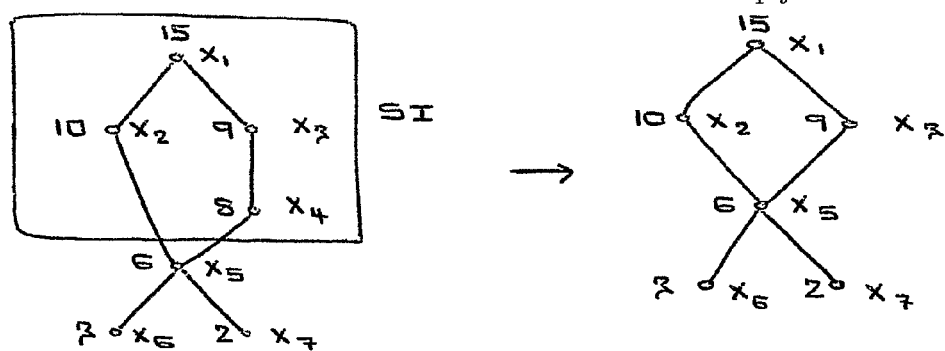

Fig. 7(b)

METHOD FOR DEVELOPING SOFTWARE CODE AND ESTIMATING PROCESSOR EXECUTION TIME

This is a national stage of PCT/IE06/000012 filed Feb. 16, 2006 and published in English, claiming benefit of U.S. provisional application number 60/653,092, filed Feb. 16, 2005.

FIELD OF THE INVENTION

The invention relates to control of data processor activity and utilization of memory.

Prior Art Discussion

There are many software code applications which involve a large number of comparison operations and for which it would be very advantageous to be able to predict the processor time to execute the code. This is particularly true for real time applications such as are flight control systems in aircraft or vehicle cruise control applications.

An example of the source code language which is used for development of comparison-based programs is Java Libraries™. It would be very advantageous to be able to accurately predict the processor execution time for a program developed in this language as execution of the programs involves many cycles of retrieving libraries and processing their data. If accurate prediction were possible, it would in turn be possible to correctly deploy the correct hardware resources for optimum trade-off between performance and cost, to plan the timing of interactions between tasks, and to allocate tasks to processing units.

At present, estimation of execution time is typically on the basis of Worst-Case Execution Time ("WCET"). The problems with this approach are that (a) they output a worst-case scenario so that there is typically over-specification of hardware resources, and (b) the processes for generating the WCET are not completely automated.

As software code is concerned with manipulating data, the state of the data is constantly changing during that program cycle. At any point in the program, depending on previous decisions made by the program, the data will be in a particular state. Current software technology does not provide for determining all possible states data can be in at any point of a program's execution.

The invention is directed towards providing a software development method for more accurate prediction of execution time and/or for more automated prediction of execution time. It is also directed towards the development of an associated static analysis timing tool to perform steps of the method. It is also directed towards providing a data processing system incorporating software developed in this method.

SUMMARY OF THE INVENTION

The invention provides a method of developing software code for executing on a target digital processor using a memory in which it maintains data structures having elements, each of the elements storing data which is represented by a label, and at least some links between the elements being created by the target processor as data is being processed, the method comprising the steps of:
(a) writing the software code with data structure processing operations which comply with random structure preservation rules, and (b) a static analysis timing tool automatically:
  (i) parsing the code developed in step (a) to identify all operations,
  (ii) determining from an operation and all possible input states for that operation an average time value for execution of the operation by a target data processor, and storing said average time value,
  (iii) determining from the operation and all possible input states all possible output states for that operation,
  (iv) repeating steps (ii) and (iii) for each next operation, using the all possible output states determined in step (iii) as all possible input states, and
  (v) generating an output total average time which is a sum of all average times stored in step (ii).

Other features of the invention are set out in the appended claims, the contents of which are incorporated herein by reference.

Detailed Description of the Invention

BRIEF DESCRIPTION OF THE DRAWINGS

The invention will be more clearly understood from the following description of some embodiments thereof, given by way of example only with reference to the accompanying drawings in which:

FIGS. 3 to 7 inclusive are illustrated examples of operations performed by developed code, in terms of the data structure processing.

DESCRIPTION OF THE EMBODIMENTS

The invention provides a method of developing software code, called MOQA (MOdular Quantitative Analysis), the method involving use of a static analysis timing tool called "Distri Track" after software development to automatically estimate the actual times for execution of the code. The MOQA method allows knowledge about the data to be derived by the Distri Track tool, i.e. all possible states of data are known at any given point of the code execution, and to keep track of all states during the execution.

This method of developing software code is based on a specific body of rules. Any programmer or automatic development tool which adheres to these rules of how data is created and manipulated can apply the Distri Track tool to statically analyze the code and determine the average-case time of the computation.

The Distri Track tool extracts the data distribution information at any given point of the computation. By using this information in a way described further below, the average number of basic steps a computation performs (for example, comparisons, swaps, and assignments) in order to manipulate the data can be calculated by Distri Track. This information in turn enables Distri Track to statically predict the average-case time of the computation, simply by multiplying the number of computation steps by the time it takes to compute such a step (or an upper bound of this time) on the particular processor used and summing up the resulting times.

Figure 1:
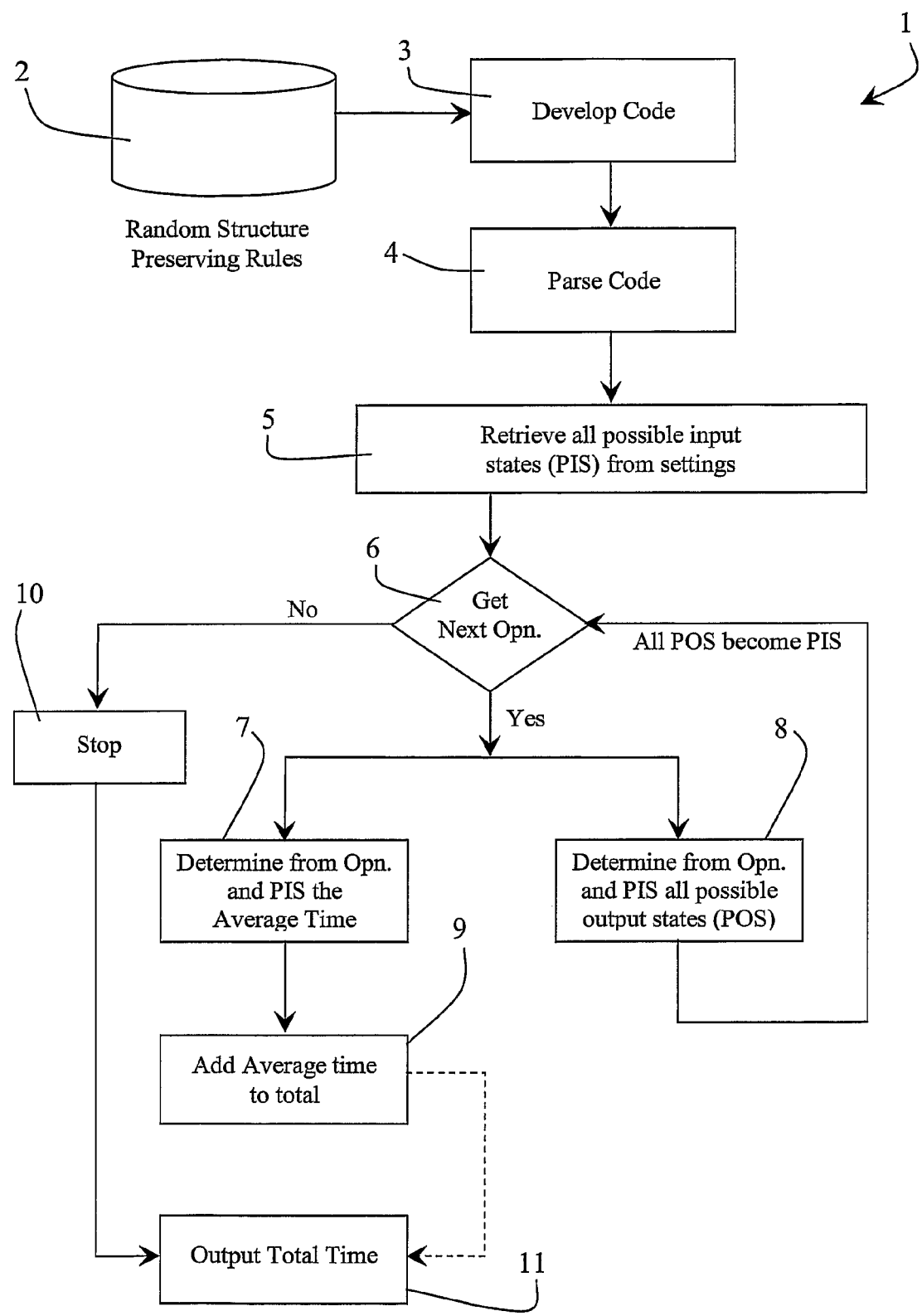
FIG. 1 is a flow diagram of the major steps of a method of the invention.

Referring to FIG. 1 the overall method is indicated by the numeral 1. It uses a base 2 of random structure preserving rules and it comprises steps 3 to 11 inclusive. In step 3 code is developed on the basis of the rules 2. This is achieved in a simple manner, by using only pre-defined data structure processing operations, defined in detail below (including the four main MOQA operations and any other MOQA operation satisfying the random sequence preservation criteria). In step 4 the static analysis tool parses the code, without any need to execute the code. In step 5 the tool retrieves from pre-stored settings all possible input states (PIS) for the operations from configuration settings. As indicated by the decision step 6, for the first operation the tool performs two logically parallel functions 7 and 8. Function 7 comprises determining from the current operation and all PIS the average time to perform the operation. Step 8 involves determining from the operation and all PIS all Possible Output States (POS) for the operation. Following step 7 the tool adds the average time to a counter in step 9. Following step 8 the POS are used as PIS for the next operation to perform steps 7, 8, and 9. There are iterations until there is no further operation and the iterations stop as indicated by step 10. At this stage the counter holds the total value of the average time for all operations and this is outputted in step 11 to provide the final output.

Any program operates on data structures. MOQA however states unambiguously how to create and manipulate a data structure in order to make average timing of this manipulation possible.

A memory data structure consists of data and how this data is related. How this relationship between data is represented varies from program to program. MOQA states a particular way to represent the relationship as defined below.

In more detail, a memory data structure is a finite collection of elements and the relations, or "links", between elements. The elements store the data. The MOQA methodology is used to form the relation or links between the elements. The elements are not individually uniquely addressed or labelled. Instead, the processor identifies the data stored in them and uses the data to relatively address the elements. A data value comprises a pair of an identifier or "label" and a piece of data. To take the example of a temperature measurement in a chemical process plant, there are many millions of such measurements and each one may comprise a pair of a temperature value (the label) and a piece of data comprising the location where the measurement was taken. Data will always have a label. The labels are always comparable with respect to a specific order, for example "less than or equal to". Therefore for any two labels one can always decide whether the first is less than the second or the second is less than the first, in that example. Sometimes it is not necessary to have a label if the data itself is directly comparable, e.g. sorting numbers. In these cases the label is also the data.

When a new link is created between two elements, the link has a direction. For example, for two elements x and y, it is indicated whether the link proceeds from x to y or from y to x. So the processor creates a relation from x to y or from y to x. In other words the data of x must be below the data of y or visa versa. However we now have to take into account that both pieces of data have labels. For instance if the data in x has the label which is the number 13445 and if the data in y has the label which is the number 12333 and if a link is created from x to y (indicating "x is below y") then the numbers need to be moved (in fact swapped in this case) along with their data, or solely the numbers in case of pointers linking labels and data, depending on the choice of implementation. This needs to happen for the end result to respect the less than or equal to ordering that is indicated by the link.

These labels may or may not be the same. However, for data storage in MOQA, the labels are required to be distinct from one another. If data is supplied that has a label already attached to another piece of data, it is a rule to ensure that this is dealt with appropriately to prevent duplicate labels being attached to stored data.

In this document the word "label" is synonymous with identifier. We now have described what a data structure is and how MOQA represents such a data structure.

The MOQA methodology is concerned with how the data structure is changed, how the links in the data structure are created and destroyed in an acceptable fashion, which leads to data being reorganized accordingly. The acceptable methods of changing a MOQA data structure include the four main MOQA operations below. A "delete" operation removes an element and its data with its associated label from (part of) a data structure. A "product" operation allows one to "merge" two (parts of) data structures into a larger data structure, made up of the original two data structures and reorganize their labels accordingly. A "split" operation allows one to link elements in (part of) a data structure in such a way that the elements are above or below a specified element, depending upon the identifiers/labels of the elements. A "projection" operation allows one to produce a copy of (part of) a given data structure.

The invention is not restricted to these operations, but these are core operations in this embodiment, for which the first three in particular are key to all data manipulation.

We also characterize precisely a condition which any operation (not only the above four, but any other operation complying with the rules) needs to posses in order for the data manipulation to achieve the desired effect. This is the condition of "random structure preservation". This enables one to test in practice whether the average-case time of the operation can be determined by the static analysis tool Distri Track. We also characterize the exact parts of data structures on which it is allowed to execute the MOQA operations, in particular the isolated subsets of a data structure and the strictly isolated subsets of a data structure. Depending on the operation in question (as described below), the operation can be applied to such a part (isolated or strictly isolated), whereupon the Distri Track tool can track the random sequences produced.

Distri Track obtains the average-case time by having the guarantee that every MOQA operation satisfies the condition of random structure preservation (and thus "random sequence preservation"). To explain these terms we first introduce the concept of a labeling and the related concept of a random structure.

Labeling

We know that each piece of data has a label. Gathering together all the labels of all the elements in a data structure is defined to be the particular labeling of that data structure. The labels respect the ordering of the data structure and a data structure can have more than one possible labeling that respects the ordering of that data structure.

For instance, we consider a data structure consisting of the V-shaped triple of elements, say an element x (at the apex of the V-shape) is linked to an element y and an element z. Say, for example, we use natural numbers as labels. Say we want to store the information consisting of the numbers 3, 6 and 9 in elements of the V-shape. Since the element x is linked to the elements y and z (in the direction from y to z) our rule on the ordering indicated by links specifies that labels stored in x must have a value less than the labels stored in y and in z. Hence the label stored in x must be the number 3. In the storage of the labels 6 and 9, we have freedom: we can store the label 6 in the cell y and 9 in the cell z, or 9 in the cell y and 6 in the cell z. This results in two possible labelings. The first which assigns the value 3 to x, the value 6 to y and the value 9 to z, and the second which assigns the value 3 to x, the value 9 to y and the value 6 to z.

Random Structure

The two labelings in the previous example form a "random structure" over the data structure consisting of the V-shape. In general, if a data structure has n elements and if we collect all possible labelings of these elements from a given fixed set of labels a(1), ... a(n), then this collection of labelings is called a random structure over the data structure.

Random Structure Preservation and Random Sequence Preservation

During a computation only one of these particular labelings will be in use at any given stage, so a MOQA operation will take a particular labeling over the elements of a data structure and return another data structure with a particular labeling for that structure.

If a MOQA operation does this individually for every labeling of a data structure, i.e. the entire random structure, we can guarantee that if we gather together the results, they can be grouped into one or more random structures, with no leftover individual resulting labelings that do not form a random structure. So if some data structure with a particular labeling is selected from the resulting output of a MOQA operation on a random structure, the random sequence preservation guarantee is that all the other possible labelings for that the data structure will also be among the output, when the operation has been applied to all possible input labelings from the random structure. The random structure is over a particular set of labels.

Random structure preservation means a random structure can be transformed into one or more new random structures, each of which could be copied a certain number of times. This final result is referred to as a random sequence.

Each random structure preserving operation can be extended to operate on random sequences as follows (we refer to this as "random sequence preservation"). Random sequence preservation then means that a random sequence is transformed into a new random sequence, by carrying out a random structure preserving operation on each of the random structures in the random sequence. Each random structure in the random sequence is replaced by the new random sequence produced from this random structure. Random structures are regarded as random sequences of size one.

Multiplicities

The output of a MOQA operation on a random structure can be grouped into one or more random structures. These one or more random structures are referred to as a random sequence of random structures. If some of the random structures in the random sequence are identical, they can be grouped together and represented by one copy of the random structure together with a number indicating how many times it appears in the random sequence. This number is called the multiplicity of the random structure (in the random sequence).

Therefore any random structure has a multiplicity of either one, it appears once in the random sequence, or more than one, it appears more than once in the random sequence.

Distri-Track

The Distri Track static analysis timing tool operates on program code developed via MOQA methodology. It initially takes a random structure, consisting of the initial input states for this program, and the first MOQA operation of the program on that random structure, and calculates the random sequence outputted by the operation. Subsequently, it takes that random sequence and the subsequent MOQA operation will now be performed on a random sequence. Distri Track takes each random structure in that random sequence and applies the principles of how a MOQA operation changes a structure to determine its associated random sequence. It then replaces the random structures in the original random sequence, with the new random sequences reflecting the consequences of the MOQA operation on the random structures in the original random sequence.

This cycle continues with this random sequence now being taken by Distri Track which applies the next MOQA operation and so on until program completion and the final random sequence is produced.

This process is illustrated in FIG. 1.

Computation of Output Random Sequence by Distri Track

Distri Track does not calculate the random sequence by calculating the result of the operation over all labelings of the original random structure. Rather it takes the original random structure and produces from its data structure a new sequence of data structures based on the rules for the MOQA operation. Moreover, Distri Track immediately computes the multiplicities involved in the output random sequence. The fact that this efficient approach works is guaranteed by the fact that the MOQA operations are random sequence preserving.

Figure 2:
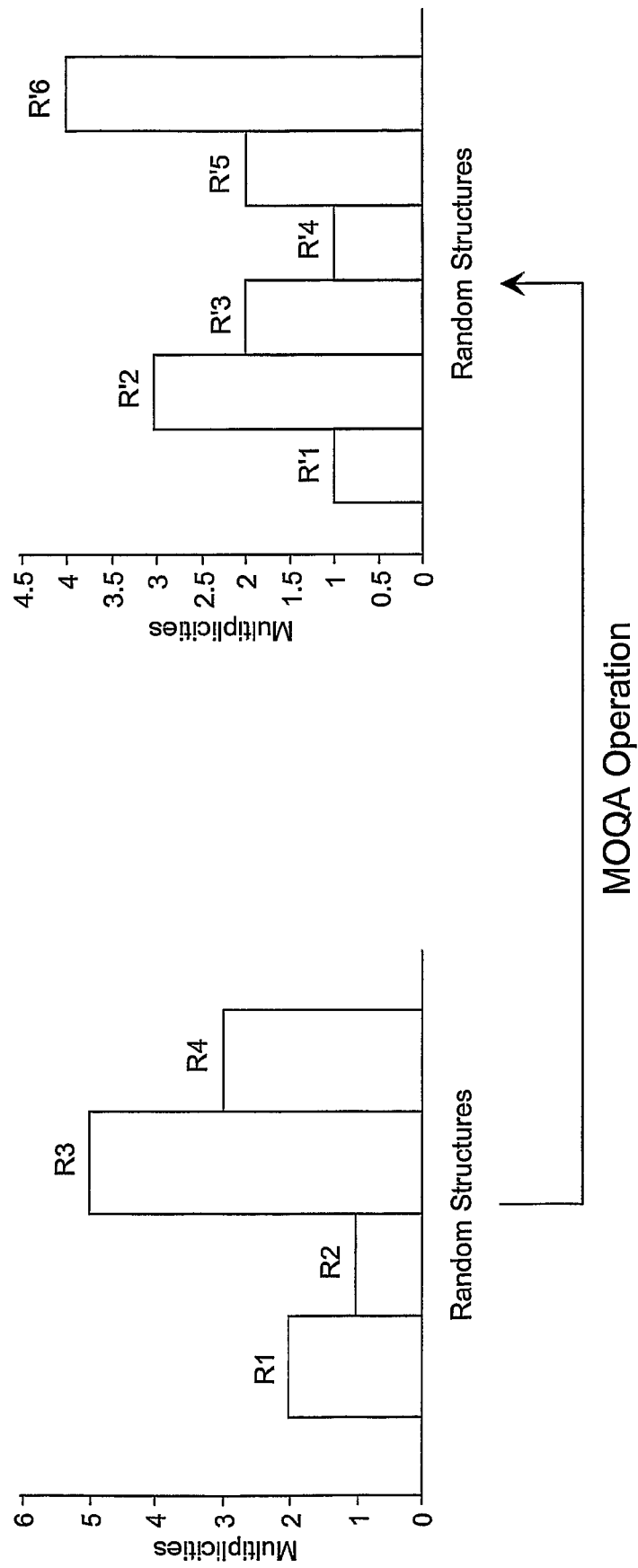
FIG. 2 is a plot of illustrating random structures before and after operations of software code developed according to the invention.

We describe the process of random sequence preservation in the context of Distri Track. A random sequence (R1, K1), ..., (Rn,Kn) is here represented as a distribution. The horizontal axis represents the random structures, while the vertical axis represents how many copies of the random structures are produced in the computation. FIG. 2 illustrates the new random structures produced via a MOQA operation and their respective multiplicities.

By calculating the random sequence produced by one operation, Distri Track can, along with complex mathematical formulas, determine the average-case time of this operation.

The compositionality of MOQA operations (guaranteed by their random sequence preservation) enables Distri Track to determine the average-time of any program written with the MOQA methodology.

Distri Track parses the code to follow the program flow in calculating the average-case time, whether sequential or branching. It is fully modular in that it determines the average-case time of each program (produced via MOQA methodology) in terms of linear combinations of the average-case times of the MOQA operations within that program.

If software has been timed and one alters a piece of the software, only this particular piece needs to be re-timed by Distri Track and recombined with the priorly obtained times (excluding the time of the replaced piece); since the tool is modular. None of the current timing tools is (functionally) modular in this sense.

For the example of a program composed of sequential MOQA operations, Distri Track will produce the average time of the program as the SUM of the average times of each individual operation. The fact that the average time of a program or collection of programs can be obtained in this way is only guaranteed for MOQA-produced software. This is a major improvement over the prior art, in which programmers had to carefully select a tiny but appropriate collection of inputs among millions, perhaps infinitely many possible inputs, itself a laborious (or impossible) task, with no guarantee of accuracy. In fact it was not possible to produce in this way the exact average-case time. As well as the selection process, they then had to carry out the actual testing procedure, which in many cases, due to the amount of memory required, resulted in only very small sample cases to be testable. Often these approximations could be close to the mark, but this is insufficient in the context of real-time analysis and critical applications, where precision needs to be guaranteed. In these cases trust had to be placed in the approximated average-case time as this was the only answer available.

The MOQA methodology radically transforms average case analysis. No longer are such laborious tests required. Distri Track produces the precise answer with one run of its program. There is no need to execute the software to be timed on any of its inputs, not even once. Distri Track hence saves hours in testing, increasing productivity of programmers, letting the focus be on accurate code as opposed to timing the code. Because the average-case time is known, code can be written which better optimizes the use of resources. So the exact average-case time allows time itself to be saved in code development and therefore this additional time can be allocated to the production of more efficient code.

Operation Description

Before describing the four key MOQA operations in more detail, the following are some useful definitions that will assist in characterizing these operations.

Data structures (finite collections of elements and their links) are formally characterized as finite partial orders. We do not insist that all links of a partial order are actually represented in an implementation of the data structure/stored in memory. In fact we allow the traditional approach for partial orders of minimizing the number of links through the so-called transitive reduction and the well-known partial order concept of Hasse Diagram.

We also characterize the exact parts of data structures on which it is allowed to execute the MOQA operations, in particular the isolated subsets of a data structure and the strictly isolated subsets of a data structure. Depending on the operation in question (as described below), the operation can be applied to such a part (isolated or strictly isolated), whereupon the Distri Track tool can track the random sequences produced.

The definitions are as follows:

Partial Order

A partial order is a binary relation between elements of a set, written as $(X, \sqsubseteq)$. It defines relationships between all of the elements of a set. These relationships must obey the following three axioms for some set X to be a partial order:
1. Reflexive if $a \leq a$ for all $a \in X$.
2. Antisymmetric if $a \leq b$ and $b \leq a \Rightarrow a = b$ for all $a, b \in X$
3. Transitive if $a \leq b$ and $b \leq c \Rightarrow a \leq C$ for all $a, b, c \in X$.

Maximal and Minimal Elements

A maximal element of a subset S of some partially ordered set is an element of S that is not smaller than any other element in S. Formally, given a subset S of a finite partial order $(X, \sqsubseteq)$, an element $m$ is a maximal element of S such that if $m \sqsubseteq s$ for any $s \in S$, then $s = m$ A minimal element of a subset S of some partially ordered set is an element of S that is not greater than any other element in S. Formally, given a subset S of a finite partial order $(X, \sqsubseteq)$, an element $m$ is a minimal element of S such that if $m \sqsubseteq s$ for any $s \in S$, then $s = m$ Path A path between two elements $x$ and $y$, where $x, y \in (X, \sqsubseteq)$, is a sequence $(x_1, \ldots, x_n)$, where $x_1 = x$ and $x_n = y$ and $\forall i \in \{1, \ldots n-1\}$. $x_i \sqsubseteq x_{i+1}$ or $x_i \sqsupseteq x_{i+1}$.

Component (Connected Component)

Two elements in a partial order $(X, \sqsubseteq)$ are connected if there exists a path from one to the other. A connected set is a set for which every two elements in the set are connected. A connected component in a partial order is a maximal connected subset in that partial order, which is non-empty.

Directly Related

Two elements $x$ and $y$, where $x, y \in (X, \sqsubseteq)$, are directly related if there is a path between x and y and the sequence $(x_1, \ldots, x_n)$ in the path from x to y, where $x_1 = x$ and $x_n = y$, contains exactly two elements, $n2$. In other words, two elements are directly related if the path between them is (x, y), with no intermediate elements.

Isolated Set

An isolated set in a partial order $(X, \sqsubseteq)$ is a subset of that partial order whose maximal and minimal elements are the only elements in the set that are directly related to any elements outside of the isolated set. Any element in an isolated set that is not a minimal or maximal element is only related to elements outside of the isolated set through transitivity, i.e. is not directly related to any element outside of the isolated set. As well as this, all maximal elements must have the same set of elements above them that they are directly related to and conversely, all minimal elements must have the same set of elements below them that they are directly related to.

Formally, given a finite partial order $(X, \sqsubseteq)$. A subset I of X is isolated iff it satisfies the following three conditions:

$$\lfloor I - m(I) \rfloor \subseteq I \text{ and } \lceil I - M(I) \rceil \subseteq I \qquad 1$$

$$\forall x, y \in m(I) \cdot \lfloor x \rfloor = \lfloor y \rfloor \qquad 2$$

$$\forall x, y \in M(I) \cdot \lceil x \rceil = \lceil y \rceil \qquad 3$$

Where $\lfloor x \rfloor$ is the set of all the elements below $x$ that $x$ is directly related to and $\lceil x \rceil$ is the set of all the elements above $x$ that $x$ is directly related to. M(I) is the maximal elements of I and $m(I)$ is the minimal elements of I.

Strictly Isolated Set

A strictly isolated set in a partial order $(X, \sqsubseteq)$ is an isolated subset of that partial order where every element, not just directly, related above a maximal element of the isolated subset and every element, not just directly, related below a minimal element of the isolated subset, along with every element within the isolated subset form the complete set of elements of a component within the partial order. Note that as it is an isolated subset every maximal element of the subset will have the same set of elements related above it and that every minimal element of the subset will have the same set of elements related below it.

Formally, it can be viewed in another way. In order to do this, the notion of a seam is useful.

A seam of a partial order $(X, \sqsubseteq)$ is a pair (A, B) of subsets A, B of X such that:
a) A is completely below B
b) $A \neq \emptyset$, $B \neq \emptyset$ and $(A \downarrow) \cup (B \uparrow)$=component of X A strictly isolated subset I of a partial order $(X, \sqsubseteq)$ is a subset for which:
a) $\lfloor m(I) \rfloor \neq \emptyset \Rightarrow (\lfloor m(I) \rfloor, m(I))$ forms a seam.
b) $\lceil M(I) \rceil \neq \emptyset \Rightarrow (M(I), \lceil M(I) \rceil)$ forms a seam.

Please note, throughout this document, that in any case where there seems to be a discrepancy between the explanation of a definition and its formal definition, then the formal definition is to be relied upon. An explanation is not necessarily mathematically equivalent to the formal definition but rather an aid to understanding. More formal definitions are provided in the section below entitled "More Detailed Technical Specification".

Random-Sequence-Preservation

Every random structure over a data structure has a data structure which is determined by a partial order and also has a set of labels. There are two sets involved: a set of elements of the partial order and a second set which is the partial order's set of labels. Both these sets are the same size. The partial order attaches these label values to its elements in an order-consistent way, consistent with the relationship between the elements. An order consistent way of attaching the labels is called a labeling. Often there is more than one order-consistent way that the labels can be arranged over the elements in the partial order. Gathering together all the possible ways a set of labels can be arranged over a partial order, i.e. gathering all labelings, is defined as a random structure. Formally, a random structure consists of all possible labelings of a partial order from a given set of labelings and where labels are used which are all distinct from one another and stem from a collection of labels which has same size as the number of elements in the random structure. A random-sequence-preserving operation transforms a random structure to a sequence of random structures. This random-sequence-preserving property of all MOQA operations is what enables average-case time to be automatically derived, from running MOQA code through a static analysis tool. To gain a clearer understanding of what it means for a MOQA operation to be random-sequence-preserving, we examine the general behaviour of any MOQA operation on a single labeling of a partial order.

Every MOQA operation takes a particular labeling over the elements of a finite partial order and the majority of MOQA operations then change the relationship between the elements of this partial order. As well as adjusting the relationships between the elements, the MOQA operation may also need to adjust the particular labeling of the original partial order, as the particular labeling may not be order-consistent over the new partial order, consistent with the updated relationships between the elements. The two definitions, Push-Down and Push-Up are MOQA-package operations used by MOQA operations to harmonize a particular labeling with its newly adjusted partial order.

A MOQA operation receives a partial order and a particular labeling over that partial order's elements. It then returns another partial order with a particular labeling over that partial order's elements. If a MOQA operation does this individually for every labeling of a partial order, i.e. the random structure, we can guarantee that if we gather together the results, they can be grouped into one or more random structures, with no leftover individual results that do not form a random structure. So if some partial order with a particular labeling is selected from the resulting output of a MOQA operation on a random structure, the random-sequence-preservation guarantee is that all the other possible labelings for that partial order will also be among the output. Consider a partial order with all six distinct possible labelings, i.e. a random structure. The same MOQA operation is executed on each labeling of this partial order and the six end results are distinct labelings over some new partial order. Due to the operation being random-sequence-preserving, these six labelings will also be all the possible labelings of the resulting partial order. While this situation can occur it is generally too simplistic to be realistic. The overall result can easily contain a number of different partial orders for which all possible labelings are generated. In the example of the initial partial order of six possible labelings, which are all passed to the same MOQA operation, the outcome could be two different partial orders, one with two labelings, the other with four labelings. However, again due to the random-sequence-preservation of MOQA operations, the two labelings will be all possible labelings of that partial order and the four labelings will be all possible labelings of the other partial order. So a number of different partial orders may be generated from changing one partial order across all its possible labelings. The guarantee of any MOQA operation is that all the possible labelings of these new partial orders will be generated too, with no leftovers/incomplete random structures.

When two or more random structures are generated, there can be more than one random structure for the same partial order, where each identical random structure has its own complete set of all possible labelings. In other words all the possible labelings for a partial order can appear twice, three times, four times, etc. The number of identical random structures, where each random structure has its own distinct and complete set of all possible labelings, is formally called the multiplicity of that random structure. So if there was a partial order with two possible labelings and six labelings for this partial order were found in the result of some MOQA operation going over all possible labelings of an original partial order, then there must be three identical random structures of that partial order in the result, that the multiplicity of the random structure is three.

In summary, a MOQA operation executes over one possible labeling of a finite partial order at a time. The operation generally alters the relation between the elements in that partial order and the labeling may also be altered to be in line with the new partial order. So either before or after the elements have their ordering changed, it may be necessary to change what labels are attached to what elements, by means of Push-Down and Push-Up, until the labeling is consistent with the new ordering of the elements. Due to the fact that MOQA operations are random-sequence-preserving, that is applying them to a random structure always gives a sequence of random structures, means we can rely on the fact that the probability of a possible labeling occurring within its random structure and the probability of a possible labeling occurring over all random structures can be determined. The probability of a possible labeling occurring within its random structure is equal to the probability of any other possible labeling within that random structure occurring. The probability of a possible labeling occurring over all random structures, if each random structure is distinct, is one over the number of all possible labelings that can occur. The number of all possible labelings that can occur is the sum of the size of every random structure in the sequence. The size of a random structure being the number of all possible labelings of its partial order. The probability of a possible labeling occurring over all random structures, if each random structure is not necessarily distinct, is the size of the labeling's random structure multiplied by its multiplicity over the total number of labelings that are in the random sequence. The total number of labelings in the random sequence is the sum of the size of each random structure multiplied by its multiplicity for every random structure in the random sequence. This information is used by the static analysis tool to determine average-time case time automatically, an advantage MOQA has over other standard programming languages. Random-sequence-preservation is the key to this new technology.

Product

Product Definition

The product operation is used to construct any partial order other than the partial order that has the identity relation =, i.e. the discrete order. The discrete order is the initial input from an external source that is supplied in an implementation-dependent manner. Every MOQA data structure is built from the base case MOQA data structure, which is the discrete order. The discrete order is the starting point prior to any sequence of random-sequence-preserving MOQA operations. Once a discrete order has been supplied, the product operation can be used to specify a relation between elements in a partial order, to impose an ordering between elements which is more than the identity relation =. The product operation is defined as follows:

The product operation takes place between two subsets within a partial order. A product between three subsets is a product between two subsets with that result then producted with the third subset, a product between four subsets is the product between three subsets with that result producted with the fourth subset, and so on.

A product operation places one of the subsets above the other and then proceeds to connect every minimal element in the subset above to every maximal element in the subset below. Once this relation between the elements has been established, it may be necessary to reorganise the element's label values so that the newly-formed relation is in accord with the mathematical ordering on the finite partial order $(X, \sqsubseteq)$. This adjustment is assisted by the helper methods Push-Down and Push-Up, which are independently described below as they are used within other MOQA operations.

The first step for the labeling to be consistent with the ordering on X, is to select the smallest label value, $min_r$, among the minimal elements of the set producted above and the largest label value, $max_r$, among the maximal elements of the set producted below.

The second step is to compare if $min > max$ (As a partial order in MOQA contains distinct label values, there is no possibility of these values being equal. We can handle duplicate input labelings, in line with the traditional Computer Science approach, by assuming that the average-case time being determined by MOQA is on non-duplicate labels and then using this value as an approximation of the average-case time when there are duplicate labels involved.). If so, this means that all the label values in the set producted above are greater than all the label values in the set producted below. This satisfies the ordering and product is complete.

However, if $min \not> max$, this means the contrary is true, that one or more label values in the set producted above are smaller than one or more label values in the set producted below, violating the ordering on X. If so, in the third step, the label values of $min$ and $max$ are swapped. Push-Down is called on $min$ and Push-Up is called on $max$. This will result in $min$ and $max$ being placed in the correct position in the current ordering. Step four is to return to step one. This cycle continues until the entire ordering on X is correct.

So as to ensure random-sequence-preservation, the sets to be producted together must have certain properties in common, otherwise the product operation will fail in an appropriate manner, without any change to the partial order. The properties are as follows:
1. Both sets are isolated sets.
2. Both sets have the same set of elements directly above them. Take two isolated sets, set A and set B, ⌈A⌉ is the same as ⌈B⌉. Another way of saying this is that any maximal element in set A has the same set of elements directly above it as any maximal element in set B.
3. Likewise, both sets have the same set of elements directly below them. ⌊A⌋ is the same as ⌊B⌋. Another way of saying this is that any minimal element in set A has the same set of elements directly below it as any minimal element in set B.
4. Both sets are distinct, i.e. the intersection of A and B is null, they have nothing in common.

A more formal way of describing the properties of the two sets is to say that A and B are two distinct components of an isolated subset I of a finite partial order $(X, \sqsubseteq)$. A distinct component is itself an isolated subset so this can be rewritten as A and B are distinct components $I_1$ and $I_2$ of an isolated subset I of X.

Once the parameters for the product operation meet the conditions outlined above, the product operation, in combination with other MOQA operations, can build partial orders at any level of complexity desired by the computation. So far, product has been described as taking place within a partial order but what about a product operation across two distinct partial orders $(X_1, \sqsubseteq)$ and $(X_2, \sqsubseteq)$? Assuming that the label type of $X_1$ and the label type of $X_2$ are directly comparable and the set of label values of $X_1$ and $X_2$ are distinct, they then fulfill product's parameter requirements. Therefore, unlike a product internal to a partial order, for which a formula can be automatically derived expressing average-case time, no such formula can be automatically derived for a product across two partial orders.

Product Examples

Figure 3C:
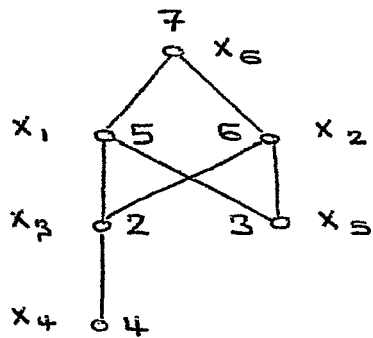
Figure 3C:
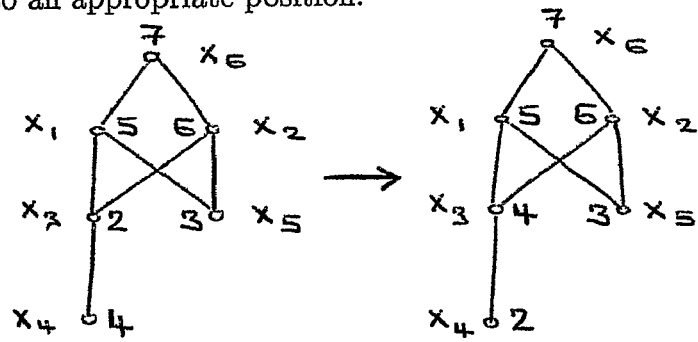

Examples of the product operatin are set out in FIGS. 3(a) to 3(c).

Split

Split Definition

The split operation, like the Product operation, changes the ordering of a partial order by adding additional relations between the elements in the partial order. The split operation is defined as follows:

The split operation takes place between one element of a set and the rest of the elements in that set. The set must be discrete/atomic, which is another way of saying that no element in the set is related to any other element in the set. The one element around which split takes place is selected by code external to split and is a specified parameter for the operation.

The particular labeling over the discrete set that contains the specified element, $x_{m_r}$, is examined. All elements who have label values greater than the label value of the specified element $x_{m_r}$ are grouped together in the set $\overline{X}_{x_{m_r}}$ and all the elements who have label values smaller than the label value of the specified element $x_{m_r}$ are grouped together in the set $\underline{X}_{x_{m_r}}$. Either of the two sets, $\overline{X}_{x_{m_r}}$ or $\underline{X}_{x_{m_r}}$, can be empty. This places every element of the discrete set into one of three distinct subsets, the set of elements with labels less than the label of $x_{m_r}$, the set containing $x_{m_r}$ itself, and the set of elements with labels greater than the label of $x_{m_r}$. As any label value in a partial order is comparable with any other label value in that partial order, there will be no label value in the discrete set that cannot be placed in one of these three sets.

Now $\overline{X}_{x_{m_r}}$ is producted above $x_{m_r}$ and the result of this product has $\underline{X}_{x_{m_r}}$ producted below it. Of course, this could be done the other way around, $\underline{X}_{x_{m_r}}$ is producted below $x_{m_r}$ and the result of this product has $\overline{X}_{x_{m_r}}$ producted above it. The labeling does not have to be adjusted as the nature of the operation ensures that it is correct, though Product will double check this fact. The implementation could be designed in such a manner that an internal call to Product from the split operation skips any adjustment of the labeling and therefore does not make any unnecessary calls to Push-Down and Push-Up.

So as to ensure random-sequence-preservation, the set that is being split around one of its specified elements must have certain properties, otherwise the split operation will fail in an appropriate manner, without any change to the partial order. The properties are as follows:
1. As already stated, the set is discrete.
2. Every element in the set has the same set of elements directly above it. Take the discrete set A, $\forall x, y \in A$, $\lceil x \rceil = \lceil y \rceil$.
3. Likewise, every element in the set has the same set of elements directly below it. $\forall x, y \in A$, $\lfloor x \rfloor = \lfloor y \rfloor$.

A more formal way of describing the properties of the set that the specified element $x_m$, is within is that it must be an atomic isolated subset of a finite partial order $(X, \sqsubseteq)$. The discrete finite partial order is an atomic isolated subset of itself. Note that the required conditions of the set containing $x_m$, ensure that the two sets in each of the calls to Product in split satisfy the parameter requirements of Product.

While split has much in common with Product by its constructive nature, the underlying approach differs in more than just definition details. It has already been shown that a random structure can be seen as the combination of two separate sets, the set of elements and the set of labels for these elements. The set of elements have an ordering between them and the set of labels can be laid over the set of elements in one or more ways that satisfy the ordering. Product forms a relation between two sets of elements, subsets of a larger set of elements, once these sets meet the required properties of Product. The particular labeling involved, which is laid over the larger set of elements, is then shifted around this new ordering if necessary. However, split forms a relation between an element and the other elements in the set, once the set meets the required properties of split, based on the particular labeling of that set. Product changes the ordering in a partial order independent of the particular labeling. The labeling is only considered afterwards as part of the cleaning-up process. However, split changes the ordering in a partial order based on the particular labeling. The labeling is an intrinsic part of the operation, used to influence the new ordering.

Split Examples

Figure 4D:
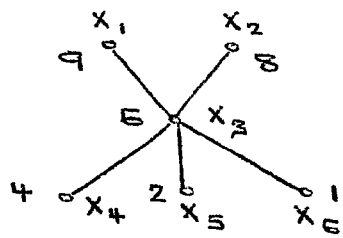
Figure 4D:
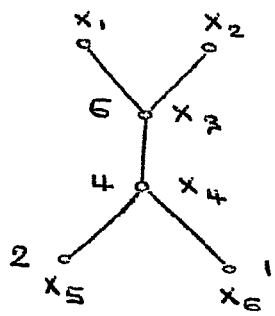
Figure 4D:
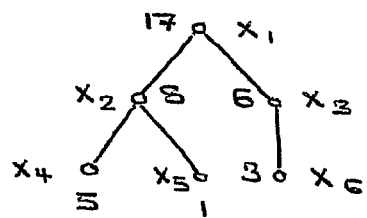
Figure 4B:
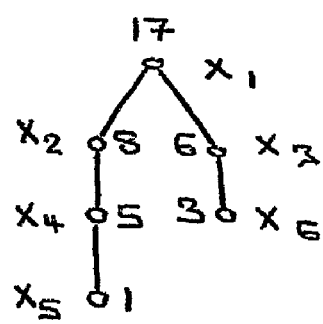

Examples of the split operation are illustrated in FIGS. 4(a) and 4(b).

Projection

Projection Definition

The projection operation is simply a copy operation. The projection operation is defined as follows:

The projection operation takes place on some set I. A new set, J, is created, which is order-isomorphic to the set I. J is a new set of elements, distinct to I. The number of elements in J is the same as the number of elements in I. The ordering between J's elements is the same as the ordering between I's elements. J has a new set of labels, distinct to I. The number of labels in J is the same as the number of labels in I. J's label set is comprised of the same label values that I's label set is comprised of.

If a MOQA operation, other than projection, is executed on I after projection, I will no longer be order-isomorphic with J and vice versa. This clearly holds if the MOQA operation is executed on J instead. Now J will no longer be order-isomorphic with I and vice versa. To restore order-isomorphism in the first case, the same MOQA operation must be executed on J after being executed on I. Not only the same MOQA operation but the same MOQA operation involving the same size subset(s) as in I. Plus the subset(s) of J involved in the MOQA operation must have the same ordering, in terms of the overall set, that the subset(s) of I involved in the MOQA operation had. As I and J's element and label sets are distinct, the order-isomorphism does not hold otherwise.

So as to ensure random-sequence-preservation, the set I that is being projected must have a certain property, otherwise the projection operation will fail in an appropriate manner, without the creation of the set J. The property is as follows:

1. The set I is an isolated subset of a finite partial order $(X, \sqsubseteq)$.

There is also a version of projection that differs to the copy description above. This projection removes the complement of an isolated subset of a partial order. It will not be further expanded upon in this document.

Projection Examples

Figure 5:
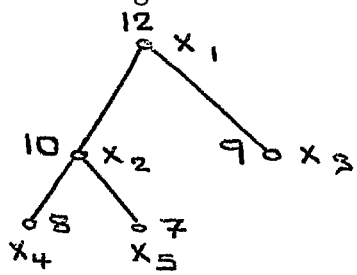
Figure 5:
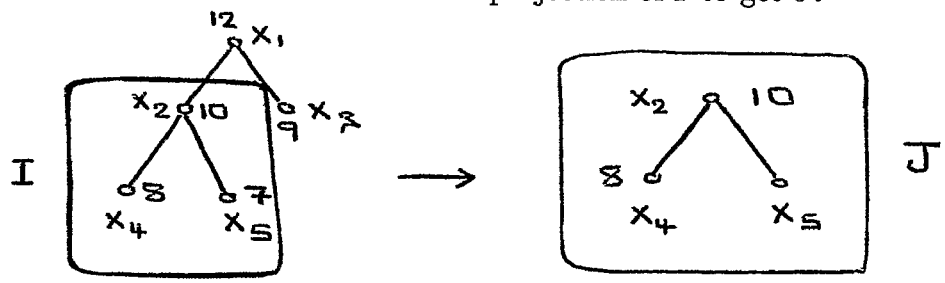
Figure 5:
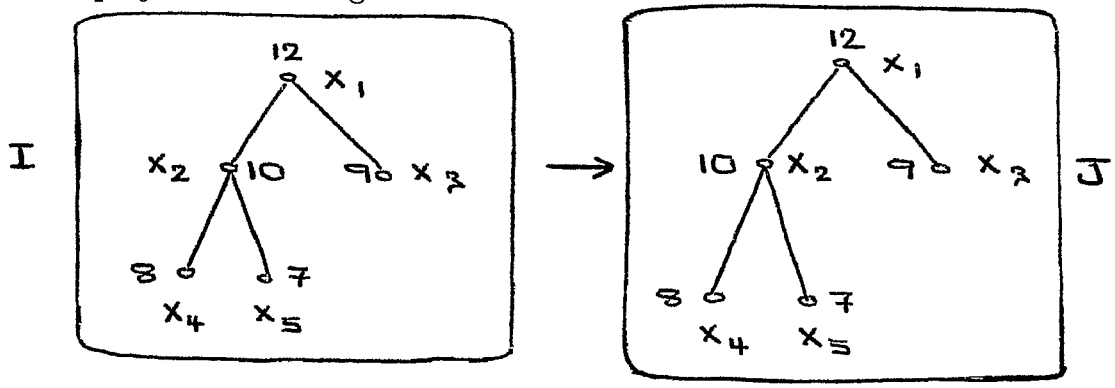

Examples of the projection operatin are illustrated in FIG. 5.

Delete

Delete Definition

The delete operation is not always as simple or as intuitive as its name suggests. Delete is defined in terms of the entire finite partial order $(X, \sqsubseteq)$ and in terms of a strict subset of the finite partial order $(X, \sqsubseteq)$. Both definitions are similar but there is a subtle but significant difference between them that motivates the following two separate definitions so as to prevent the asymmetry between them going unnoticed.

Delete Over Entire Partial Order

The delete operation over an entire partial order is defined as follows:

A single element is removed from the partial order $(X, \sqsubseteq)$. The element to be removed is not actually specified as a parameter for delete. Rather the element to be removed is implied by reference to the label value it is attached to in the particular labeling. However, it is not the actual value of the label that is specified but the relative position of the label value to the other label values in the partial order's set of labels. For example, the specified parameter may request that the element with the third largest label in the entire partial order is removed from the partial order or the element with the smallest label in the entire partial order is removed from the partial order. This breaks away from the modus of the operations prescribed above, where the relation between label values is based on the relation between the elements that the label values are attached to. Here the relation specified by delete's parameter refers solely to the relation between the label values in the label set of the partial order, regardless of the relation between the elements they are attached to.

When the actual label value is selected by its specified relation to the other label values in the entire partial order, e.g. the actual value of the third largest label in the entire partial order or the actual value of the smallest label in the entire partial order, the element that this label value is attached to is identified as the element to be removed from the partial order.

Once the element to be removed is identified it is not removed from the partial order without question. The element to be removed must be a minimal or maximal element in the partial order. If it is, then it can be removed from the set of elements without further ado and any ordering between the removed element and the rest of the elements in the set of elements are also removed with it. If the element to be removed is not a minimal or maximal element then it cannot be removed from where it is in the partial order. Only an element in a minimal or maximal position in the partial order can be safely removed, to guarantee the random-sequence-preservation of delete.

In the case where an element to be removed is not a minimal or maximal element of the partial order, one solution to safely remove it from the partial order is to change the label of the element to be less than the smallest label in the label set of the partial order. Push-Down is then called on the new label value. This will result in the label value being pushed down to a minimal element in the partial order. This minimal element can then be safely removed. The alternative solution is to change the label of the element to be removed to be greater than the largest label in the label set of the partial order. Push-Up is then called on the new label value. This will result in the label value being pushed up to a maximal element in the partial order. This maximal element can then be safely removed.

When the element to be removed is identified and it is not a minimal or maximal element of the partial order, either of the above solutions will produce a new partial order that may not meet expectations as the element with the label value that meets the specified relation is not removed from the partial order. Rather it is assigned a new label value and remains in the ordering. Instead some unrelated element, whose selection is entirely due to it being a minimal or maximal element in the partial order, is removed from the partial order, even though its label value remains in the partial order's set of labels. The identified element for removal, which is not actually removed, receives a new label value because of the call to Push-Down or Push-Up. Not only does the identified element for removal, which is not actually removed, receive a new label value but every element on the path between it and the maximal(Push-Up) or minimal(Push-Down) element that is removed receives a new label value due to the semantics of Push-Down or Push-Up.

So depending on the ordering of the element selected indirectly for deletion, it may either be actually removed from the partial order if it happens to be a minimal or maximal element in that partial order, otherwise just its label value is removed and some other element is removed, whose label value remains, because it happens to be a minimal or maximal element in the partial order. This is not a standard approach to delete and is a consequence that code calling delete needs to be aware of.

So as to ensure random-sequence-preservation, the property of the partial order that an element is deleted from must simply be that it is a finite partial order $(X, \sqsubseteq)$.

Delete Over Entire Partial Order Examples

Figure 6B:
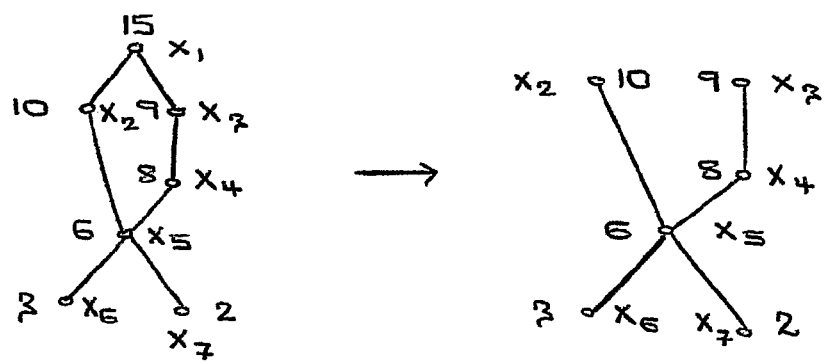

Reference is made to FIGS. 6(a) and 6(b) which give illustrated examples.

Delete Over Strict Subset of Partial Order

The delete operation over a strict subset of a partial order is defined as follows:

A single element is removed from a strict subset of a partial order and consequently is removed from the overall partial order $(X, \sqsubseteq)$. The element to be removed is not actually specified as a parameter for delete. Rather the element to be removed is implied by reference to the label value it is attached to in the particular labeling. However, it is not the actual value of the label that is specified but the relative position of the label value to the other label values in the strict subset's set of labels. For example, the specified parameter may request that the element with the third largest label in the strict subset is removed from the strict subset of a partial order or the element with the smallest label in the strict subset is removed from the strict subset of a partial order. The third largest label in a strict subset of a partial order is likely to be different to the third largest label in that partial order. Consider some partial order $(X, \sqsubseteq)$ with the label set $\{1, 2, 3, 4\}$ and some strict subset of that partial order with a label set $\{1, 2, 3\}$. The third largest label of the partial order is 2, whereas the third largest label of the strict subset of that partial order is 1 and it is the relation between the strict subset's set of labels that this explanation of delete is interested in. Again, this breaks away from the modus of the other non-delete operations prescribed above, where the relation between label values is based on the relation between the elements that the label values are attached to. Here the relation specified by delete's parameter refers solely to the relation between the label values in the label set of the strict subset of a partial order, regardless of the relation between the elements they are attached to.

When the actual label value is selected by its specified relation to the other label values in the strict subset of a partial order, the element that this label value is attached to is identified as the element to be removed from the strict subset and therefore to be removed from the partial order.

Once the element to be removed is identified it is not removed from the strict subset without question. The element to be removed must be a minimal or maximal element in the strict subset. If it is, then it can be removed from the strict subset's set of elements, and consequently the partial order's set of elements, without further ado and any ordering between the removed element and the rest of the elements in the partial order's set of elements are also removed with it. If the element to be removed is not a minimal or maximal element then it cannot be removed from where it is in the strict subset. Only an element in a minimal or maximal position in the strict subset can be safely removed, to guarantee the random-sequence-preservation of delete.

In the case where an element to be removed is not a minimal or maximal element of the strict subset, one solution to safely remove it from the strict subset is to change the label of the element to be less than the smallest label in the label set of the strict subset. Push-Down is then called on the new label value. However, this will be a modified version of Push-Down, as the label value should not be pushed all the way down to a minimal element in the partial order, which Push-Down defined below will always do. Rather in this modified version of Push-Down the label value will be pushed down to a minimal element in the strict subset. So the modified version of Push-Down will stop when the label value reaches an element that has been marked as a minimal element of the strict subset though it may not be a minimal element of the partial order. When the minimal element of a strict subset is also the minimal element of the strict subset's partial order, the two versions of Push-Down will produce the same result. This will result in the label value being pushed down to a minimal element in the strict subset. This minimal element can then be safely removed. The alternative solution is to change the label of the element to be removed to be greater than the largest label in the label set of the strict subset. Push-Up is then called on the new label value. However, this will be a modified version of Push-Up, as the label value should not be pushed all the way up to a maximal element in the partial order, which Push-Up defined below will always do. Rather in this modified version of Push-Up the label value will be pushed up to a maximal element in the strict subset. So the modified version of Push-Up will stop when the label value reaches an element that has been marked as a maximal element of the strict subset though it may not be a maximal element of the partial order. When the maximal element of a strict subset is also the maximal element of the strict subset's partial order, the two versions of Push-Up will produce the same result. This will result in the label value being pushed up to a maximal element in the strict subset. This maximal element can then be safely removed.

When the element to be removed is identified and it is not a minimal or maximal element of the strict subset, either of the above solutions will produce a new partial order that may not meet expectations as the element with the label value that meets the specified relation is not removed from the strict subset, and consequently its partial order. Rather it is assigned a new label value and remains in the ordering. Instead some unrelated element, whose selection is entirely due to it being a minimal or maximal element of the strict subset, is removed from the partial order, even though its label value remains in the partial order's set of labels. The identified element for removal, which is not actually removed, receives a new label value because of the call to Push-Down or Push-Up. Not only does the identified element for removal, which is not actually removed, receive a new label value but every element on the path between it and the maximal(Push-Up) or minimal(Push-Down) element that is removed receives a new label value due to the semantics of Push-Down or Push-Up.

So depending on the ordering of the element selected indirectly for deletion, it may either be actually removed from the strict subset if it happens to be a minimal or maximal element in that subset, otherwise just its label value is removed and some other element is removed, whose label value remains, because it happens to be a minimal or maximal element in that strict subset. This is not a standard approach to delete and is a consequence that code calling delete needs to be aware of.

So as to ensure random-sequence-preservation, the strict subset of the partial order that is having an element deleted from it must have a certain property, otherwise the delete operation will fail in an appropriate manner, without the deletion of an element. The property is as follows:

1. The strict subset is a strictly isolated subset of a finite partial order (X, $\sqsubseteq$))

Delete Over Strict Subset of Partial Order Examples

Please refer to FIGS. 7(a) and 7(b) for illustrated examples of this operation.

Push

Push-Down and Push-Up are used by other MOQA operations for the purpose of ensuring that the particular labeling in question is to be consistent with the new ordering on the partial order. The MOQA operations will specify which label value in the labeling that they want Push-Down or Push-Up called upon. Depending on the definition of the MOQA operation and how out of sync the labeling is with the new ordering, Push-Down and/or Push-Up may be repeatedly executed on a series of label values. The definition of Push-Down and/or Push-Up are as follows.

Push-Down Definition

Push-Down takes the specified label value, $lv_{x_r}$ and collects together the set of all the label values directly below $lv_{x_r}$. If this is empty, then Push-Down halts and returns to the MOQA operation from which it was called. Otherwise, the largest label value in this set is determined. Then there is a comparison between the specified label value, $lv_x$ and the largest label value in the set directly below $lv_x, lv_{l_s}$ to see if $lv_{l_s} > lv_{x_r}$. If this is so, then $lv_x$ and $lv_l$ are swapped. If $lv_{l_s} \not\succ lv_x$ then Push-Down halts and returns to the MOQA operation from which it was called. Otherwise, the specified label value, $lv_x$ is now in the set of labels that were originally directly below it, and Push-Down is then called again on $lv_x$ in its new position. This is repeated until the label value $lv_x$ is greater than all the label values directly below it or there is no label values directly below it. This is a recursive view of Push-Down, an iterative formal definition of Push-Down is as follows:

W-Push-Down($lv_x$, F)

while $\lfloor lv_x \rfloor \neq \emptyset$ and $lv_x < \vee \lfloor lv_x \rfloor$ swap($lv_x, \vee \lfloor lv_x \rfloor$, F)

Where $\lfloor lv_x \rfloor$ is the set of all the elements below $lv_x$ that $lv_x$ is directly related to. F is a particular labeling of the partial order in question.

Note how this formal definition of Push-Down is called W-Push-Down. This is because the manner of pushing the label value down to its appropriate position, described here both recursively and iteratively, was initially defined by Williams in his implementation of Push-Down [Wil64, which we refer to as W-Push-Down. The other approach is Floyds [Flo64]. Floyd's differs to Williams in that he does not continuously swap $lv_x$ down to its correct position in the ordering. Instead Floyd finds $lv_l$ and then for that value finds its $lv_l$ the greatest label value directly below $lv_l$ and so on until a leaf is reached, a label value that has no label values directly below it. The algorithm now backtracks up this path until it finds a label value greater than the specified label value $lv_x, lv_L$. Now the label value directly preceding $lv_L$ on the path is replaced with $lv_L$. This replaced value then replaces the label value directly preceding it on the path and so on until the specified label value $lv_x$ is replaced by the value directly succeeding it on the path. $lv_x$ now replaces the empty gap in the path where $lv_L$ originally was.

Whether Push-Down is in the style of Floyd or Williams is an implementation detail as both versions produce the same solution. The idea is that a label, which is not in its correct position because it is smaller than one or more label values below it in the ordering, is pushed down to a suitable position that now satisfies the ordering.

Push-Up Definition

Push-Up is the inverse of Push-Down as this definition shows. Push-Up takes the specified label value, $lv_{x_r}$ and collects together the set of all the label values directly above $lv_{x_r}$. If this is empty, then Push-Up halts and returns to the MOQA operation from which it was called. Otherwise, the smallest label value in this set is determined. Then there is a comparison between the specified label value, $lv_{x_r}$ and the smallest label value in the set directly above $lv_{x_r}$, $lv_{s_i}$, to see if $lv_s < lv_{x_r}$. If this is so, then $lv_{x_r}$ and $lv_s$ are swapped. If $lv_s \not> lv_{x_r}$ then Push-Up halts and returns to the MOQA operation from which it was called. Otherwise, the specified label value, $lv_{x_r}$, is now in the set of labels that were originally directly above it, and Push-Up is then called again on $lv_x$ in its new position. This is repeated until the label value $lv_x$ is smaller than all the label values directly above it or there is no label values directly above it. This is a recursive view of Push-Up, an iterative formal definition of Push-Up is as follows:

W-Push-Up($lv_{x_r}$,F)

while $\lceil lv_{x_r} \rceil \neq \emptyset$ and $lv_{x_r} > \wedge \lceil lv_{x_r} \rceil$ swap($lv_x, \wedge \lceil lv_{x_r} \rceil$, F)

Where $\lfloor lv_{x_r} \rfloor$ is the set of all the elements above $lv_{x_r}$ that $lv_x$ is directly related to. F is a particular labeling of the partial order in question.

Note how this formal definition of Push-Up is called W-Push-Up. This is because the manner of pushing the label value up to its appropriate position, described here both recursively and iteratively, was initially defined by Williams in his implementation of Push-Up [Wil64], which we refer to as W-Push-Up. The other approach is Floyds [Flo64]. Floyd's differs to Williams in that he does not continuously swap $lv_x$ upwards to its correct position in the ordering. Instead Floyd finds $lv_{s_1}$ and then for that value finds its $lv_{s_2}$, the smallest label value directly above $lv_{s_2}$, and so on until a root is reached, a label value that has no label values directly above it. The algorithm now backtracks down this path until it finds a label value less than the specified label value $lv_{x_r}$, $lv_{s_i}$. Now the label value directly preceding $lv_{s_i}$ on the path is replaced with $lv_{s_i}$. This replaced value then replaces the label value directly preceding it on the path and so on until the specified label value $lv_x$ is replaced by the value directly succeeding it on the path. $lv_x$ now replaces the empty gap in the path where $lv_{s_i}$ originally was.

Whether Push-Up is in the style of Floyd or Williams is an implementation detail as both versions produce the same solution. The idea is that a label, which is not in its correct position because it is larger than one or more label values above it in the ordering, is pushed upwards to a suitable position that now satisfies the ordering.

It will be appreciated that the current state of the art of modular time derivation is extremely limited. We have shown that it can NOT be achieved in general for worst-case time analysis. Some partial modularity has been obtained in prior art and only in extremely limited contexts such as forced complete execution of both conditional branches of any conditional statement. Also partial modularity for worst-case time can be achieved under conditions where all processes are assumed to be entirely independent from one another, i.e. there is no functional dependency and no process every waits for the outcome of another process. Again, this is an extremely restrictive context.

The MOQA methodology on the other hand, works for the average-case time, where it is shown that modularity is guaranteed (as opposed to partial modularity) and where functional dependency is allowed, i.e. it is perfectly allowed for one process to have to wait for the output of another in order to continue the computations.

References

[Flo64] R. W. Floyd, Algorithm 245, treesort 3. *Commun. ACM* 701, 1964.

[Wil64] J. W. J. Williams. Algorithm 232. *Commun. ACM* 7(6), 347-348, 1964.

The following section, called "More Detailed Technical Specification" describes the operations and the static analysis timing tool more comprehensively. There is a degree of repetition or overlap between the following passages and the preceding ones. This is considered necessary as it allows the following passages to be read as a unit without need to frequently refer back to the preceding passages, which are written at a slightly higher level description for ease of understanding the invention.

MORE DETAILED TECHNICAL SPECIFICATION

1 Introduction

Each random sequence consists of "random structures" paired with a multiplicity. The multiplicity reflects the number of copies of the random structure which are produced after an application of a data structuring operation.

These multiplicities play a crucial role in average-case time analysis.

In particular, if we compose basic data structuring operations in order to obtain a transformation of one data structure into another, we can obtain an expression (recurrence equation) of the average-case time of this composed operation provided all the basic operations are Random Structure Preserving (in the sense specified below). Indeed, in the case of Random Structure Preservation, we are guaranteed that a Random Sequence is once again transformed into a new Random Sequence. The multiplicities of the resulting sequence can then be used to determine the average-case time.

Our results are specified for labels which can come from any linear order. For the sake of simplicification of presentation we focus on data structures for which a labeling has no repeated labels. However, our results apply to the general case of repeated labels as well.

Essentially our method guarantees modular timing, i.e. the average-time of a composition of data structuring operations is guaranteed to be obtainable from the average-times of the basic operations involved in the composition. This induces a considerable simplification in average-case time determination, which is obtained thanks to this novel approach.

The verifications that the method works are made in the following.

2 Introductory Notions

We denote the real numbers by $\mathcal{R}$ and the natural numbers by $\mathcal{N}$.

For any set X, we let |X| denote its cardinality. For any function $f: X \to Y$ we let Ra($f$) denote the set of values $\{f(x) | x \in X\}$ and refer to this set as the range of $f$. The result of restricting a function to a subset A of X is denoted by $f \lceil A$.

Similarly, the restriction of a partial order $(X, \sqsubseteq)$ to a subset A of X is denoted by $(A, \sqsubseteq \lceil A)$ or often, when no confusion can arise, by $(A, \sqsubseteq)$.

The result of concatenating two sequences, say $A=(a_1, \ldots, a_m)$ and $B=(b_1, \ldots, b_n)$ is the sequence Conc(A, B)=$(a_1, \ldots, a_m, b_1, \ldots, b_n)$. Concatenation of more than two sequences, Conc($A_1, \ldots, A_n$), is defined in a similar way.

An affine combination of a sequence of real-valued functions $f_1, \ldots, f_n$ is an expression of the form $\alpha_1 f_1 + \ldots + \alpha_n f_n$ where $\alpha_1, \ldots, \alpha_n$ are scalars and $$\sum_{i=1}^{n} \alpha_i = 1.$$

2.1 Partial Orders & Hasse Diagrams

A partial order is a pair $(X, \sqsubseteq)$ consisting of a set X and a binary relation $\sqsubseteq$ between elements of X such that the relation is:

1) Reflexive: $x \sqsubseteq x$
2) Transitive: $x \sqsubseteq y, y \sqsubseteq z \Rightarrow x \sqsubseteq z$.
3) Anti-symmetric: $x \sqsubseteq y, y \sqsubseteq x \Rightarrow x = y$.

We use the following notation for partial orders $(X, \sqsubseteq)$:

For $x \in X$, we let $x \downarrow = \{y | y \in X$ and $y \sqsubseteq x\}$ and $x \uparrow = \{y | y \in X$ and $x \sqsubseteq y\}\}$. If $A \subseteq X$ then $A \uparrow = \cup_{x \in A} x \uparrow$ and $A \downarrow = \cup_{x \in A} x \downarrow$.

If $(X_1, \sqsubseteq)$ and $(X_2, \sqsubseteq)$ are partial orders then a function $f: X \to Y$ is increasing iff $\forall x, y \in X_1. x \sqsubseteq_1 y \Rightarrow f(x) \sqsubseteq_2 f(y)$. In case the function $f$ is an increasing bijection and $f^{-1}$ is increasing, we refer to $f$ as an order-isomorphism between the given partial orders. If $(X, \sqsubseteq)$ is a partial order then we define $x \sqsubset y \Leftrightarrow (x \sqsubseteq y$ and $x \neq y)$). The binary relation $\sqsubset_1$ is defined to be the set of all pairs $(x, y)$ such that $x \sqsubset y$ and $\nexists z. x \sqsubset z \sqsubset y$.

We assume that the reader is familiar with Hasse Diagrams (e.g. [DP90]) which we will use to represent partial orders in the examples. The transitive reduction of a partial order $(X, \sqsubseteq)$ is obtained by omitting from $\sqsubseteq$ all its reflexive pairs and pairs that can be inferred by transitivity. The Hasse Diagram of a partial order is a digraph representation of its transitive reduction, where we require that in the representation, related elements $x, y$ where $x \sqsubseteq y$ are displayed such that $x$ is below $y$ in the Hasse diagram. In other words, Hasse diagrams represent directed acyclic graphs for which the transitive reflexive closure is the given partial order. Again in other words, we only display the relation $\sqsubset_1$) in a Hasse Diagram. When specifying a partial order we typically list a set of pairs specifying the Hasse Diagram for the partial order.

A linear order $(X, \sqsubseteq)$ is a partial order such that every pair of elements $x, y \in X$ is related with respect to this order, i.e. $\forall x, y \in X. x \sqsubseteq y$ or $y \sqsubseteq x$.

For any set X we denote the discrete partial order on X, i.e. the partial order consisting only of the reflexive pairs $\{(x, x) | x \in X\}$, by $(X, \sqsubseteq)$.

For any subset Y of a partial order $(X, \sqsubseteq)$ we say that Y is a discrete subset of X in case the restriction of the order $\sqsubseteq$ to Y is the discrete order.

An element $x$ of a partial order $(X, \sqsubseteq)$ is maximal (minimal) iff $\nexists y \in X. x \sqsubset y (y \sqsubset x)$).

An extremal element of a partial order is an element which is maximal or minimal. A maximum (minimum) element of a partial order $(X, \sqsubseteq)$ is an element $x \in X$ such that $\forall y \in X. y \sqsubseteq x (x \sqsubseteq y)$.

For any two points $x, y \in X$ we call a sequence $(x_1, \ldots, x_n)$ a path from x to y when $x_1, \ldots, x_n \in X$, $x_1 = x$, $x_n = y$ and $\forall i \in \{1, \ldots n-1\}$. $x_i \sqsubseteq x_{i+1}$ or $x_i \sqsupseteq x_{i+1}$. A connected partial order $(X, \sqsubseteq)$ is a partial order such that for every two points $x, y$ of X there exists a path from $x$ to $y$. A component of a partial order is a non-empty connected subset of maximal size. Any partial order can be partitioned (as a graph) into a set of components.

The length of a path of a finite partial order is the number of elements on the path.

A chain in a partial order $(X, \sqsubseteq)$ is a path which forms a linear order under the restriction of $\sqsubseteq$.

2.2 Uniform Distribution and Multi-Sets

We consider data structures in the following and operations on data structures. In this context we have the physical data structuring object in mind and we consider operations over these data structures. Hence we will refer to "inputs" of such operations, which will be particular instances of the data structure under consideration. We remark that every input I has a size $n \in \mathcal{N}$ which depends on the data structure under consideration. For instance, the size of a list is its length while the size of a tree is the number of nodes in the tree.

We briefly discuss identification up to order-isomorphism of input sets which plays a main role in Average-Case Time analysis. Typically there are infinitely many inputs corresponding to a given data structure for a given size. For instance, the infinite collection of all finite lists of size n over the natural numbers, i.e. the set $\mathcal{N}^n = \{(k_1, \ldots, k_n) | k_1, \ldots, k_n \in \mathcal{N}\}$. Two lists $(a_1, \ldots, a_n), (b_1, \ldots, b_n)$ of size n are equivalent up to order isomorphism iff $\forall i, j \in \{1, \ldots, n\}$. $a_i \leq a_j \Leftrightarrow b_i \leq b_j$. This is denoted by: $(a_1, \ldots, a_n) \approx (b_1, \ldots, b_n)$. Identification up to order-isomorphism of $\mathcal{N}^n$ w.r.t. to the equivalence relation $\approx$ yields a finite quotient $\mathcal{N}^n/\approx$ with n! representatives, which we denote in the following by $\mathcal{A}_n$. We use the notation "$\mathcal{A}$" rather than "$\mathcal{L}$" since the latter will be reserved to indicate sets of labels. For instance for the case of lists of size 3, the quotient is $$\mathcal{A}_3 = \{[(1,2,3)], [(1,3,2)], [(2,1,3)], [(2,3,1)], [(3,1,2)], [(3,2,1)]\}$$

where we chose as representatives the 3! permutations over the 3 element set $\{1,2,3\}$. In general, and with abuse of notation, we will simply denote the quotient classes via their representatives, as in:

$$\mathcal{A}_3 = \{(1,2,3), (1,3,2), (2,1,3), (2,3,1), (3,1,2), (3,2,1)\}.$$

For data structures, such as lists and heaps, we use the following notation, where we work modulo identification up to order-isomorphic copies: $\mathcal{A}_n$ denotes the set of n! non-isomorphic lists of size n with pairwise distinct elements, $\mathcal{H}_n$ denotes the set of non-isomorphic heaps of size n with pairwise distinct elements. Also, we let $\mathcal{S}_n$ denote the set consisting of the single sorted list of size n. In case we do not wish to specify the data structure under consideration, we let the finite set $\mathcal{I}_n$ denote the set of inputs of size n for this particular data structure, identified up to order-isomorphism.

A multi-set is a finite set-like object in which order is ignored but multiplicity is explicitly significant. Thus, contrary to sets, multi-sets allow for the repetition of elements. Therefore, multi-sets $\{1,2,3\}$ and $\{3,1,2\}$ are considered to be equivalent, but $\{1,2,2,3\}$ and $\{1,2,3\}$ differ. We refer to the number of times an element occurs in a multi-set as the multiplicity of the element. The cardinality of a multi-set is the sum of the multiplicities of its elements. Each multi-set A of n elements has an associated set $B = \{b_1, \ldots, b_k\}$ such that $\cup A = \cup B$ and where each element $b_i$ of B is repeated $K_i$ times where $1 \leq K_i \leq n$ and $$\sum_{i=1}^{k} K_i = n.$$

It is clear that a multi-set A can be represented in this way as a set of pairs $\{(b_1,K_1), \ldots, (b_k,K_k)\}$.

In fact it will be convenient to adopt a slight generalization of this type of representation as our formal definition of a multi-set in the following. I.e. a multi-set is formally defined in this context as a finite set of pairs $\{(b_1,K_1), \ldots, (b_k,K_k)\}$, where each $K_i$ is a natural number, referred to as the multiplicity of the element $b_i$ and where we do not require that the elements $b_i$ are pairwise disjoint. In case (*) $\forall i,j. b_i \neq b_j$, we refer to the finite set of pairs $\{(b_1,K_1), \ldots, (b_k,K_k)\}$ as a strict multi-set. We allow a more flexible approach in which we do not require (*) to hold since in practice some repetitions of an element b may occur in different contexts, e.g. as K repetitions in one context and L in another, in which case we chose to keep track of these repetitions separately as pairs (b,K) and (b,L) in the same multi-set rather than as a single pair (b,K+L) in the multi-set.

To keep track of the number of times that a particular output is produced, we will represent the range of the input-output function of a data structure operation as a multi-set.

Notation 1 (Input and Output Multiset)

For any data structure operation P we indicate the multi-set of its inputs by $\mathcal{I}_P$. The multi-set of inputs of size n is denoted by $\mathcal{I}_P(n)$. A multi-set of inputs $\mathcal{I}$ for a data structure operation P is a sub multi-set of the input multi-set $\mathcal{I}_P$. Typically we will require that $\mathcal{I} \subseteq \mathcal{I}_P(n)$ for some n.

$\mathcal{O}_P(\mathcal{I})$ denotes the multi-set of outputs, referred to as "the output multi-set", of the computations of a data structure operation P on a multi-set of inputs $\mathcal{I}$.

If $\mathcal{I}_P(n) = \mathcal{I}_n$ for a particular data structure under consideration then we denote the output multi-set $\mathcal{O}_P(\mathcal{I}_n$ by $\mathcal{O}_P(n)$.

It is clear that in case $\mathcal{I}$ is an input multi-set for a data structure operation P, the multi-sets $\mathcal{I}$ and $\mathcal{O}_P(\mathcal{I})$ have the same cardinality where the input-output relation forms the corresponding bijection.

Multi-sets are useful to represent sets of data that are uniformly distributed. A multi-set $A=\{(b_1,K_1), \ldots, (b_k,K_k)\}$ is called uniformly distributed iff $\forall i,j \in \{1, \ldots, n\}. K_i = K_j$. It is clear that if $A=\{(b_1,K_1), \ldots, (b_k,K_k)\}$ is a uniform multi-set then we can simply use the simplified notation $A=\{(B,K)\}$, which indicates that the multi-set A consists of K copies of the set B. In particular: $|A|=K|B|$. Each element of a uniform multi-set A with associated set B arises with equal probability of $$\frac{K}{|A|} = \frac{1}{|B|}.$$

We define a multi-sequence to be a multi-set for which the order of the elements is fixed. A uniformly distributed multi-sequence is a multi-sequence obtained by fixing the ordering of a uniformly distributed multi-set. It will be convenient to work with multi-sequences later on since, for implementation purposes, the order of the elements will be required in order to specify the application of data structure operations to these elements.

In order to formalize the notion of a "uniformly distributed data structure" obtained via "identification up to label-isomorphism", we will introduce the concept of a Random Structure in Section 4.

2.3 Timing Measures

We recall the standard definitions of comparison based algorithms and of Worst-Case Time and Average-Case Time for comparison based algorithms. A comparison based algorithm is an algorithm for which every action during the code execution is determined by a comparison between two elements of the input data structure (e.g. [AHU87]). In particular, every assignment and every swap during the execution of the code is a direct consequence of a comparison between two elements. Most sorting and search algorithms fall into this class and traditional lower bound estimates apply in this context.

Convention 2 We will focus in what follows on measuring the number of comparisons made during the execution of a comparison based algorithm. This simplifies the presentation and is consistent with standard approaches such as [AHU87]. Of course one could fine-tune matters and take into account assignments and swaps, which falls outside the scope of the present paper.

For a comparison based algorithm P we define the enact time $T_P(I)$ on an input I to be the number of comparisons made by the data structure operation P during the computation of the output P(I). The notation $T_P(n)$ indicates the restriction of the function $T_P$ to the set $\mathcal{I}_n$. We will consider subsets $\mathcal{I}$ of $\mathcal{I}_n$ and consider the following time measures with respect to $\mathcal{I}$:

The Total Time of P for inputs from $\mathcal{I}$, denoted by $T_P^t(\mathcal{I})$ is defined by:

$$T_P^t(\mathcal{I}) = \sum_{I \in \mathcal{I}} T_P(I).$$

The Worst-Case Time of P for inputs from $\mathcal{I}$, denoted by $T_P^W(\mathcal{I})$ is defined by:

$$T_P^W(\mathcal{I}) = \max\{T_P(I) | I \in \mathcal{I}\}.$$

The Best-Case Time of P for inputs from $\mathcal{I}$, denoted by $T_P^B(\mathcal{I})$ is defined by:

$$T_P^B(\mathcal{I}) = \min\{T_P(I) | I \in \mathcal{I}\}.$$

The Average-Case Time of P for inputs from $\mathcal{I}$, denoted by $\overline{T}_P(\mathcal{I})$ is defined by:

$$\overline{T}_P(\mathcal{I}) = \frac{T^t(\mathcal{I})}{|\mathcal{I}|} = \frac{\sum_{I \in \mathcal{I}} T_P(I)}{|\mathcal{I}|}.$$

In order to denote an arbitrary measure, which can include any of the above, we use the notation $\mathcal{T}_P$ and the usual corresponding notations $\mathcal{T}_P(\mathcal{I})$ and $\mathcal{T}_P(n)$.

We observe that:

$$\forall \mathcal{I}. \, T_P^B(\mathcal{I}) \leq \overline{T}_P(\mathcal{I}) \leq T_P^W(\mathcal{I}).$$

If the exact time of P is a constant C on the inputs from I then:

$$\overline{T}_P(\mathcal{I}) = T_P^B(\mathcal{I}) = T_P^W(\mathcal{I}) = C.$$

Of course, in case $\mathcal{I} = \mathcal{I}_n$, we will for the Total, Worst-Case, Best-Case and Average-Case Time respectively use the following standard notation based on size indication only: $T_P^t(n)$, $T_P^B(n)$, $T_P^B(n)$ and $\overline{T}_P(n)$.

3 Compositionality

The capacity to generate recurrences is particularly important for the Average-Case Time measure since, in general, the direct determination of the Average-Case Time via the formula $$\overline{T}_P(n) = \frac{\sum_{I \in \mathcal{I}_n} T_P(I)}{|\mathcal{I}_n|}$$

is no feasible. For instance, for the case of sorting algorithms where $|\mathcal{I}_n|=n!$, a direct computation of $$\frac{\sum_{I \in \mathcal{I}_n} T_P(I)}{|n!|}$$

would require an excessive time in order to add the n! comparison times $T_P(I)$ for the inputs I of size n. This is clear by Stirling's approximation $$n! \approx \sqrt{2\pi n}\left(\frac{n}{e}\right)^n.$$

The computation time would be too great, even for the relatively small input size of n =20. If on the other hand one has a recurrence expressing the Average-Case Time, this time can be determined for very large values of n. We will introduce a method, IO-compositionality, which will enable one to derive recurrence equations for the average-case time of compositions of our data structure operations.

3.1 IO-Compositionality

The compositional treatment for time measures that are defined with respect to sets of inputs of a given size, needs a more refined type of bookkeeping via output multi-sets. This is captured by the notion of "IO-Compositionality".

Definition 3 Given a time measure $\mathcal{T}$. Let $P_1$, $P_2$ denote arbitrary data structure operations and $\mathcal{I}$ denotes an input multi-set for $P_1$. We say that:

$\mathcal{T}$ is lower IO-Compositional iff $\forall P_1, P_2\ \forall \mathcal{I}$.

$$\mathcal{T}_{P_1;P_2}(\mathcal{I}) \leq \mathcal{T}_{P_1}(\mathcal{I}) + \mathcal{T}_{P_2}(\mathcal{O}_{P_1}(\mathcal{I}))$$

$\mathcal{T}$ is upper IO-Compositional iff $\forall P_1, P_2\ \forall \mathcal{I}$.

$$\mathcal{T}_{P_1;P_2}(\mathcal{I}) \geq \mathcal{T}_{P_1}(\mathcal{I}) + \mathcal{T}_{P_2}(\mathcal{O}_{P_1}(\mathcal{I}))$$

$\mathcal{T}$ is semi IO-Compositional iff
  $\mathcal{T}$ is lower or upper IO-Compositional
$\mathcal{T}$ is IO-Compositional iff
  $\mathcal{T}$ is lower and upper IO-Compositional, i.e.:

$$\forall P_1, P_2\ \forall \mathcal{I}.\ \mathcal{T}_{P_1;P_2}(\mathcal{I}) = \mathcal{T}_{P_1}(\mathcal{I}) + \mathcal{T}_{P_2}(\mathcal{O}_{P_1}(\mathcal{I}))$$

Lemma 4 The Total Time $T_P^t$ is O-Compositional. The Worst-Case Time $T_P^W$ and the Best-Case Time $T_P^B$ are respectively lower and upper IO-Compositional.

Proof: Given $P_1$, $P_2$ arbitrary data structure operations and $\mathcal{I}$ an input multi-set for $P_1$. We first verify the IO-Compositionality of the Total Time:

$$T_{P_1;P_2}^t(\mathcal{I}) = \sum_{I \in \mathcal{I}} T_{P_1;P_2}(I)$$

$$= \sum_{I \in \mathcal{I}} T_{P_1}(I) + \sum_{J \in O_{P_1}(\mathcal{I})} T_{P_2}(J)$$

$$= T_{P_1}^t(\mathcal{I}) + T_{P_2}^t(\mathcal{O}_{P_1}(\mathcal{I})).$$

For the Best-Case Time and the Worst-Case Time, we observe that for any input $I \in \mathcal{I}$ clearly we must have that $$T_{P_1}^B(I) + T_{P_2}^B(\mathcal{O}_{P_1}(\mathcal{I})) \leq T_{P_1;P_2}(I) = T_{P_1}(I) + T_{P_2}(P_1(I)) \leq T_{P_1}^W(I) + T_{P_2}^W(\mathcal{O}_{P_1}(\mathcal{I})),$$

from which the lower and upper IO-Compositionality for Worst-Case and Best-Case time follows.

Remark 5 The right hand-side of the lower IO-Compositionality inequality for the Worst-Case Time, $T_{P_1}^W(\mathcal{I}.) + T_{P_2}^W(\mathcal{O}_{P_1}(\mathcal{I}))$, is typically used in Real-Time Languages as an upper bound approximation for the Worst-Case Time of a sequential data structure operation composition of the type $T_{P_1;P_2}^W(\mathcal{I}.)$. This provides an example of how compositionality, even in this weak form, aids Software Timing.

We will show that the Worst-Case Time $T_P^W$ and the Best-Case Time $T_P^B$ are in general not IO-Compositional, i.e. the semi IO-Compositionality inequalities can be strict in general. Secondly, we will verify that the Average-Case Time $T_P$ is IO-Compositional.

3.2 Strict Semi IO-Compositionality for Worst-Case and Best-Case Time

We show that IO-Compositionality for Worst-Case Time and Best-Case Time can not be achieved in general, i.e. their semi IO-Compositionality inequalities are strict in general. Hence, as is well-known, the worst-case bounds in a Real-Time context are not exact in general. This is illustrated by the counter-example given below. A similar example can be constructed for the Best-Case Time.

The example displayed on the next page is clearly an artificial one. Yet it illustrates nicely the lack of control one has in guaranteeing IO-compositionality for the Worst-Case Time and (via a similar example) for the Best-Case Time. It is easy to see that this problem arises in many cases, where no apparent pattern seems available to obtain some compositional subclass of sufficient generality.

COUNTER-EXAMPLE 6

Worst-Case Time

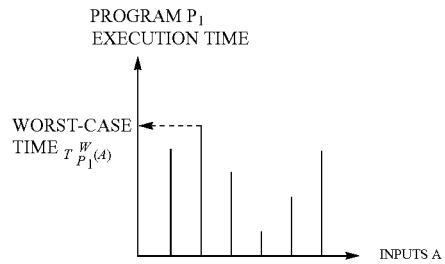

PROGRAM $P_1$ EXECUTION TIME

WORST-CASE TIME $T_{P_1}^W(A)$

INPUTS A

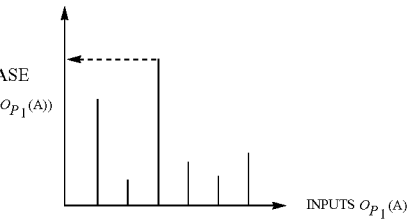

PROGRAM $P_2$ EXECUTION TIME

WORST-CASE TIME $T_{P_2}^W(O_{P_1}(A))$

INPUTS $O_{P_1}(A)$

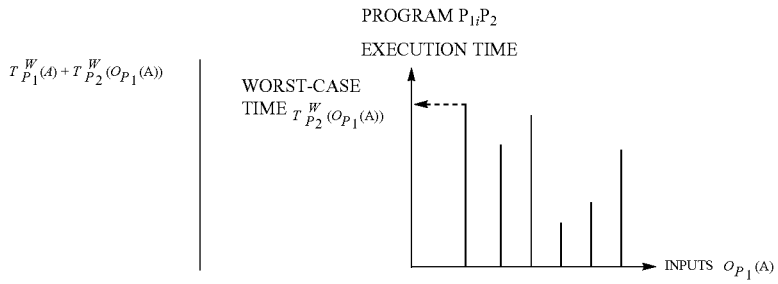

3.3 Average-Case Time is IO-Compositional

Proposition 7 The average-time measure is IO-Compositional, i.e. the following equality holds for any two data structure operations $P_1$, $P_2$, where $P_1$ operates on an input multi-set I and produces the output multi-set $\mathcal{O}_{P_1}(\mathcal{I})$:

$$\overline{T}_{P_1;P_2}(I)=\overline{T}_{P_1}(I)+\overline{T}_{P_2}(\mathcal{O}_{P_1}(\mathcal{I})).$$

Proof:

$$\overline{T}_{P_1;P_2}(\mathcal{I}) = \frac{\sum_{I\in\mathcal{I}} T_{P_1;P_2}(I)}{|\mathcal{I}|}$$
$$= \frac{\sum_{I\in\mathcal{I}} T_{P_1}(I) + \sum_{J\in\mathcal{O}_{P_1}(\mathcal{I})} T_{P_2}(J)}{|\mathcal{I}|}$$
$$= \overline{T}_{P_1}(\mathcal{I}) + \overline{T}_{P_2}(\mathcal{O}_{P_1}(\mathcal{I})),$$

where the last equality follows from the fact that $|\mathcal{I}|=|\mathcal{O}_{P_1}(\mathcal{I})|$.

4 Random Structures

We introduce a formalization of the notion of a Random Structure. This formalization is new and will serve as a basis for the data structures. As mentioned in the previous section, a Random Structure can also be viewed as a formalization of a "uniformly distributed data structure" obtained through identification up to order-isomorphism.

We will define a Random Structure (Definition 10) as a set of labelings on a finite partial order. One could develop the theory in the more general context of directed acyclic graphs, but the lack of transitivity in this context would introduce an additional layer of technicality. Labelings are functions which assign to each element of the partial order a "label". For our purposes, it is convenient to consider labels that are natural numbers equipped with the usual order. One can of course work in general with a countable linear order as the set of labels. In particular, the data structures can incorporate labels that are words, real numbers etc. In the present paper, such a generalization involving labels from an arbitrary linear order can be achieved via minor technical modifications.

We use in the following the notation $\mathcal{L}$ to denote a finite subset of natural numbers. When considering a partial order and an associated set of labels, we implicitly assume that the two sets have the same cardinality. We only consider labelings with elements that are pairwise distinct. This simplifies the presentation and corresponds to a standard assumption when carrying out the complexity analysis of algorithms. For instance, for the case of sorting and searching algorithms, list elements typically are assumed to be distinct [AHU87]. Generalizations allowing for repetitions are of a technical nature and will not be considered here. Of course the operations which we present could be generalized to the case of data structures for which repetition of labels is allowed. In that case the average-case time analysis can be carried out under the assumption that labels are distinct, yielding a good approximation of the true average-case time. We specify below the essential case which is typically considered, i.e. the case where labels are distinct, and remark that for the general case this analysis method again applies in order to give a good approximation of the average-case time.

A Random Structure will be defined as the set of all possible order-consistent labelings of a finite partial order $(X, \sqsubseteq)$ from a set of labels $\mathcal{L}$, i.e. the labelings of a partial order are required to be increasing functions. This allows one to incorporate well-known data structures (cf. Example 12).

We discuss one example at this stage: the data structure of lists. For lists of size n the identification up to order-isomorphism yields as usual the n! permutations over n elements. These can be incorporated as a Random Structure $A_n$ over the discrete partial order which, when labeled in all possible ways from a finite set of labels, say from the set $\{1,\ldots,n\}$, results in the n! permutations.

Other examples of data structures can be incorporated such as Heap-Ordered-Trees and Heaps [AHU87]. A trivial and degenerate example of a Random Structure is the Random Structure over the linear order which allows for a single order-consistent labeling. This is interpreted as a data structure consisting of the sorted list.

4.1 Random Structures

We recall that Random Structures will serve as the fundamental notion of Data Structures. They will be used to represent the set of lists of a given size, the singleton consisting of the sorted list of a given size, the empty data structure, the set of heaps of a given size, etc.

We proceed with formal definitions. The first one defines our concept of a labeling, which is always order-consistent. We recall that $\mathcal{L}\subset(\mathcal{N},\leq)$.

Definition 8 A labeling of a finite partial order $(X, \sqsubseteq)$ from a set of labels $\mathcal{L}$, where $|X|=|\mathcal{L}|$, is an increasing injection $F:X\to\mathcal{L}$.

Of course, it follows from the above definition that labelings are bijections.

Omitting the order in the following notations consists of a slight abuse of notation, which will not cause ambiguities in the paper. Let $(X,\sqsubseteq))$ be a finite partial order. We let m(Y) denote the set of minimal elements of $(Y,\sqsubseteq))$ and M(Y) denote the set of maximal elements of $(Y, \sqsubseteq))$. Let F be a labeling of this partial order. We let m(F) denote the labels for F of minimal elements of $(X,\sqsubseteq))$, i.e. F(m(X)), and we let M(F) denote the labels for F of maximal elements of $(X,\sqsubseteq))$, i.e. F(M(X)). For any subset $\mathcal{A}$ of the set of labels $\mathcal{L}$, we let $m(\mathcal{A})$ denote the labels in $\mathcal{A}$ of minimal elements of $(F^{-1}(\mathcal{A}), \sqsubseteq))$, i.e. $F(m(F^{-1}(\mathcal{A})))$, and we let $M(\mathcal{A})$ denote the labels for F of maximal elements of $(F^{-1}(\mathcal{A}), \sqsubseteq))$, i.e. $F(M(F^{-1}(\mathcal{A})))$.

Finally we use the following notation: $\vee\mathcal{A}$ denotes the maximum label of the set $\mathcal{A}$ while $\wedge\mathcal{A}$ denotes the minimum label of $\mathcal{A}$.

Remark 9 It is quite evident that the greatest (least) label must occur at a maximal (minimal) element.

Definition 10 The Random Structure on a finite partial order $(X, \sqsubseteq))$, with respect to a set of labels $\mathcal{L}$ where $|X|=|\mathcal{L}|$, is the set of all labelings from $\mathcal{L}$ of the partial order. We denote this random structure by: $\mathcal{R}_{\mathcal{L}}(X,\sqsubseteq))$.

Notation: We frequently denote a random structure $\mathcal{R}_{\mathcal{L}}(X,\sqsubseteq))$ by R and in that case refer to the underlying set X and set of labels $\mathcal{L}$ as $X_R$ and $\mathcal{L}_R$.

We remark that the definition of a random structure does not require the underlying partial order to be connected.

Remark 11 Random structures, $\mathcal{R}_{\mathcal{L}_1}(X,\sqsubseteq))$ and $\mathcal{R}_{\mathcal{L}_2}(X,\sqsubseteq))$, of a given partial order $(X, \sqsubseteq))$ and obtained for two different sets of labels, $\mathcal{L}_1$ and $\mathcal{L}_2$, can easily be seen to be label-isomorphic, i.e. there exists an order preserving bijection $\Psi((\mathcal{L}_1,\mathcal{L}_2))$ from the linear order $(\mathcal{L}_1,\leq)$ to the linear order $(\mathcal{L}_2,\leq)$, where $\leq$ is the usual order on the natural numbers, such that $\mathcal{R}_{\mathcal{L}_2}(X,\sqsubseteq))=\{\Psi((\mathcal{L}_1,\mathcal{L}_2))\circ F|F\in \mathcal{R}_{\mathcal{L}_1}(X,\sqsubseteq))\}$. So if $\mathcal{L}_1=\{a_1,\ldots,a_n\}$ and $\mathcal{L}_2=\{b_1,\ldots,b_n\}$ where $\forall i\in\{1,\ldots,n-1\}$. $a_i<a_{i+1}$ and $b_i<b_{i+1}$ then $\forall i\in\{1,\ldots,n\}$. $\Psi_{(\mathcal{L}_1,\mathcal{L}_2)}(a_i)=b_i$. We refer to the unique equivalence class for the equivalence relation "label-isomorphic" as the random structure $\mathcal{R}(X,\sqsubseteq))$ of a partial order $(X, \sqsubseteq))$.

Moreover, for the purpose of time analysis, we will focus on data structures, referred to as Random Structures, for which the labels are pairwise distinct. This is however not an essential requirement. Any operation on data structures which extends the ones we give below to the context where labels are no longer pairwise distinct, allows for an average-time analysis estimation in a similar way.

It is easy to see that random structures allow one to incorporate traditional labeled data structures, including heaps, unordered lists, sorted lists, . . . , as long as the labelings respect the underlying order. We illustrate this in the next example.

EXAMPLE 12

In each part of the example, we display the Hasse Diagram of the given partial order on the left and the labelings on the right. In each case the underlying set consists of elements $\{x_1,\ldots,x_n\}$, while the labels are the set of indices $\{1,\ldots,n\}$. Part c) illustrates that random structures incorporate the case of lists in a natural way.

a)

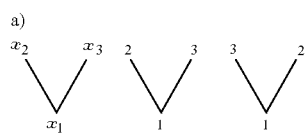

The random structure $\mathcal{R}_{\mathcal{L}}(X,\sqsubseteq))$ consists of the labelings $F_1$ and $F_2$, where:

$F_1=\{(x_1,1),(x_2,2),(x_3,3)\}$ and $F_2=\{(x_1,1),(x_2,3),(x_3,2)\}$.

b)

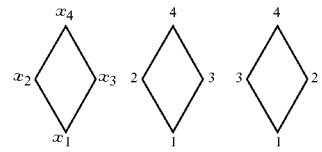

The random structure $\mathcal{R}_{\mathcal{L}}(X,\sqsubseteq))$ consists of the labelings $F_1$ and $F_2$, where:

$F_1=\{(x_1,1),(x_2,2),(x_3,3),(x_4,4)\}$ and $F_2=\{(x_1,1),(x_2,3),(x_3,2),(x_4,4)\}$.

c) Consider the partial order $(X,\sqsubseteq))$ over the set $\{x_1,x_2,\ldots,x_n\}$ equipped with the discrete order, i.e. $x\neq y \Rightarrow x\not\sqsubseteq y$ and $y\not\sqsubseteq x$. The random structure $\mathcal{R}_{\mathcal{L}}(X,\sqsubseteq))$ consists of all n! permutations of labels on the elements of X and can be interpreted as the set of lists of size n. We will denote in the following such a random structure by $\mathcal{A}_n$ where $\mathcal{A}$ stands for "Atomic".

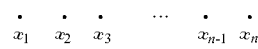

d) Consider the partial order $(X,\sqsubseteq))$ over the set $\{x_1,x_2,\ldots,x_n\}$ equipped with a linear order. The random structure $\mathcal{R}_{\mathcal{L}}(X,\sqsubseteq))$ consists of a single labeling, denoted by $S_n$, which can be interpreted as the sorted list.

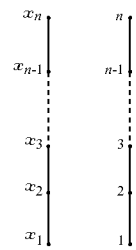

e) We denote the following four-element random structure by N

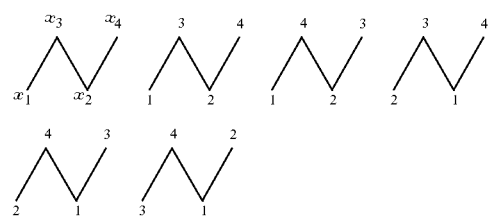

The random structure N consists of the labelings $F_1,\ldots,F_5$, where $F_1=\{(x_1,1),(x_2,2),(x_3,3),(x_4,4)\}$, $F_2=\{(x_1,1),(x_2,2),(x_3,4),(x_4,3)\}$, $F_3=\{(x_1,2),(x_2,1),(x_3,3),(x_4,4)\}$, $F_4=\{(x_1,2),(x_2,1),(x_3,4),(x_4,3)\},$ $F_5=\{(x_1,3),(x_2,1),(x_3,4),(x_4,2)\}.$ f) Finally, we remark that heaps can be represented as random structures over a partial order which has a tree as Hasse Diagram. Heaps of size n are denoted by $\mathcal{H}_n$. For instance, the random structure $\mathcal{H}_{3_3}$ determined by the following Hasse Diagram and label set $\{1, 2, 3, 4\}$ consists exactly of three labelings as can easily be verified.

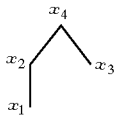

Similarly, Heap Ordered Trees in general can be represented in this way.

It is obvious that the cardinality of Random Structures over partial orders with n elements lies between 1 and n! included.

4.2 Floor and Ceiling Functions

We introduce "floor" and "ceiling" functions for elements of partial orders. For a partial order $(X,\sqsubseteq)$ and an element $x \in X$, we define $\lceil x \rceil$ to be the set of all elements immediately and strictly above $x$, i.e.

$\lceil x \rceil = \{y \mid y \sqsupset_1 x\}.$

Similarly, we define:

$\lfloor x \rfloor = \{y \mid y \sqsubset_1 x\}.$

For a discrete subset Y of X, we define:

$\lceil Y \rceil = \cup_{y \in Y} \lceil y \rceil$ $\lfloor Y \rfloor = \cup_{y \in Y} \lfloor y \rfloor.$ Given a labeling F with range $\mathcal{L}_y$, the floor and ceiling of a label $a \in \mathcal{L}$, and of a set of labels, are defined as follows:

$\lceil a \rceil = F(\lceil F^{-1}(a) \rceil)$ $\lfloor a \rfloor = F(\lfloor F^{-1}(a) \rfloor).$ For a subset $\mathcal{A}$ of $\mathcal{L}$, we define:

$\lceil \mathcal{A} \rceil = F(\lceil F^{-1}(\mathcal{A}) \rceil)$ $\lfloor \mathcal{A} \rfloor = F(\lfloor F^{-1}(\mathcal{A}) \rfloor).$ Of course, we have:

$a \in \lceil b \rceil \Rightarrow a > b$ $a \in \lfloor b \rfloor \Rightarrow a < b.$

EXAMPLE 13

For the labelings displayed in the example, we have that:

$\lceil 2 \rceil = \{3,5\}, \lfloor 2 \rfloor = \{1\}, \lceil 4 \rceil = \{5\}, \lfloor 4 \rfloor = \{1\}, \lceil 5 \rceil = \emptyset$ and $\lfloor 5 \rfloor = \{2,4\}.$

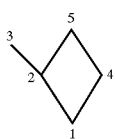

4.3 Random Structure Preserving Functions

We will define operations that transform a random structure $\mathcal{R}_\mathcal{L}(X,\sqsubseteq_1)$ into a multi-sequence of random structures $(((\mathcal{R}_{\mathcal{L}_1}(X_1,\sqsubseteq_{1_1}), K_1), \ldots, (\mathcal{R}_{\mathcal{L}_n}(X_n,\sqsubseteq_n) K_n))$, where $\forall i \in \{1, \ldots, n\} \mathcal{L}_i \subset \mathcal{L}$. Such operations will be called random structure preserving operations, or RS-preserving operations. The label sets $\mathcal{L}_i$ are subsets of the original label set $\mathcal{L}$ since the operations include a deletion operation which may remove some labels.

We introduce the notion of a refinement in the following. Random operations "refine" the original partial order in that the newly created partial orders of the resulting sequence have underlying sets $X_i$ that are subsets of the original set X and have orders $\sqsubseteq_i$ that are finer than, i.e. include, the restriction of the original partial order $\sqsubseteq$ to the new set $X_i$ under consideration. We formalize this below.

Definition 14 Let $R=\mathcal{R}_\mathcal{L}(X,\sqsubseteq)$ and $\forall i \in \{1,\ldots,n\}. R_i=\mathcal{R}_{\mathcal{L}_i}(X_i,\sqsubseteq_i)$, where $\forall i \in \{1,\ldots,n\}. \mathcal{L}_i \subset \mathcal{L}$ and $\forall i \in \{1,\ldots,n\}. X_i \subset X$ and $\forall x,y \in X_i. x \sqsubseteq y \Rightarrow x \sqsubseteq_i y$. We call any sequence of random structures $(R_1, \ldots, R_n)$ satisfying this condition a refinement of the random structure R. We also refer to $\mathcal{L}_i$ as a refinement of the label set $\mathcal{L}$ and to each $(X_i,\sqsubseteq)$ as a refinement of the partial order $(X,\sqsubseteq)$.

The operations typically transform random structures R into a refinement $(R_1, \ldots, R_n)$ of R; more precisely they determine refining functions.

Notation 15 We use the following notation: U, referred to as the universe, is a countable list of variables, say $U=\{u_n \mid n \in \mathcal{N}\}$. We denote the set of all finite partial orders over U by $PO_{fin}(U)=\{(X,\sqsubseteq) \mid X \subseteq U$ and $(X,\sqsubseteq)$ is a finite partial order.$\}.$ The set of all labelings over partial orders from $PO_{fin}(U)$ is denoted by $\mathcal{F}$, i.e.:

$\mathcal{F}=\{F \mid F:(X,\sqsubseteq) \rightarrow \mathcal{N}, (X,\sqsubseteq) \in PO_{fin}(U)$ and F is a labeling$\}.$ Definition 16 A function $\phi: \mathcal{F} \rightarrow \mathcal{F}$ is refining on R if there exists a refinement $(R_1, \ldots, R_n)$ of R such that $\phi: R \rightarrow R_1 \cup \ldots \cup R_n$ is surjective.

Definition 17 In case we have determined a refinement $(R_1, \ldots, R_n)$ of R, based on which we can establish that the function $\phi$ is refining on R, then we refer to $\phi$ in combination with this particular selection of a refinement as a representation for $\phi$. Such a representation is denoted as follows: $\phi: R \mapsto (R_1, \ldots, R_n).$ The following definition formalizes the notion of Random Structure Preservation.

Definition 18 A function $\mu: \mathcal{F} \rightarrow \mathcal{F}$ is Random Structure preserving on a random structure R (RS-preserving on a random structure R) iff there exists a partition $\mathcal{F}_1, \ldots, \mathcal{F}_n$ of R, a refinement $(R_1, \ldots, R_n)$ of R and non-zero natural numbers $K_1, \ldots, K_n$ such that $\forall F \in R_i \cdot |\mu^{-1}(F) \cap \mathcal{F}_i|=K_i.$ The function $\mu$ is called strongly RS-preserving if and only if n =1.

Remark 19 1) Note that since multiplicities are required to be non-zero, we obtain, following the notation of Definition 18, that: $\forall i \in \{1, \ldots, n\} \cdot \mu(\mathcal{F}_i)=R_i.$ 2) The definition of RS-preservation is more general than the informal use of randomness preservation in the literature. The informal use of randomness preservation only regards the preservation of the uniform distribution and does not deal with Random Structures. We capture uniform distribution preservation in case a random structure is mapped to a single random structure and no non-trivial multiplicity is involved (i.e. K=1). This is captured in our context by the notion of a strongly RS-preserving function with multiplicity 1. RS-preserving functions in our context, map a random structure to a multi-sequence of random structures.

Remark 20 It is clear that the definition of RS-preservation could be simplified in case the random structures $R_1, \ldots, R_n$ have pairwise disjoint underlying partial orders. In that case the definition is equivalent to the following:

$$\forall F \in R_i \cdot |\mu^{-1}(F)| = K_i.$$

Of course, one can always guarantee that the random sequence $(R_1, \ldots, R_n)$ is such that the underlying partial orders are pairwise disjoint by identifying random structures with the same, i.e. order-isomorphic, underlying partial orders and by adjusting the multiplicities accordingly. We prefer to keep the more general version of RS-preservation at this time, since identification of order-isomorphic partial orders in practice may be costly.

The generalization is important and lifts the applications from rather straightforward reasonings on preservation of uniform distribution based on strong random structure preservation to more intricate applications of a wider scope.

Definition 21 In case we have determined a refinement $(R_1, \ldots, R_n)$ of R with multiplicities $K_1, \ldots, K_n$ with respect to some partition $\mathcal{F}_1, \ldots, \mathcal{F}_n$, based on which we can establish that the function $\mu$ is RS-preserving on R, then we refer to $\mu$ in combination with this particular selection of a refinement, partition and multiplicities as an RS-representation for $\mu$. Such an RS-representation for $\mu$ is denoted as follows:

$$\mu(\mathcal{F}_1, \ldots, \mathcal{F}_n): R \mapsto ((R_1, K_1), \ldots, (R_n, K_n)).$$

Definition 22 A partition $(\mathcal{F}_1, \ldots, \mathcal{F}_n)$ is uniform iff all members of the partition have the same cardinality, i.e. $|\mathcal{F}_1| = |\mathcal{F}_2| = \ldots = |\mathcal{F}_n|$. The function $\mu$ is called uniformly RS-preserving iff it has an RS-presentation $\mu(\mathcal{F}_1, \ldots, \mathcal{F}_n): R \mapsto ((R_1, K_1), \ldots, (R_n, K_n))$ for which the partition $(\mathcal{F}_1, \ldots, \mathcal{F}_n)$ is uniform.

Remark 23 Strongly RS-preserving functions are (trivially) uniformly RS-preserving since their representations have partitions of cardinality one.

Notation 24 Typically, and with some abuse of notation, we will not mention the partition involved for RS-representations:

$$\mu: R \mapsto ((R_1, K_1), \ldots, (R_n, K_n)).$$

The motivation behind this shorter notation is that once our choice for the refining sequence, the partition and the corresponding multiplicities have been determined, we only need the resulting random sequence in order to determine the average-case time.

Definition 25 A random sequence is a finite sequence of pairs, $((R_1, K_1), \ldots, (R_n, K_n))$, each of which consists of a random structure R paired with a multiplicity K.

We extend RS-preserving functions from random structures to random sequences as follows:

Definition 26 (RS-preservation on a random sequence)
If $((R_1, K_1), \ldots, (R_n, K_n))$ is a random sequence and t is RS-preserving on each of the random structures $R_1, \ldots, R_n$, where $$\forall i \in \{1, \ldots n\} \cdot \mu: R_i \mapsto ((R_i^1, K_i^1), \ldots, (R_i^{ni}, K_i^{ni})),$$

then we denote this by:

$$\mu: ((R_1, K_1), \ldots, (R_n, K_n)) \mapsto ((R_1^1, K_1^1 \times K_1), \ldots, (R_1^{n1}, K_1^{n1} \times K_1), \ldots, (R_n^1, K_n^1 \times K_n), \ldots, (R_n^{nn}, K_n^{nn} \times K_n)).$$

We say in that case that:
$\mu$ is RS-preserving on the random sequence $((R_1, K_1), \ldots, (R_n, K_n))$.

We omit the straightforward verification of the following two results.

Proposition 27 If $\mu: ((R_1, K_1), \ldots, (R_n, K_n)) \mapsto ((R_1^1, K_1^1 \times K_1), \ldots, (R_1^{n1}, K_1^{n1} \times K_1), \ldots, (R_n^1, K_n^1 \times K_n), \ldots, (R_n^{nn}, K_n^{nn} \times K_n))$ then:

$$\sum_{i=1}^{n} K_i \times |R_i| = \sum_{i=1}^{n} \sum_{j=1}^{n_i} K_i \times K_i^j \times |R_i^j|.$$

Lemma 28 The composition of RS-preserving functions on random sequences is RS-preserving.

For strongly RS-preserving functions, Proposition 27 yields the following immediate corollary.

Corollary 29 If $\mu: R_1 \mapsto R_2$ is a strongly RS-preserving function then $|R_2|$ divides $|R_1|$.

Remark 30 Note that no zero-value problem arises with the above division since for every random structure R one has $|R| \geq 1$. Indeed, if R is the random structure over the empty set, then $|R| = 1$ where R consists of the "empty function".

Definition 31 Random structures that are the image of some discrete random structure $A_k$ for a (strongly) RS-preserving function are called A-constructible (Atomic-constructible).

To illustrate a basic application of Corollary 29, we remark that the random structure $\mathcal{N}$ of Example 12, part (e), is not $\mathcal{A}$-constructible. Indeed, the cardinality of $\mathcal{N}$ is 5 which does not divide the cardinality 24 of the discrete four-element random structure.

4.4 Isolated Subsets

We introduce the notion of an isolated subset of a partial order. Isolated subsets have the following important property: given a Random Structure $\mathcal{R}(X, \sqsubseteq)$ then the restriction of the labelings of this Random Structure to an isolated subset Y forms, after identification up to order-isomorphism, a number of copies of the Random Structure $\mathcal{R}(Y, \sqsubseteq)$.

The notion of an isolated subset will be useful to allow the extension of our operations from a definition on the random structure determined by an isolated subset of a given Random Structure to the entire Random Structure. Conversely, isolated subsets are useful to define a notion of projection of a given Random Structure to the Random Structure determined by the given isolated subset.

An informal definition of an isolated subset I is that I is a subset of the underlying set of a Random Structure for which the extremal elements (with respect to the restriction of the order to the set I) are the only exit and entrance points of the set I to related points in the complement, which motivates the choice of the adjective isolated. This is captured by condition 1 of Definition 32. Moreover, we require that every point that does not belong to the set I and is directly above a maximal (directly below a minimal) element of I must be directly above (directly below) every maximal (minimal) element of I, which is captured by condition 2 of Definition 32. We formalize this in the following definition.

Definition 32 Given a finite partial order $(X, \sqsubseteq)$. A subset I of X is isolated iff it satisfies the following three conditions:

$$\lfloor I - m(I) \rfloor \subseteq I \text{ and } \lceil I - M(I) \rceil \subseteq I \qquad 1$$

$$\forall x, y \in m(I) \cdot \lfloor x \rfloor = \lfloor y \rfloor \qquad 2$$

$$\forall x, y \in M(I) \cdot \lceil x \rceil = \lceil y \rceil \qquad 3$$

An atomic isolated subset, or $\mathcal{A}$-isolated subset, is an isolated subset of a partial order for which the restriction of the order to the isolated subset is the discrete order.

Since a component of a partial order has no outside connections, clearly every component of a partial order (cf. Section 2.1) is isolated and thus any set of components of a partial order is isolated.

EXAMPLE 33

We consider a partial order with Hasse diagram as displayed below. The isolated sub set I is determined by the elements contained in the ellipse on the diagram.

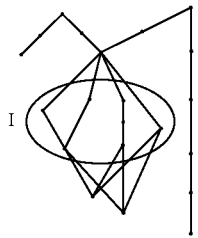

EXAMPLE 34

The Hasse diagram below provides an example where the set $\{x_3, x_4\}$ does not form an atomic isolated set, while $\{x_4, x_5\}$ forms an atomic isolated set.

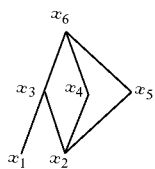

We define the useful notion of completely connected subsets of a partial order and proceed to give an alternative characterization of a isolated subset.

Definition 35 Given a partial order $(X, \sqsubseteq)$ and a pair of subsets A and B of X. The set A is said to be completely below B and B is said to be completely above A iff $$\{(x,y) | x \in A, y \in B, x \sqsubseteq [y]\} = A \times B.$$

The sets A and B are said to be completely connected (cc) $\Leftrightarrow$ A is completely below B or A is completely above B.

Remark 36 If A is completely below B then A and B are discrete sets and $A \cap B = \emptyset$.

We continue Example 33 below and illustrate the sets A=M(I) and B=⌈M(I)⌉ which are completely connected and the sets C=⌊m(I)⌋ and D=m(I) which are completely connected. We remark that the sets A, B, C and D are discrete subsets.

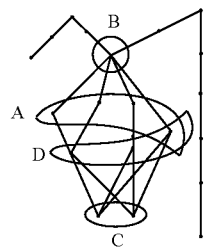

Remark 37 If at least one of the sets A or B is empty then the pair A and B is completely connected.

Lemma 38 Given a finite partial order $(X, \sqsubseteq)$. A subset I of X is isolated iff it satisfies the following three conditions:

$\lfloor I-m(I) \rfloor \subseteq I$ and $\lceil I-M(I) \rceil \subseteq I$  1

$\lfloor m(I) \rfloor$ is completely below m(I)  3

M(I) is completely below $\lceil M(I) \rceil$.  3

Proof: Exercise.

Remark 39 If I is an isolated subset of $(X, \sqsubseteq)$ then every component of I with respect to the restricted partial order $(I, \sqsubseteq)$ is also an isolated subset of the given partial order.

We illustrate Remark 39 via the Example 33, where the set I consists of three isolated components displayed below.

$\bigvee_{I_1} \quad \big|_{I_2} \quad \cdot I_3$

Finally, we define the result of removing an isolated subset from a given partial order.

4.4.1 Strictly Isolated Subsets

We define the notion of a strictly isolated subset of a partial order. In order to do this, the notion of a seam is useful.

Definition 40 A seam of a partial order $(X, \sqsubseteq)$ is a pair (A, B) of subsets A, B of X such that:
a) A is completely below B
b) $A \neq \emptyset$, $B \neq \emptyset$ and $(A\downarrow) \cup (B\uparrow) = X$

EXAMPLE 41

In the example below the pair (A,B) forms a seam of the given partial order.

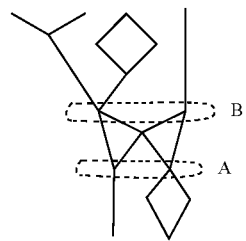

Comment: By condition b) and Remark 36 one has $|X| \geq 2$.

We leave the proofs of Lemma 42, Lemma 44 and Corollary 45 as an exercise.

Lemma 42 If (A,B) is a seam of $(X, \sqsubseteq)$ then $F(A\downarrow)$ and $F(B\uparrow)$ are independent of F, i.e. $\forall F_1, F_2 \in \mathcal{R}\mathcal{L}(X, \sqsubseteq)$. $F_1(A\downarrow) = F_2(A\uparrow)$ and $F_1(B\downarrow) = F_2(B\uparrow)$.

Notation 43 If (A,B) is a seam of $(X,\sqsubseteq)$ and $F \in \mathcal{R}_{\mathcal{L}}(X,\sqsubseteq))$ then $\mathcal{L}_A = F(A\downarrow)$ and $\mathcal{L}_B = F(B\uparrow)$.

Lemma 44 $\mathcal{R}_{\mathcal{L}}(X,\sqsubseteq)) = \{F_1 \cup F_2 | F_1 \in \mathcal{R}_{\mathcal{L}_A}(A\downarrow,\sqsubseteq)), F_2 \in \mathcal{R}_{\mathcal{L}_B}(B\uparrow,\sqsubseteq))\}$.

Corollary 45 $|\mathcal{R}_{\mathcal{L}}(X,\sqsubseteq))| = |\mathcal{R}_{\mathcal{L}_A}(A\downarrow,\sqsubseteq))| \times |\mathcal{R}_{\mathcal{L}_B}(B\uparrow,\sqsubseteq))|$.

Definition 46 A strictly isolated subset I of a partial order $(X,\sqsubseteq)$ is a subset for which:
  a) $\lfloor m(I) \rfloor \neq \emptyset \Rightarrow (\lfloor m(I)\rfloor, m(I))$ forms a seam.
  b) $\lceil M(I) \rceil \neq \emptyset \Rightarrow (M(I), \lceil M(I)\rceil)$ forms a seam.

An atomic strictly isolated sub set of a partial order is a strictly isolated subset for which the restriction of the order to this subset is the discrete order.

Notation 47 If $(X,\sqsubseteq)$ is a partial order and $A \subseteq X$ then $$\overline{A} = \lceil M(A) \rceil \uparrow \text{ and } \underline{A} = \lfloor m(A) \rfloor \downarrow.$$

Lemma 48 Every strictly isolated subset of a partial order is isolated.

Proof: If $(X,\sqsubseteq)$ is a partial order and I is a strictly isolated subset of this partial order then clearly $X - I = \overline{I} \cup \underline{I}$. The result follows since I is completely below $\overline{I}$ and $\underline{I}$ is completely below I.

Remark 49 The empty set $\emptyset$, the set X, and every union of components of X are isolated since for each such set A: $\lfloor m(A) \rfloor = \lceil M(A) \rceil = \emptyset$.

EXAMPLE 50

The partial order displayed below has the set $I = \{x_1, x_2, x_3, x_4\}$ as isolated set, where the relations of its Hasse Diagram are indicated via dotted lines. I is an example of a strictly isolated subset.

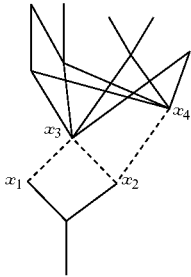

Definition 51 Given a partial order $(X,\sqsubseteq)$, we define the following sets:

$I(X,\sqsubseteq)) = \{Y | Y \text{ is an isolated subset of } (X,\sqsubseteq))\}$ $AI(X,\sqsubseteq)) = \{Y | Y \text{ is an atomic isolated subset of } (X,\sqsubseteq))\}$ $SI(X,\sqsubseteq)) = \{Y | Y \text{ is a strictly isolated subset of } (X,\sqsubseteq))\}$ $ASI(X,\sqsubseteq)) = \{Y | Y \text{ is an atomic strictly isolated subset of } (X,\sqsubseteq))\}$ Clearly we have that $SI \subseteq I$ and $AI \subseteq I$ and $ASI = SI \cap AI$.

As mentioned in the introduction to this Section, isolated subsets possess an important property in that the restriction of all labelings of a random structure to the isolated subset forms multiple copies of the Random Structure over this isolated subset. This is captured by Proposition 54 below. We first need the following technical lemma.

Lemma 52 In case I is an isolated subset of X we also have that:

$\mathcal{R}_{\mathcal{L}}(X,\sqsubseteq)) = \cup_{F \in} \mathcal{R}_{\mathcal{L}}(X,\sqsubseteq))$
$\{F \mathcal{R}_{\mathcal{L}}(X-I) \cup G | G \in \mathcal{R}_{\mathcal{L}_{F(X-I)}}(I,\sqsubseteq))\}$ and  1

$\mathcal{R}_{\mathcal{L}}(X,\sqsubseteq))| = |(F \in \mathcal{R}_{\mathcal{L}}(X-I) | F \in \mathcal{R}_{\mathcal{L}}(X,\sqsubseteq))\} | \times |R(I,\sqsubseteq))|$  2

In case I is strictly isolated we also have that:

$|\mathcal{R}_{\mathcal{L}}(X,\sqsubseteq))| = |\mathcal{R}_{(M(I)\uparrow,\sqsubseteq))}| \times |\mathcal{R}_{(I,\sqsubseteq))}| \times |\mathcal{R}_{\lfloor m(I) \rfloor \downarrow,\sqsubseteq))}|$  3

Proof: We leave 1) and 3) as an exercise and sketch the proof for 2). To show 2), we consider the set consisting of the restrictions of the labelings of $\mathcal{R}_{\mathcal{L}}(X,\sqsubseteq))$ to the set X-I, i.e. the set $\{F \mathcal{R}_{\mathcal{L}}(X-I) | F \in \mathcal{R}(X,\sqsubseteq))\}$. We refer to a labeling G in this set as an "outer labeling". We define an equivalence relation on the set of labelings $\mathcal{R}_{\mathcal{L}}(X,\sqsubseteq))$ as follows: two labelings are equivalent iff they give rise to the same outer labeling. It is clear that two labelings are equivalent iff they differ only on I. Using 1), we obtain that the resulting quotient consists of equivalence classes of size $K_I = |\mathcal{R}(I,\sqsubseteq))|$. In other words, $|\mathcal{R}_{\mathcal{L}}(X,\sqsubseteq))| = M \times K_I$, where M is the cardinality of the quotient, i.e. $M = |\{F \mathcal{R}_{\mathcal{L}}(X-I) \in \mathcal{R}(X,\sqsubseteq))\}|$.

Notation 53 Consider a random structure $R = \mathcal{R}_{\mathcal{L}}(X,\sqsubseteq))$ and $Y \subseteq X$. We use the following notation: $R \mathcal{R}_{\mathcal{L}} Y$ is the multiset consisting of all restrictions of labelings from R to the subset Y, in other words: $R \mathcal{R}_{\mathcal{L}} Y = \{(F \mathcal{R}_{\mathcal{L}} Y, k) | k = \text{Card}(\{G \in R | G \mathcal{R}_{\mathcal{L}} Y = F \mathcal{R}_{\mathcal{L}} Y\})\}$.

We use the following notation: $\approx$ for the identity up to label-isomorphism.

Proposition 54 Let $R = \mathcal{R}(X,\sqsubseteq))$, $Y \subseteq X$ and $$K = \frac{|\mathcal{R}(X,\sqsubseteq)|}{|\mathcal{R}(Y,\sqsubseteq)|}.$$

$Y \in I(X,\sqsubseteq)) \Rightarrow_R \mathcal{R}_{\mathcal{L}} Y \approx (\mathcal{R}_{(Y,\sqsubseteq)},K)$.  1

$Y \in AI(X,\sqsubseteq)) \Rightarrow R|Y \approx (\mathcal{A}_{|Y|},K)$.  2

$Y \in SI(X,\sqsubseteq)) \Rightarrow K = |\mathcal{R}_{(\lceil M(Y)\rceil\uparrow,\sqsubseteq))}| \times |\mathcal{R}_{(\lfloor m(Y)\rfloor\downarrow,\sqsubseteq))}|$.  3

Proof: We sketch the proof: 1) and 3) follow directly from Lemma 52 b) and c). 2) is an easy consequence of 1).

We illustrate these results on some basic examples below.

EXAMPLE 55

The isolated subset Y in the four element binary tree $(X,\sqsubseteq))$ displayed below is indicated via the ellipse as the right-most leaf of the tree. The restriction of the three indicated labelings to this leaf yields the following labels for the leaf: 1, 1 and 2 and thus the restriction to the isolated subset yields $K = 3$ copies of the random structure $\mathcal{A}_1$. Note that $|\mathcal{R}(X,\sqsubseteq))| = 3$ and $|\mathcal{R}(Y,\sqsubseteq))| = 1$ and $$K = \frac{3}{1}.$$

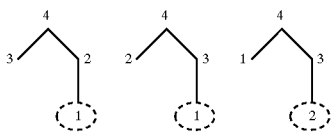

In the following example the strictly isolated subset indicated by the two elements contained in the ellipse. The restrictions of the labelings to this strictly isolated subset consists of K=2 copies of the random structure $\mathcal{A}_3$. Note that $|\mathcal{R}(X,\sqsubseteq)|=4$ and $|\mathcal{R}(Y,\sqsubseteq)|=2$ and $$K = \frac{4}{2}.$$

Moreover, we have $K=|\mathcal{R}[(M(Y)]\uparrow,\sqsubseteq)|\times|\mathcal{R}(m(Y)\downarrow\sqsubseteq)|=2\times 1$.

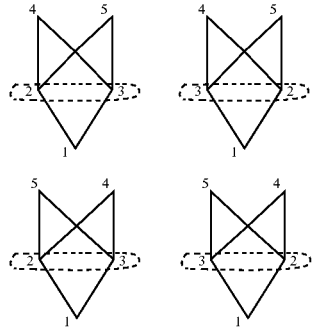

Finally, we present an example of a non-isolated subset Y of which the elements again are contained in the ellipse below. The restriction of the labelings to this subset do not form a number of copies of a random structure. Indeed, the restriction of the final labeling to Y, with labels 4 and 2 on Y, only represents one labeling of the newly created restricted discrete two-element partial order (Y,=), while the second labeling of (Y,=), with the labels 2 and 4, is missing.

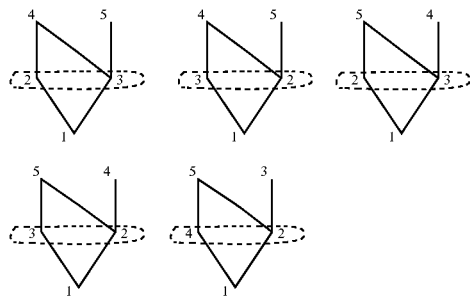

The notion of an atomic isolated subset introduced in Definition 32 will be useful in defining the operation "random split".

An atomic isolated subset intuitively forms a discrete subset in a random structure for which any labeling, when restricted to this set, forms a set of pairwise free labels. i.e. the labels simply can be permuted on this set without violating the labeling condition. The following Lemma captures this idea. The proof of the following Lemma is a trivial exercise. In fact one can show that the two conditions stated in Lemma 56 are equivalent. The verifications are of a technical nature and we omit them at this stage since we will only avail of the implication below.

Lemma 56 Given a random structure $\mathcal{R}(X,\sqsubseteq)$. If I is an atomic isolated subset I of X then $\forall F \in \mathcal{R}(X,\sqsubseteq)$. F(I) is a free set of labels for F.

Remark 57 This fact enables one to easily determine, for two given elements of an isolated atomic multiset, what the probability is that the label of the first element is smaller than the label of the second element. Indeed, it is easy to see that these events are independent and that the probability is ½. For atomic strictly isolated subsets I of a given random structure $\mathcal{R}\mathcal{R}(X,\sqsubseteq)$, the probability that an element $x$ has a given label a is again easy to determine. The probability that an element $x$ has a given label a is $$\frac{1}{|I|}$$

whenever $a \in \{F(I)|F \in \mathcal{R}(X,\sqsubseteq)\}$ and 0 otherwise, since $|\{F(I)|F \in \mathcal{R}(X,\sqsubseteq)\}|=|I|$. This will be of use in the time verification of conditional statements.

Proposition 58 1) I is strictly isolated $\Leftrightarrow \underline{I}$ and $\overline{I}$ are strictly isolated and $X-I=\underline{I}\cup\overline{I}$.

2) $\underline{I}=\emptyset$ or $\overline{I}=\emptyset \Rightarrow$ (I is strictly isolated $\Leftrightarrow$ X−I is strictly isolated).

Proof: To verify 1), we show that in case I is strictly isolated, both $\underline{I}$ and $\overline{I}$ are strictly isolated. The converse is left as an exercise.

Assume that I is strictly isolated. Then:

a) $\lfloor m(I) \rfloor \neq \emptyset \Rightarrow (\lfloor m(I) \rfloor, m(I))$ forms a seam.

b) $\lceil M(I) \rceil \neq \emptyset \Rightarrow (M(I),\lceil M(I) \rceil)$ forms a seam.

If $\lfloor m(I) \rfloor = \emptyset$ then we know that $I = (\lfloor m(I) \rfloor = \emptyset) \downarrow = \emptyset$ and hence $\underline{I}$ is strictly isolated. Similarly $\overline{I}$ is strictly isolated in case $\lceil M(I) \rceil = \emptyset$. Thus we can assume that $\lfloor m(I) \rfloor \neq \emptyset$ and $\lceil M(I) \rceil \neq \emptyset$. We remark that in particular $(*) I \neq \emptyset$.

By a) and b) we obtain that: $(\lfloor m(I) \rfloor, m(I))$ and $(M(I),\lceil M(I) \rceil)$ each form a seam.

We verify that $\overline{I}$ is strictly isolated. The proof for $\underline{I}$ is similar. Note $\lceil M(\overline{I}) \rceil = \lceil M(\lceil M(I) \rceil \uparrow) \rceil = \lceil M(X) \rceil = \emptyset$ However $\lfloor m(\overline{I}) \rfloor = \lfloor m(\lceil M(I) \rceil \uparrow) \rfloor = \lfloor \lceil M(I) \rceil \rfloor = M(I)$ where the last two equalities follow from the fact that $(M(I),\lceil M(I) \rceil)$ forms a seam.

Since by (*) we know that $I \neq \emptyset$, we obtain that $M(I) \neq \emptyset$ and hence $\lfloor m(\overline{I}) \rfloor \neq \emptyset$.

Hence, in order to verify that $\overline{I}$ is strictly isolated, it suffices to verify that $(\lfloor m(\overline{I}) \rfloor, m(\overline{I}))$ forms a seam. But this follows since we have verified above that $\lfloor m(\overline{I}) \rfloor = M(I)$ and $m(\overline{I}) = \lceil M(I) \rceil$ and since $(M(I),\lceil M(I) \rceil)$ is a seam.

We proceed to verify 2) under the assumption that I is a subset which satisfies $\overline{I} = \emptyset$. The case where $\underline{I} = \emptyset$ is similar.

We show that I strictly isolated implies that X−I is strictly isolated. The converse is shown in a similar way.

Since $\overline{I} = \emptyset$, we obtain that $\lceil M(I) \rceil \uparrow = \emptyset$ and hence, since I is strictly isolated, we know that $X-I=\underline{I}$. By 1) we know that $\underline{I}$ is strictly isolated and hence X−I is strictly isolated.

Finally we state the following Lemma, leaving the proof as an exercise, which sheds some light on the relations between the notions of a seam, isolated and strictly isolated.

Lemma 59 The following statements are equivalent:
 1) $(X, \sqsubseteq))$ has a seam.
 2) $\exists I. \emptyset \subset I \subset X, \bar{I} = \emptyset$ and I is strictly isolated.
 3) $\exists I. \emptyset \subset I \subset X, \underline{I} = \emptyset$ and I is strictly isolated.

In case X is a$^-$ component of $(X, \sqsubseteq))$ then the previous statements are also equivalent to:
 4) $\exists I. \emptyset \subset I \subset X$, I and X−I are isolated.

4.4.2 Extension Process

We will distinguish two types of RS-representations for RS-preserving functions, the contractive ones, which reduce the underlying set to a strict subset of this set, and the non-contractive ones, which leave the underlying set of a random structure unchanged.

Definition 60 An RS-representation $\mu$: $\mathcal{R}_\mathcal{L}(X, \sqsubseteq)) \mapsto (( \mathcal{R}_{\mathcal{L}_1}(X_1, \sqsubseteq)_1), K_1), \ldots, (\mathcal{R}_{\mathcal{L}_n}(X_n, \sqsubseteq)_n), K_n))$ is contractive iff $\exists i \in \{1, \ldots, n\}$. $X_i \subset X$ and is non-contractive otherwise.

The Extension Process states that it suffices to define non-contractive RS-representations on an isolated subset of the partial order of a given Random Structure and subsequently to extend these functions to RS-representations of RS-preserving functions on the entire Random Structure. For contractive RS-representations the Extension Process holds on condition that the extension occurs on a strictly isolated subset.

The Extension Process will be used to define three of the basic operations: the Random Product and the Random Split, which are non-contractive operations, and the Random Deletion, which is contractive. The fourth operation, the Random Projection, can be defined without the aide of the Extension Process.

As usual, with some abuse of notation, we will denote the restriction of the partial order $\sqsubseteq$ to a subset A of X by the partial order $(A, \sqsubseteq)$. We will refer to the notion of label-isomorphism in the following and use the corresponding notation introduced in Remark 11.

Notation 61 Ref $(\mathcal{R}_\mathcal{L}(X, \sqsubseteq)) = \{\phi | \phi$ is a refining function on $\mathcal{R}_\mathcal{L}(X, \sqsubseteq)\}$.

The following definition extends the label-isomorphism $\Psi_{\mathcal{L},\mathcal{L}'}: \mathcal{L} \to \mathcal{L}'$ introduced in Remark 11 for random structures, to an operation on refining functions.

Definition 62 Given $\mathcal{L}, \mathcal{L}' \subset \mathcal{N}$ and $(X, \sqsubseteq)$ such that $|X| = |\mathcal{L}| = |\mathcal{L}'|$. We define a relabeling operator $\hat{\Psi}_{\mathcal{L}\mathcal{L}'}$: Ref $(\mathcal{R}_\mathcal{L}(X, \sqsubseteq)) \to$ Ref $(\mathcal{R}_{\mathcal{L}'}(X, \sqsubseteq))$ as follows: $\forall \phi \in$ Ref$(\mathcal{R}_\mathcal{L}(X, \sqsubseteq)), \forall F' \in \mathcal{R}_{\mathcal{L}'}(X, \sqsubseteq)$.

$$\hat{\Psi}_{\mathcal{L}\mathcal{L}'}(\phi)(F') = \Psi_{\mathcal{L}\mathcal{L}'} \circ [\phi(\Psi_{\mathcal{L}'\mathcal{L}} \circ F')].$$

Lemma 63 Definition 62 is sound, i.e., using the notation of Definition 62, $\Psi_{\mathcal{L}\mathcal{L}'}$ is composable with $\phi(\Psi_{\mathcal{L}'\mathcal{L}} \circ F')$ and $\hat{\Psi}_{\mathcal{L}\mathcal{L}'}(\phi) \in$ Ref $(\mathcal{R}_{\mathcal{L}'}(X, \sqsubseteq))$.

Proof: Let $\phi \in$ Ref $(\mathcal{R}_\mathcal{L}(X, \sqsubseteq))$ and consider a representation $$\phi: \mathcal{R}_\mathcal{L}(X, \sqsubseteq) \mapsto (\mathcal{R}_{\mathcal{L}_1}(X_1, \sqsubseteq_1), \ldots, \mathcal{R}_{\mathcal{L}_n}(X_n, \sqsubseteq_n)).$$

We remark that since refining functions are surjective, $\forall F' \in \mathcal{R}_{\mathcal{L}'}(X, \sqsubseteq) \exists i \in \{1, \ldots, n\}$ such that $\phi(\Psi_{\mathcal{L}'\mathcal{L}} \circ F') \in \mathcal{R}_{\mathcal{L}_i}(X_i, \sqsubseteq_i)$. Thus the composition $\Psi_{\mathcal{L}\mathcal{L}'} \circ [\phi(\Psi_{\mathcal{L}'\mathcal{L}} \circ F')]$ is defined since $\phi$ is refining and hence $\mathcal{L}_i \subset \mathcal{L}$.

To show that $\hat{\Psi}_{\mathcal{L}\mathcal{L}'}(\phi) \in$ Ref$(\mathcal{R}_{\mathcal{L}'}(X, \sqsubseteq))$, we remark that $$\hat{\Psi}_{\mathcal{L}\mathcal{L}'}(\phi) \mathcal{R}_{\mathcal{L}'}(X, \sqsubseteq) \mapsto \mathcal{R}_{\mathcal{L}'_1}(X_1, \sqsubseteq_1), \ldots, \mathcal{R}_{\mathcal{L}'_n}(X_n, \sqsubseteq_n)),$$

where $\forall i \in \{1, \ldots, n\}$. $\mathcal{L}'_i = \Psi_{\mathcal{L}\mathcal{L}'}(\mathcal{L}_i)$Indeed, since $\Psi_{\mathcal{L}\mathcal{L}'}$ is a label-isomorphism we have $\mathcal{L}_i \subseteq \mathcal{L} \Rightarrow \mathcal{L}'_i = \Psi_{\mathcal{L}\mathcal{L}'}(\mathcal{L}_i) \Psi_{\mathcal{L}\mathcal{L}'}(\mathcal{L}) = \mathcal{L}'$. We leave the verification that $\hat{\Psi}_{\mathcal{L}\mathcal{L}'}(\phi)$ is surjective as an exercise.

The following lemma, which uses the notation of Definition 62, illustrates that the relabeling operator $\hat{\Psi}$ preserves RS-representations.

Lemma 64 If
$$\mu(\mathcal{F}_1, \ldots, \mathcal{F}_n): (\mathcal{R}_\mathcal{L}(X, \sqsubseteq)) \mapsto ((\mathcal{R}_{\mathcal{L}_1}(X_1, \sqsubseteq_1), K_1),$$
$$\ldots, (\mathcal{R}_{\mathcal{L}_n}, (X_n, \sqsubseteq_n), K_n))$$

then $$[\hat{\Psi}_{\mathcal{L}\mathcal{L}'}(\mu)](\mathcal{F}'_1, \ldots, \mathcal{F}'_n): (\mathcal{R}_{\mathcal{L}'}(X, \sqsubseteq)) \mapsto ((\mathcal{R}_{\mathcal{L}'_1}, (X_1, \sqsubseteq), K_1, \ldots, (\mathcal{R}_{\mathcal{L}'_n}(X_n, \sqsubseteq_n), K_n)),$$

where $\mathcal{F}'_i = \Psi_{\mathcal{L}\mathcal{L}'} \mathcal{F}_i$ and $\forall i \in \{1, \ldots, n\}$. $\mathcal{L}'_i = \Psi_{\mathcal{L}\mathcal{L}'}(\mathcal{L}_i)$ Proof: Let $\mu(\mathcal{F}_1, \ldots, \mathcal{F}_n) \mathcal{R}_\mathcal{L}(X, \sqsubseteq)) \mapsto \mapsto ((\mathcal{R}_{\mathcal{L}_1}), (X_1, \sqsubseteq), K_1), \ldots, (\mathcal{R}_{\mathcal{L}_n}), (X_n, \sqsubseteq), K_n)$. The partition $\mathcal{F}_1, \ldots, \mathcal{F}_n$ of $\mathcal{R}_\mathcal{L}(X, \sqsubseteq))$ is such that $\forall i \in \{1, \ldots, n\} \mu(\mathcal{F}_i) = \mathcal{R}_i$ and $\forall F \in \mathcal{R}_i$. $|^{-1}(F) \cap \mathcal{F}_i = K_i$. In order to show that:

$$\hat{\Psi}_{\mathcal{L}\mathcal{L}'}(\mu): \mathcal{R}_{\mathcal{L}'}(X, \sqsubseteq)) \mapsto ((\mathcal{R}_{\mathcal{L}'_1}(X_1, \sqsubseteq), K_1), \ldots, \mathcal{R}_{\mathcal{L}'_n}(X_n, \sqsubseteq), K_n)),$$

it suffices to remark that since $\Psi_{\mathcal{L}\mathcal{L}'}$ is a labeling isomorphism and since for each $i \in \{1, \ldots, n\}$, $\mathcal{F}'_i = \Psi_{\mathcal{L}\mathcal{L}'} \mathcal{F}_i$, we immediately obtain that $\mathcal{F}'_1, \ldots, \mathcal{F}'_n$ forms a partition of $\mathcal{R}_{\mathcal{L}'}(X, \sqsubseteq))$. It is also easy to verify that $\forall F' \in \mathcal{R}_{\mathcal{L}'}$. $(X_i, \sqsubseteq) | (\hat{\Psi}_{\mathcal{L}\mathcal{L}'}(\mu))^{-1}$ $(F') \cap \mathcal{F}'_i | = K_i$.

We now introduce an Extension Operator which extends a refining function defined on a random structure S, determined by an isolated subset of a given random structure R, to the entire random structure R.

Definition 65 Suppose that I is an isolated subset of $(X, \sqsubseteq))$ and let $G \in \mathcal{R}_\mathcal{L}(X, \sqsubseteq))$. The Extension Operator Ext(G,I): Ref $(\mathcal{R}_G(I, \sqsubseteq|I)) \to$ Ref$(\mathcal{R}_\mathcal{L}(X, \sqsubseteq)))$ is defined as follows: $\forall \phi \in$ Ref $(\mathcal{R}_G(I \sqsubseteq|I)), \forall F \in \mathcal{R}_\mathcal{L}(X, \sqsubseteq))$.

$$Ext(G,I)(\phi)(F) = F \lceil (X-I) \cup [\hat{\Psi}_{G(I), F(I)}(\phi)(F \lceil I)].$$

The following lemma shows that Definition 65 is sound.

Lemma 66 Let $G \in \mathcal{R}_\mathcal{L}(X, \sqsubseteq))$ and $\phi \in$ Ref$(\mathcal{R}_G(I \sqsubseteq|I))$ and consider a representation of $\phi$:

$$\phi: \mathcal{R}_G(I, \sqsubseteq|I) \mapsto \mathcal{R}_{\mathcal{M}_1}(I_1, \sqsubseteq_1), \ldots, \mathcal{R}_{\mathcal{M}_n}(I_n, \sqsubseteq_n)).$$

We determine a representation for the extension Ext(G,I)($\phi$) of $\phi$.

If:
$\mathcal{L}_i = \{F(X-I) \cup [\hat{\Psi}_{G(I),F(I)}(\phi)(F \lceil I)](I_i) | F \in \mathcal{R}_\mathcal{L}(X, \sqsubseteq)),$
$\phi(\Psi_{F(I)G(I)}(F \lceil I)) \in \mathcal{R}_{\mathcal{M}_i}(I_i, \sqsubseteq)\}$ $X_i = (X-I) \cup I_i$
$\sqsubseteq^*_i$ = least partial order containing the following sets of pairs:
$\sqsubseteq \lceil(X-I_i) \times (X-I_i)], \sqsubseteq)$ $\{(a,b) | a \in M(I_i), b \in \lceil M(I)\rceil\}$ and $\{(a,b) | a \in \lfloor m(I)\rfloor, b \in m(I_i)\}$.

Then: $\forall i \in \{1, \ldots, n\}$.

$$\mathcal{R}_{\mathcal{L}_i}(X_i, \sqsubseteq^*_i) = \{F \lceil (X-I) \cup [\hat{\Psi}_{G(I), F(I)}(\phi) (F \lceil I)] | \phi(\Psi_{F(I)G(I)}(F \lceil I)) \in \mathcal{R}_{\mathcal{M}_i}(I_i, \sqsubseteq)\}$$

and Ext(G,I)($\phi$) is refining with representation:
$$Ext(G,I)(\phi): \mathcal{R}_\mathcal{L}(X, \sqsubseteq) \mapsto \mathcal{R}_{\mathcal{L}_1}(X_1, \sqsubseteq^*_1), \ldots, \mathcal{R}_{\mathcal{L}_n}(X_n, \sqsubseteq^*_n))).$$

Proof: We show that $\forall i \in \{1, \ldots, n\}$.
$$\mathcal{R}_{\mathcal{L}_i}(X_i, \sqsubseteq^*_i) = \{F \lceil (X-I) \cup [\hat{\Psi}_{G(I), F(I)}(\phi)(F \lceil I)] | \phi(\Psi_{F(I)G(I)}(F \lceil I)) \in \mathcal{R}_{\mathcal{M}_i}(I_i, \sqsubseteq)\}.$$

Note that $I_i$ is an isolated subset of $(X, \sqsubseteq)$ and hence, by the definition of $X_i$ and $\sqsubseteq^*_i I_i$ is also an isolated subset of $(X_i, \sqsubseteq^*_i)$. Hence, by Lemma 52 1), we know that: $\mathcal{R}_{\mathcal{L}_i}(C_i, \sqsubseteq^*_i) = \{H \lceil (X_i - I_i) \cup H' | H' \in \mathcal{R}_{\mathcal{L}_i}(X_i, \sqsubseteq^*_i)\}$ and $H' \in \mathcal{R}_{\mathcal{L}_i(X_i - I_i)}(I_i, \sqsubseteq^*_i)\}$ We remark that $\{F \lceil (X-I) \cup [\hat{\Psi}_{G(I), F(I)}(\phi)(F \lceil I)] | \phi(\Psi_{F(I)G(I)}(F \lceil I)) \in \mathcal{R}_{\mathcal{M}_1}(I_i, \sqsubseteq)\} = \{H \lceil (X_i - I_i) \cup H' | H' \in \mathcal{R}_{\mathcal{L}_i}(X_i, \sqsubseteq) \text{ and } H' \in \mathcal{R}_{H(I_i)}(I_i, \sqsubseteq)\}$ since $X-I = X_i - I_i$ and since $\{[\hat{\Psi}_{G(I),F(I)}(\phi)(F|I)]|\phi(\Psi_{F(I)G(I)}(F|I))\in\mathcal{R}_{\mathcal{M}_i}$
$I_i,\sqsubseteq)\}=\{H'|$
$H\in\mathcal{R}_{\mathcal{L}_i}(X_i,\sqsubseteq_i^*)$ and $H'\in\mathcal{R}_H(I_i,\sqsubseteq_i)\}$, by the surjectivity of $\phi$ and by the definition of a label-isomorphism.

We verify that the function $\text{Ext}(G,I)(\phi)$ is refining. Note that $\mathcal{L}_i\subseteq\mathcal{L}, X_i\subset X$ and the $\forall x,y\in X_i$. $x\sqsubseteq y\Rightarrow x\sqsubseteq_i^* y$. The last claim follows from the fact that $\sqsubseteq_i$ refines $\sqsubseteq$ and from the definition of $\sqsubseteq_i^*$. We leave the fact that $\text{Ext}(G,I)(\phi):\mathcal{R}_\mathcal{L}(X,\sqsubseteq))\to\mathcal{R}_{\mathcal{L}_1}(X_1,\sqsubseteq_1^*)\cup\ldots\cup\mathcal{R}_{\mathcal{L}_n}(X_n,\sqsubseteq_n^*)$ is surjective, as an exercise.

We use the notations of Definition 65 and of Lemma 66 in Theorem 67.

Theorem 67 (Extension Process) Consider a random structure $\mathcal{R}_\mathcal{L}(X,\sqsubseteq))$ and an isolated subset I of X and $G\in\mathcal{R}_\mathcal{L}(X,\sqsubseteq))$. Consider a refining function $$\mu:\mathcal{R}_{G(I}\sqsubseteq)|I)\mapsto\mathcal{R}_{\mathcal{M}_1}(I_1,\sqsubseteq),\ldots,(\mathcal{R}_{\mathcal{M}_n}(I_n,\sqsubseteq))$$

If a) $\mu$ is non-contractive or b) ($\mu$ is contractive and I is strictly isolated) and if $$\mu:\mathcal{R}_{G(I},\sqsubseteq|I))\mapsto((\mathcal{R}_{\mathcal{M}_1}(I_1,\sqsubseteq),K_1)\ldots,(\mathcal{R}_{\mathcal{M}_n}(I_n,\sqsubseteq),K_n))$$

is RS-preserving then $$\text{Ext}(G,I)(\mu):\mathcal{R}_\mathcal{L}(X,\sqsubseteq)\mapsto(((\mathcal{R}_{\mathcal{L}_1}(X_1,\sqsubseteq_1^*),K_1),\ldots,(\mathcal{R}_{\mathcal{L}_n}(X_n,\sqsubseteq_n^*),K_n))$$

is RS-preserving.

Proof: To verify a), we consider a non-contractive RS-preserving representation of $\mu$: $\mu$: $\mathcal{R}_{G(I)}, (I)\sqsubseteq I) \mapsto ((\mathcal{R}_{\mathcal{M}_1}(I_1,\sqsubseteq_1),K_1)\ldots,(\mathcal{R}_{\mathcal{M}_n}(I_n,\sqsubseteq),K_n))$. Since the function is non-contractive, we know that $\forall i\in\{1,\ldots,n\}$. $I_i=I$ and $\mathcal{M}_i=G(I)$. Thus $$\mu:\mathcal{R}_{G(I},\sqsubseteq)\mapsto((\mathcal{R}_{G(I)}(I,\sqsubseteq),K_1)\ldots,(\mathcal{R}_{G(I)}(I,\sqsubseteq) K_n))$$

Since $\mu$ is RS-preserving there is a partition $\mathcal{G}_1,\ldots,\mathcal{G}_n$ of $\mathcal{R}_{G(I)}(I,\sqsubseteq I)$ such that $$(*)\forall H\in\mathcal{R}_{G(I)}(I,\sqsubseteq_i)\cdot|\mu^{-1}(H)\cap\mathcal{G}_i|=K_i.$$

Since I is isolated we know by Lemma 52 1) that $$(**)\mathcal{R}_\mathcal{L}(X,\sqsubseteq)=\cup\{F|(X-I)\cup G|F\in\mathcal{R}_\mathcal{L}(X,\sqsubseteq)) \text{ and } G\in\mathcal{R}_{F(I,\sqsubseteq)})\}$$

We define the following collection of sets: for $i\in\{1,\ldots,n\}$ we let:

$$\mathcal{F}_i=\{(F|(X-I))\cup(\Psi_{G(I)F(I)}\circ H)|F\in\mathcal{R}_\mathcal{L}(X,\sqsubseteq)) \text{ and } H\in\mathcal{G}_i\}.$$

We verify that the collection $\mathcal{F}_{i\in\{1,\ldots,n\}}$ forms a partition of $\mathcal{R}_\mathcal{L}(X,\sqsubseteq))$ such that $\forall H\in\mathcal{R}_\mathcal{L}(X,\sqsubseteq_i). |\hat{\mu}_\mathcal{L}^{-1}(H)\cap\mathcal{F}_i|=K_i$. The fact that $(\mathcal{F}_i)_{i\in\{1,\ldots,n\}}$ forms a partition follows since $(\mathcal{G}_i)_{i\in\{1,\ldots,n\}}$ forms a partition and hence, since $\Psi_{G(I)F(I)}$ is a label-isomorphism, we obtain that when $i,j\in\{1,\ldots n\}$ and $i\neq j$, we have $\{\Psi_{G(I)F(I)}\circ H|H\in\mathcal{G}_i\}\cap\{\Psi_{G(I)F(I)}\circ H|H\in\mathcal{G}_j\}=\emptyset$ and thus $\mathcal{F}_i\cap\mathcal{F}_j=\emptyset$. The fact that $\cup_{i\in\{1,\ldots,n\}}\mathcal{F}_i=\mathcal{R}_\mathcal{L}(X,\sqsubseteq))$ follows since $\cup_{i\in\{1,\ldots,n\}}\mathcal{F}_i=\cup_{i\in\{1,\ldots,n\}}\{(F|(X-I))\cup(\Psi_{G(I)F(I)}\circ H)|F\in\mathcal{R}_\mathcal{L}(X,\sqsubseteq)), H\in\mathcal{G}_i\}=\{(F|(X-I))\cup(\Psi_{G(I)F(I)}\circ H)|F\in\mathcal{R}_\mathcal{L}(X,\sqsubseteq)), H\in\cup_{i\in\{1,\ldots,n\}}\mathcal{G}_i\}$. Since $\cup_{i\in\{1,\ldots,n\}}\mathcal{G}_i=\mathcal{R}_{G(I)}(I,\sqsubseteq))$, we obtain that $\cup_{i\in\{1,\ldots,n\}}\mathcal{F}_i=\{(F|(X-I))\cup(\Psi_{G(I)F(I)}\circ H)|F\in\mathcal{R}_\mathcal{L}(X,\sqsubseteq)), H\in\mathcal{R}_G(I,\sqsubseteq I)\}=\{F|(X-I)\cup G|F\in\mathcal{R}_\mathcal{L}(X,\mathcal{R}_\mathcal{L}), G\in\mathcal{R}_F(I,\sqsubseteq)\}=\mathcal{R}_\mathcal{L}(X,\sqsubseteq)$ where the last equality follows by $(**)$.

We remark that $\mu$ is RS-preserving and hence surjective.
Thus, by Lemma 66, $\text{Ext}(G,I)(\mu)$ is surjective and:
$$\mathcal{R}_{\mathcal{L}_i}(X_i,\sqsubseteq_i^*)=\{F|(X-I)\cup[\Psi_{G(I)F(I)}(\mu)(F|I)]|\mu(\Psi_{F(I)G(I)}\circ(F|I))\in\mathcal{R}_{\mathcal{M}_i}(I_i,\sqsubseteq_i)\}.$$

This equality combined with $(*)$ implies that $\forall H\in\mathcal{R}_\mathcal{L}(X,\sqsubseteq_i)$. $|\text{Ext}(G,I)(\mu)_\mathcal{L}^{-1}(H)\cap\mathcal{F}_i|=K_i$.

Part b) for contractive functions and strictly isolated sets follows by a similar argument.

Notation 68 We remark that the extension $\text{Ext}(G,I)(\mu)$ given by the Extension Process is independent of G and hence will be denoted in the following by: $\text{Ext}(I)(\mu)$.

In Section 5.6 we discuss two counter-examples illustrating that the condition "strictly isolated" can not be weakened to the condition "isolated" for the case of contractive representations.

5 Basic Data Structuring Operations

In the following sub section we outline the fundamental data structuring problem as described in [MR98] and then proceed to present randomness preserving versions of the main operations involved for the case of random structures.

5.1 The Fundamental Data Structuring Problem

We focus on partial order data structures which allow one to incorporate all of the basic operations of the basic data structuring problem listed in [MR95] in the context of randomized algorithms.

We briefly discuss these operations below. We should point out that the following discussion is intended to be motivational. Indeed, the intricacies of randomness preservation will require some operations to be more restrictive than in a general context. We only present the operations since they form a nice summary of the most fundamental data structuring operations.

For the fundamental data structuring problem one is required to maintain a collection of sets of items so as to efficiently support certain types of queries and operations. Each item i is an arbitrary record indexed by a key $k(i)$ drawn from a totally ordered universe. We assume that each item belongs to a unique set and that the keys are all distinct.

The operations to be supported in this context are:

MakeSet(S): create a new empty set S
Insert(i,S): insert item i into the set S
Delete(i,S): delete the item i from the set S
Find(i,S): return the item i in the set S
Paste($S_1, S_2$): replace the sets $S_1$ and $S_2$ by the pair of sets ($S_1'$, $S_2'$) where for all items i in $S_1'$ and j in $S_2'$: $k(i)<k(j)$ and the union of $S_1$ and $S_2$ equals the union of $S_1'$ and $S_2'$.
Split(k,S): replace the set S by the new sets $S_1$ and $S_2$ where $S_1$ consists of the elements j in S such that $k(j)<k$ and $S_2$ consists of the elements j in S such that $k(j)>k$.
Join($S_1$, i, $S_2$) where $i\in S_1\cup S_2$: replace the sets $S_1$ and $S_2$ by the triple ($S_1'$, i, $S_2'$), where for all items j in $S_1'$, $k(j)<k(i)$ and for all items j in $S_2'$, $k(i)<k(j)$ and the union of $S_1$ and $S_2$ equals the union of $S_1'$ and $S_2'$.

We should point out that [MR95] presents these operations in a different simplified fashion. Indeed, the solution of the data structuring problem presented in [MR95] uses binary search trees. When operating on such trees one typically considers two sets $S_1$ and $S_2$ consisting of the elements "left" of the root, all of which have keys smaller than the root key and the elements "right" of the root, all of which have keys greater than the root key. We refer to two sets that satisfy this condition as a "pre-split pair". For pre-split pairs, the operations above can be formulated to start from a pre split pair of sets $S_1, S_2$ and end up with the same pair of sets $S_1, S_2$ rather than with an altered pair $S_1'$, $S_2'$. We generalized the operations to data structures where we assume that two parts $S_1, S_2$ of the structure are not necessarily pre-split.

The first operation, which concerns the creation of a new empty data structure (in the above case a set) we simply interpret in our context as creating an empty random data structure. This is taken care of in our context via the use of a constant $\emptyset$ indicating the empty structure. Since a join obviously is very similar to a split, from a set theory point of view, we will focus on finding RS-preserving versions for the second up to the sixth operation.

The operations listed in [MR95] however are not necessarily RS-preserving and are restricted to the context of trees. We will ensure that our data structure operations are randomness preserving and that arbitrary data structures can be incorporated. Random structures form the basic building blocks of random sequences, i.e. of the data structures, and consist of labeled partial orders. This approach allows for the inclusion of traditional data structures, including of course lists, heaps, etc. The operations are random product, random insertion, random deletion, random projection and a random split, each of which has been designed in a novel way to guarantee randomness preservation of the underlying data structures.

The random insertion can easily be inferred from the random product: it simply consists of the random product of a singleton random structure with an arbitrary random structure. Direct access to elements of a random structure will be restricted, with the exception of access via projections on a singleton isolated subset.

Comment: The operations introduced below can easily be extended to take more arguments than specified in their definition. The details are of a straightforward technical nature and have been omitted in the paper. We will restrict the definitions to the minimum number of arguments in each case.

Convention 69 In the following we will consider arbitrary label sets of natural numbers, i.e. we no longer require that label sets form an initial segment of the natural numbers.

Remark 70 We will typically first define the operations on partial orders, then define the operation on labelings and finally define the operation on a random structure. To generalize the operations we will use two extension results. We will use the Extension Process (Theorem 67) to allow the operations to be applied to isolated subsets of the partial order corresponding to a random structure. Finally, though we will not state this explicitly for each operation, we define the randomness-preserving extension of each operation, from random structures to random sequences, via Definition 26.

5.2 The Random Product

In order to define the random product, we first define the product of two finite partial orders. Then we define the product of two labelings and we extend this definition to sets of labelings. Finally, we define the random product on a random structure as a unary operation, which performs an operation on two sub structures of the given random structure and reproduces a new random structure.

5.2.1 The Product of Two Finite Partial Orders

Definition 71 Given two finite disjoint partial orders $(X_1, \sqsubseteq_1)$ and $(X_2, \sqsubseteq_2)$.

The set $X_1 \otimes X_2$ is defined to be the union of the disjoint sets $X_1$ and $X_2$. The relation $\sqsubseteq_1 \otimes \sqsubseteq_2$ is defined to be the least partial order on $X_1 \otimes X_2$ containing $\sqsubseteq_1$ and $\sqsubseteq_2$ and $X_1 \times X_2$.

It is easy to verify that the partial order $\sqsubseteq_1 \otimes \sqsubseteq_2$ is the transitive closure of the binary relations $\sqsubseteq_1, \sqsubseteq_2$ and the set of pairs $\{(M, m) | M$ is a maximal element of $(X_1, \sqsubseteq_1)$, m is a minimal element of $(X_2, \sqsubseteq_2)\}$.

EXAMPLE 72

If we consider the sets $X_1 = \{x_1, x_2, x_3\}$ and $X_2 = \{x_4, x_5, x_6, x_7\}$ then $X_1 \otimes X_2 = x_1, x_2, x_3, x_4, x_5, x_6, x_7$. We indicate the new pairs added via the operation $\otimes$ via dashed lines,

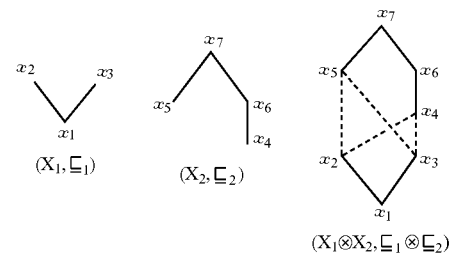

Clearly the sets $X_1$ and $X_2$ always form a pair of completely connected subsets (cf. Definition 35) of the product partial order $(X_1 \otimes X_2, \sqsubseteq_1 \otimes \sqsubseteq_2)$.

We define the product of two labelings as a first step towards the definition of the random product of two random structures.

5.2.2 The Product of Two Labelings

Let $F_1, F_2$ be labelings on finite partial orders $(X_1, \sqsubseteq_1)$ and $(X_2, \sqsubseteq_2)$ respectively. We call $F_1$ and $F_2$ disjoint when their domains $X_1$ and $X_2$ are disjoint and their ranges $F_1(X_1)$ and $F_2(X_2)$ are disjoint.

Pseudo-Code for the Product $\otimes$ on Labelings

Let $F_1, F_2$ be disjoint labelings which are provided as inputs.

We define the product of the two labelings. To avoid technicalities, we assume in the following pseudo-code that the labelings $F_1$ and $F_2$ of which the product is taken are (implicitly) processed first to retrieve a new function F, consisting of the join of the labelings $F_1$ and $F_2$. The creation of F will be indicated in the final pseudo-code for the random product by the initial code line: $F = F_1 \cup F_2$, where we consider the graph union of these functions.

We will also assume the implicit generation of the restrictions of this function F, i.e. $F|X_1$ and $F|X_2$, to the sets $X_1$ and $X_2$ respectively and hence won't specify the detailed implementation of these restrictions in the pseudo code. The function F and its restrictions $F|X_1$ and $F|X_2$ will freely be referred to in the pseudo-code for P.

The pseudo-code to generate a labeling from $F = F_1 \cup F_2$ is specified below.

```
Push-Down(b,F)
    while ⌊b⌋ ≠ ∅ and b < V⌊b⌋
        swap(b, V⌊b⌋,F)
Push-Up (a,F)
    while ⌈a⌉ ≠ ∅ and a > ∧⌈a⌉
        swap(a, ∧⌈a⌉, F)
```

As before, we will use Push-Down and Push-Up freely in the pseudo-code, without specifying which version we use since this is a matter of choice of implementation.

As usual we will define the operations on isolated subsets of a given random structure. We will show that the operations are randomness preserving for the case of strictly isolated subsets and then generalize to arbitrary isolated subsets via the Extension Process (Theorem 67).

We provide the pseudo-code for the Labeling-Product Algorithm where the inputs for the algorithm are the disjoint labelings $F_1$ and $F_2$. We denote the function F returned by the Labeling-Product algorithm as $F_1 \otimes F_2$.

Pseudo-code for the Labeling-Product Algorithm

```
F := F_1 ∪ F_2;
while VM(F⌐X_1) > ∧m(F⌐X_2) do
    a := VM(F⌐X_1); b := ∧m(F⌐X_2);
    swap (a,b,F);
    Push-Down(b,F);
    Push-Up (a,F)
Return F
```

Lemma 73 If $F_1$ and $F_2$ are disjoint labelings then $F_1 \otimes F_2$ is a labeling.

Proof: This follows via straightforward yet technically lengthy verifications from the pseudo-code of the random product algorithm. We omit the details.

EXAMPLE 74

In the example given below, we consider two labelings $F_1$ and $F_2$ for the partial orders displayed below and illustrate the steps involved in executing the Labeling-Product algorithm. We indicate the selection of labels of extremal elements by full circles and these elements occur swapped in the following picture. For each while loop execution, initiated by an original swap of labels of two extremal elements, the other pairs of elements to be swapped are linked in the picture via a double arrow (in dashed line display). These elements occur swapped in the following picture. The final picture illustrates the end result of the computation, i.e. $F_1 \otimes F_2$.

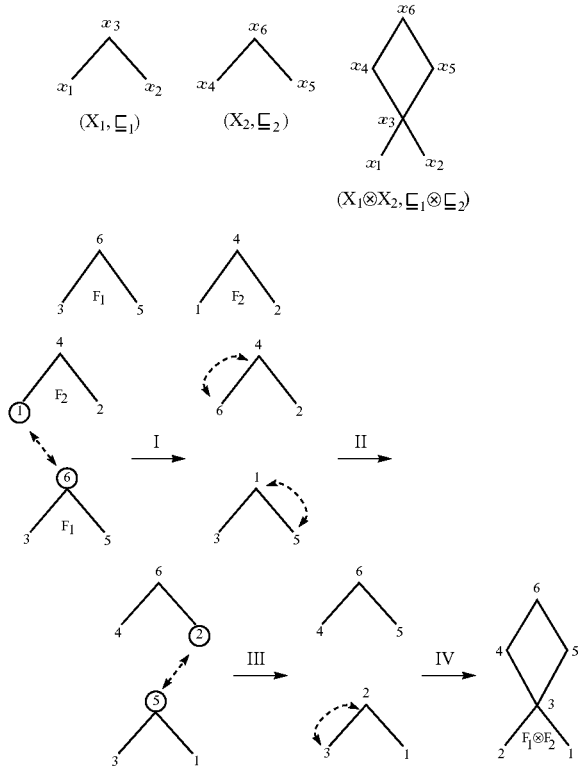

Definition 75 Let $\mathcal{L}_1$ and $\mathcal{L}_2$ be disjoint sets of labels. The label-product function $$\otimes: \mathcal{R}_{\mathcal{L}_1(X_1, \sqsubseteq_1)} \times \mathcal{R}_{\mathcal{L}_2(X_2, \sqsubseteq_2)} \to \mathcal{R}_{\mathcal{L}_1 \otimes \mathcal{L}_2}^{(X_1 \otimes X_2, \sqsubseteq_1 \otimes \sqsubseteq_2)}$$

is defined by: $\otimes(F_1, F_2) = F_1 \otimes F_2$.

The following result is important to obtain that the Random Product is an RS-preserving operation.

Theorem 76 the Label-Product Function is a Bijection.

Proof: Consider two disjoint partial orders $(X_1, \sqsubseteq_1)$ and $(X_2, \sqsubseteq_2)$.

We present a proof.

We view the execution of the labeling product algorithm as a series of swaps along chains of $X_1 \otimes X_2$. For a given pair of disjoint labelings, $F_1$ and $F_2$, each such chain is determined by a single run of the two push operations in the code of the random product. We recall that at the start of the while loops, labels a and b are involved in the swaps, where in terms of the pseudo-code, $a = \vee M(F \mid X_1)$ and $b = \wedge m(F \mid X_2)$. We refer to these labels as the extremal labels. The label b is swapped downwards along a unique chain in the partial order $(X_1, \sqsubseteq_1)$ labeled by $F_1$ and a is swapped upwards along a unique chain in the partial order $(X_2, \sqsubseteq_2)$ labeled by $F_2$. The result of appending these two paths forms a chain in the product partial order $(X_1 \otimes X_2, \sqsubseteq_1 \otimes \sqsubseteq_2)$. We will show that each such swap sequence along such a unique chain is infective. It follows that the labeling-product function $\otimes$ is infective.

In order to show the result, we assume that we have two labelings $F_1, F_1'$ of the partial order $(X_1, \sqsubseteq_1)$ and two labelings $F_2, F_2'$ of the partial order $(X_2, \sqsubseteq_2)$ such that $F_1$ and $F_2$ are disjoint, $F_1'$ and $F_2'$ are disjoint and $F_1 \otimes F_2 = F_1' \otimes F_2'$. We show that $F_1 = F_1'$ and $F_2 = F_2'$.

We will display the labels on the chain determined by the swap sequence arising from the call to $F_1 \otimes F_2$, by:

$$[a_1, a_2, \ldots, a_m], [b_1, b_2, \ldots, b_k],$$

where (a,b) is the first pair which is swapped by the algorithm, $a_m = a$, $b_1 = b$, the sequence $[a_1, a_2, \ldots, a_m]$ consists of the labels in the labeled partial order $(X_1, \sqsubseteq_1, F_1)$ which are respectively swapped with b and the sequence $[b_1, b_2, \ldots, b_k]$ consists of the labels in the labeled partial order $(X_2, \sqsubseteq_2, F_2)$ which are respectively swapped with a.

In the above, we allow the case where m=0 and k=0, i.e. no swap occurs.

Similarly, we display the labels on the chain determined by the swap sequence arising from the call to $F_1' \otimes F_2'$, by:

$$[a_1', a_2', \ldots, a_n'], [b_1', b_2', \ldots, b_l'].$$

where (a', b') is the first pair which is swapped by the algorithm, $a_n' = a'$, $b_1' = b'$, the sequence $[a_1', a_2', \ldots, a_m']$ consists of the labels in the labeled partial order $(X_1, \sqsubseteq_1, F_1')$ which are respectively swapped with b' and the sequence $[b_1', b_2', \ldots, b_k']$ consists of the labels in the labeled partial order $(X_2, \sqsubseteq_2, F_2')$ which are respectively swapped with a'.

In the above, we again allow the case were n=0 and l=0, i.e. no swap occurs.

We remark that $Ra(F_1) = Ra(F_1') = \mathcal{L}_1$ and that $Ra(F_2) = Ra(F_2') = \mathcal{L}_2$. This implies that $a = a'$ and $b = b'$.

We show that $a = a'$. The case $b = b'$ is similar. The algorithm selects the maximal label a at depth 0 in the labeled partial order $(X_1, \sqsubseteq_1, F_1)$ and the maximal label a' in the labeled partial order $(X_1, \sqsubseteq_1, F_1')$. Since $Ra(F_1) = Ra(F_1') = \mathcal{L}_1$ and labelings are increasing, we know that the maximum label of $\mathcal{L}_1$ must occur as a label of a maximal element and thus $a = a' = \text{maximum}((\mathcal{L}_1))$.

We remark that this fact does not alter, even after the first two push operations in the algorithm have been run through a number of times. Inductively one can show that Ra(F$_1$)=Ra(F$_1$') remains true. Indeed, in case a<b no swaps will occur and the result holds trivially. Otherwise, after the first series of swaps has happened for the first two while loops, we obtain that in Ra(F$_1$), the label a simply has been replaced by the label b and in F$_1$' the same has taken place. Hence we preserve the fact that the ranges of the respective labelings coincide, which suffices to yield the desired property.

It follows by the fact that a=a' and b=b' at the start of each swap sequence, the number of non-trivial swap sequences induced by F$_1$⊗F$_2$ is identical to the number of non-trivial swap sequences induced by F$_1$'⊗F$_2$'.

Hence we can focus on the last swap sequences induced by F$_1$⊗F$_2$ and F$_1$'⊗F$_2$' respectively and assume that both swap sequences, by the above, must start with a swap on the same pair of elements, a and b. Since the labelings of course have changed during the previous swap sequences, we denote the labelings at the start of the final swap sequences by G$_1$, G$_2$ and G$_1$', G$_2$' respectively.

Consider these final chains along which the labels are swapped, i.e. the chain $$[G_1^{-1}(a_1), G_1^{-1}(a_2), \ldots, G_1^{-1}(a_n)], [G_2^{-1}(b_1), G_2^{-1}(b_2), \ldots, G_2^{-1}(b_k)]$$

and the chain $$[(G_1')^{-1}(a_1'), (G_1')^{-1}(a_2'), \ldots, (G_1')^{-1}(a_n')], [(G_2')^{-1}(b_1'), (G_2')^{-1}(b_2'), \ldots, (G_2')^{-1}(b_l')].$$

To show injectivity for the final swap sequences, it suffices that these chains must be identical.

Indeed, assume that these paths are the same, say a path denoted by P. Since F$_1$⊗F$_2$=F$_1$'⊗F$_2$' and the swap sequence on P does of course not affect labels of X$_1$−P, the labelings G$_1$ and G'$_1$ must coincide on the set X$_1$−P. Moreover, since the net result of the Push-Down operation is to move the label of the maximal element of P to the element originally labeled with b in F$_2$ and to move every other label of an element of P to the element immediately above it on P, we obtain that G$_1$ must be identical to G'$_1$.

We claim that it is always the case that the swap sequences corresponding to b must be the same for G$_1$ and G'$_1$ and hence, by the above, the final swap operations form an injective operation.

We recall that since F$_1$⊗F$_2$=F$_1$'⊗F$_2$', we must have that at the end of both Push-Down operations the label b is a label of the same element in the partial order. We assume by way of contradiction that the paths are not identical and hence diverge at one point. Because b must end up at the end of the final swap sequences in the same position, we know there is a first time, after the sequences diverge, that the label b ends up as a label of the same element z of X. Say that prior to these swaps we had: H$_1^{-1}$((x))=b and H$_1'^{-1}$((y))=b where $x \neq y$ and where H$_1$ and H$_1$' are the labelings obtained from G$_1$ and G$_1$' by carrying out the swaps on G$_1$ and G$_1$' up to the point prior to the first convergence of the paths.

We clarify the situation for both labelings H$_1$ and H$_1$' in the following figure. In H$_1$ the label b will be swapped with a label α while in H$_1$' the label b will be swapped with a label β.

Since after these swaps the labels of $x$ and $y$ will not be changed again, the labels as displayed in the figure below, are the only ones possible in order to guarantee that the final results of the Push-Down calls are identical.

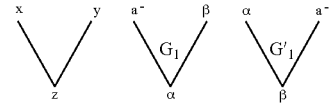

We now obtain a contradiction since from labeling H$_1$ it is clear that α<β while from labeling H$_1$' we obtain that β<α.

Hence we cannot have divergence of the path and the result follows.

Since the same argument holds for α, we obtain that both swap paths must be identical.

The proof can now be concluded by an inductive argument remarking that the same must hold for every pair of swap sequences, when run through in reverse order of their occurrence. Since on elements outside the swap paths, no labels are ever swapped, we obtain that F$_1$=F$_1$' and F$_2$=F$_2$'.

Finally we need to verify that the label-product function is surjective. It suffices to verify that $|\mathcal{R}_{\mathcal{L}_1}(X_1, \sqsubseteq_1)| \times |\mathcal{R}_{\mathcal{L}_2}(X_2, \sqsubseteq_2)| = |\mathcal{R}_{\mathcal{L}_1 \cup \mathcal{L}_2}(X_1 \otimes X_2, \sqsubseteq_1 \otimes \sqsubseteq_2)|$.

We remark that $\mathcal{R}_{\mathcal{L}_1 \cup \mathcal{L}_2}(X_1, \otimes X_2, \sqsubseteq_1 \otimes \sqsubseteq_2) = \mathcal{R}_{\mathcal{L}_1'}(X_1, \sqsubseteq_1)| \times \mathcal{R}_{\mathcal{L}_2'}(X_2, \sqsubseteq_2))|$, where $\mathcal{L}_1'$ consists of the first $|X_1|$ elements in the sorted version of $\mathcal{L}$ while $\mathcal{L}_2'$ consists of the last $|X_2|$ elements in the sorted version of $\mathcal{L}$. This follows by the fact that the sets X$_1$ and X$_2$ are completely connected in the partial order (X$_1$⊗X$_2$, $\sqsubseteq_1 \otimes \sqsubseteq_2$). Since we can identify labelings up to order-isomorphism, it is clear that $|\mathcal{R}_{\mathcal{L}_1}(X_1, \sqsubseteq_1))| = \mathcal{R}_{\mathcal{L}_1'}(X_1, \sqsubseteq_1))|$ and that $|\mathcal{R}_{\mathcal{L}_2}(X_2, \sqsubseteq_2))| = \mathcal{R}_{\mathcal{L}_2'}(X_2, \sqsubseteq_2))|$. Hence the result follows.

We obtain the following immediate corollary.

Corollary 77 Let $\mathcal{L}_1$ and $\mathcal{L}_2$ form a partition of the set of labels $\mathcal{L}$. Then:

$$|\mathcal{R}_{\mathcal{L}}(X_1 \otimes X_2, \sqsubseteq_1 \otimes \sqsubseteq_2)| = |\mathcal{R}_{\mathcal{L}_1}(X_1, \sqsubseteq_1)| \times |\mathcal{R}_{\mathcal{L}_2}(X_2, \sqsubseteq_2)|.$$

EXAMPLE 78

In the example given below, we illustrate that the creation of the random product of labelings is an injective process. We do not display all cases, but restrict our attention to the case of a fixed set of labelings which can be used on the first partial order ({1, 2, 3, 4}) and a fixed set of labelings which can be used on the second partial order ({5, 6, 7}). It is easy to verify that the number of possible combinations of labelings for the given partial orders from the set of labels {1, 2, 3, 4, 5, 6, 7} is $$\binom{7}{4} \times 5 \times 2 = 350,$$

which prevents a complete illustration of all cases. The first five combinations of pairs of labelings are displayed in bold design at the top of the following page, followed by the computation steps, while the next five combinations are displayed again on the next page in bold design, followed by the computation steps.

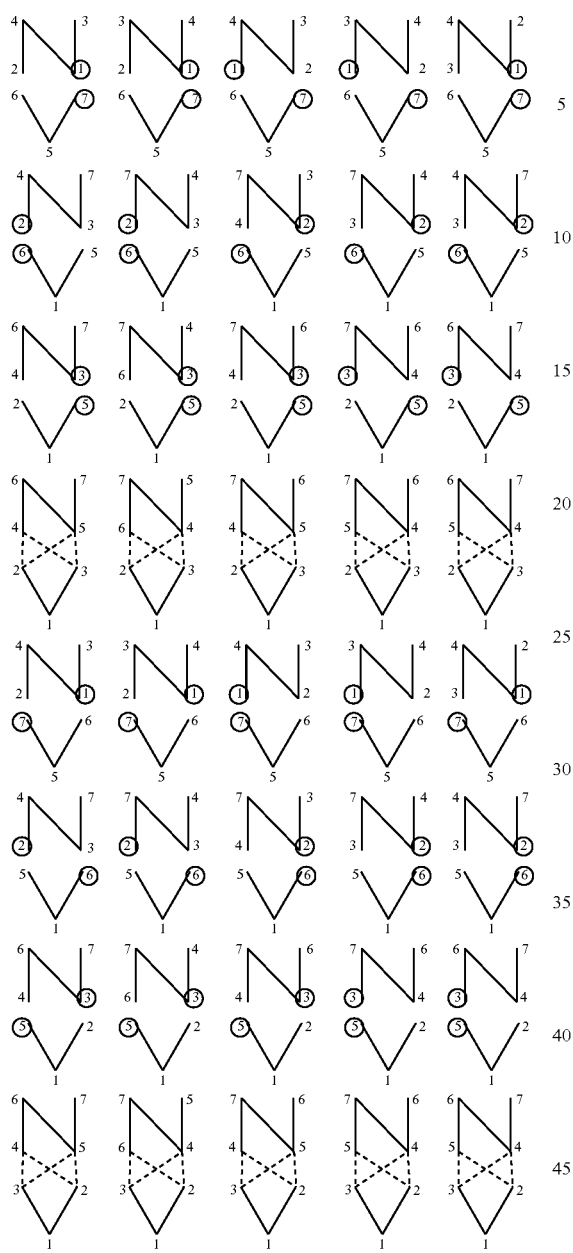

We define the binary random product below, which may be the first type of product that comes to mind, followed by the unary random product which is the one that will be used in the applications.

5.2.3 The Binary Random Product

Definition 79 Let $(\mathcal{R}_{\mathcal{L}_1}(X_1, \sqsubseteq_1))$ and $\mathcal{R}_{\mathcal{L}_2}(X_2, \sqsubseteq_2)$ be two disjoint random structures. We define the binary random product, $(\mathcal{R}_{\mathcal{L}_1}(X_1, \sqsubseteq_1) \otimes \mathcal{R}_{\mathcal{L}_2}(X_2, \sqsubseteq_2)$, by $\mathcal{R}_{\mathcal{L}_1 \cup \mathcal{L}_2}(X_1 \otimes X_2, \sqsubseteq_1 \otimes \sqsubseteq_2)$.

5.2.4 The Unary Random Product

Definition 80 Consider a random structure $\mathcal{R}(X, \sqsubseteq))$ and distinct components $I_1$ and $I_2$ of an isolated subset I of X. We define the unary random product of the partial order $(X, \sqsubseteq))$ with respect to $I_1$, $I_2$ and I to be the partial order $(X \sqsubseteq_{I_1 \otimes I_2})$ where $\sqsubseteq_{I_1 \otimes I_2}$ is the least partial order containing $\sqsubseteq \cup ((\sqsubseteq \restriction I_1) \otimes (\sqsubseteq \restriction I_2))$.

We define the unary random product to be the function:
$$\mu_{I_1} \otimes_{I_2}(X, I) : \mathcal{R}(X, \sqsubseteq)) \to \mathcal{R}(X, \sqsubseteq_{I_1 \otimes I_2})$$
where $\forall F \in \mathcal{R}(X, \sqsubseteq)) \cdot \mu_{I_1} \otimes_{I_2}(X, I)(F) \restriction (I_1 \otimes I_2) = (F \restriction I_1) \otimes (F \restriction I_2)$
and
$\mu(F) \restriction (X - (I_1 \cup I_2)) = F \restriction (X - (I_1 \cup I_2))$.

Theorem 81 Consider a random structure $\mathcal{R}(X, \sqsubseteq))$ and distinct components $I_1$ and $I_2$ of an isolated subset I of X. The unary random product $\mu_{I_1} \otimes_{I_2}(X, I)$ is RS-preserving with multiplicity $$\binom{|I_1| + |I_2|}{|I_1|}.$$

Proof: By the Extension Process it suffices to verify that the random product $\mu_{I_1} \otimes_{I_2}(I_1 \cup I_2, I_1 \cup I_2)$ is RS-preserving. Let $\mathcal{L}$ be a set of labels for $I_1 \cup I_2$. From Corollary 77 we obtain that for any partition $(\mathcal{L}_1, \mathcal{L}_2)$ of $\mathcal{L}: |\mathcal{R}_\mathcal{L}(I_1 \otimes I_2, \sqsubseteq_1 \otimes \sqsubseteq_2)| = |\mathcal{R}_{\mathcal{L}_1}(I_1, \sqsubseteq_1)| \times |\mathcal{R}_{\mathcal{L}_2}(I_2, \sqsubseteq_2)|$. The result follows since there are $$\binom{|I_1| + |I_2|}{|I_1|}$$

such partitions.

We provide an example of the unary random product.

EXAMPLE 82

Consider the Hasse Diagram of the following tree:

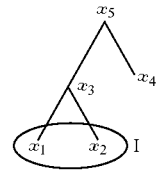

We display the eight labelings of the tree, where we selected the two leaves at the deepest level, i.e. $x_1$ and $x_2$, to form the atomic isolated subset I and labels for this set have been indicated as below.

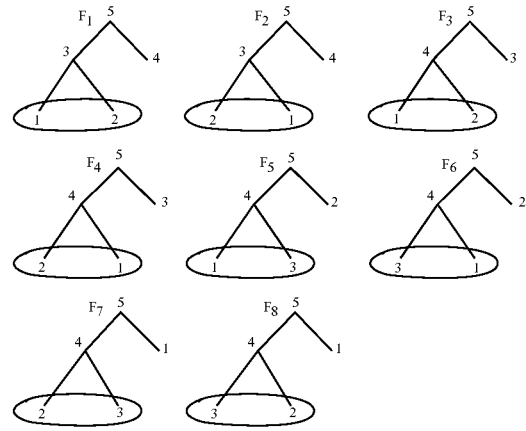

We apply the unary random product to the isolated subset $I=\{x_1, x_2\}$ and we use the components $I_1=\{x_1\}$ and $I_2=\{x_2\}$. The result is displayed below. The multiplicity involved is $$\binom{|I_1|+|I_2|}{|I_1|} = \binom{2}{1} = 2.$$

Indeed, obtain two copies of a random structure, a first copy consisting of the labelings marked by (I), i.e. the labelings with odd indices, and a second copy consisting of the labels marked by (II), i.e. the labelings with even indices.

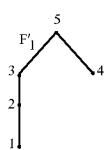 (I)

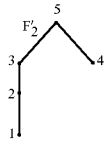 (II)

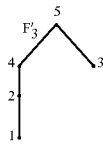 (I)

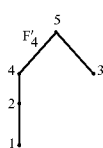 (II)

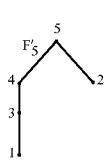 (I)

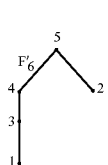 (II)

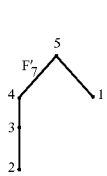 (I)

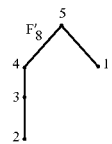 (II)

5.3 The Random Projection

We first define a contractive version of the Random Projection, referred to as the strong Random Projection which takes a random structure and one of its isolated subsets as argument and restricts the labelings to this isolated subset, destroying the complement of this isolated subset in the process.

Definition 83 Let $(X,\sqsubseteq)$ be a partial order with an isolated subset I. The strong random projection S–Proj$((X,\sqsubseteq), I)$ of $(X,\sqsubseteq)$ on I is defined to be the restricted partial order $(I,\sqsubseteq)$.

Definition 84 The strong Random Projection on an isolated subset I of a random structure $R=\mathcal{R}_\mathcal{L}(X,\sqsubseteq)$ is defined as follows: S–Proj(I,R) is the multiset R|I resulting from the restriction of all labelings of $\mathcal{R}_\mathcal{L}(X,\sqsubseteq)$ to the subset I.

Next we consider the Random Projection which produces a copy of the restriction of a labeling to an isolated subset.

Definition 85 Let $(X,\sqsubseteq)$ be a partial order with an isolated subset I. The random projection Proj$((X,\sqsubseteq),I)$ of $(X,\sqsubseteq)$ on I obtained as follows: let J be a newly created set, disjoint from X and such that J is equipped with a partial order $\sqsubseteq$ where $(J,\sqsubseteq)$ is order-isomorphic to the restricted partial order $(I,\sqsubseteq)$.

Definition 86 The Random Projection on an isolated subset I of a random structure $R=\mathcal{R}_\mathcal{L}(X,\sqsubseteq)$ is defined as follows: consider the random projection $(J,\sqsubseteq)$ of the partial order $(X,\sqsubseteq)$ with respect to I. Say $\Psi: (I,\sqsubseteq) \to (J,\sqsubseteq)$ is an order-isomorphism. Proj(I,R) is the multiset $\{F_J|F\in R\}$ resulting from the transposition of all labelings from R to the subset J as follows: $\forall F \in R \; \forall i \in J. \; F_J(j)=F(\Psi^{-1}(j))$.

Theorem 87 Consider an isolated subset I of a random structure $R=\mathcal{R}(X,\sqsubseteq)$. S–Proj(I,R): $\mathcal{R}(X,\sqsubseteq) \to ((\mathcal{R}(I,\sqsubseteq)),K)$ is an RS-preserving operation where $$K = \frac{|\mathcal{R}(X, \sqsubseteq)|}{|\mathcal{R}(I, \sqsubseteq)|}.$$

In case I is strictly isolated, we have: $K=|\mathcal{R}(\lceil M(I)\rceil\uparrow,\uparrow,\sqsubseteq)| \times |\mathcal{R}(\lfloor m(I)\rfloor,\downarrow,\sqsubseteq)|$.

With some abuse of notation we write the following:

Proj(I,R): $\mathcal{R}_{(X,\sqsubseteq)} \to (\mathcal{R}_{(J,\sqsubseteq)_J},K)$.

The abuse lies in the fact that the resulting random structure is produced in addition to the original random structure, which is unchanged and which is not displayed in the above notation. Proj(I,R) is an RS-preserving operation where $$K = \frac{|\mathcal{R}(X, \sqsubseteq)|}{|\mathcal{R}(J, \sqsubseteq_J)|}.$$

In case I is strictly isolated, we have: $K=|\mathcal{R}(\lceil M(I)\rceil\uparrow,\uparrow,\sqsubseteq)| \times |\mathcal{R}(\lfloor m(I)\rfloor\downarrow,\downarrow,\sqsubseteq)|$.

Proof: These results follow from Proposition 54.1 and Proposition 54.3 respectively.

Remark 88 The relation "isolated subset" is transitive, i.e. if J is an isolated subset of a given isolated subset I of a partial order then J is an isolated subset of this partial order. Hence there is no need to apply the Extension Process for the case of the Random Projections.

We consider the example of a strong random projection on an isolated subset of the random structure $\mathcal{A}_{3,3}$.

EXAMPLE 89

We illustrate the effect of a strong random projection on $\mathcal{A}_3 = \mathcal{R}(\{x_1, x_2, x_3\}, \sqsubseteq))$. In the picture below, the first column indicates the possible labels for $x_1$, the second column indicates the labels for $x_2$, while the third column indicates the labels for $x_3$. Let $I=\{x_1, x_3\}$. We display the result of $Proj(I, \mathcal{R}(X, \sqsubseteq)))$, which results in $$K = \frac{3!}{2!} = 3$$

copies of $\mathcal{A}_{22}$. Indeed, we obtain a copy consisting of the labelings $\{(1,3), (3,1)\}$, indicated by (I) on the picture, a copy consisting of the labelings $\{(1,2), (2,1)\}$, indicated by (II) on the picture, and a copy consisting of the labelings $\{(2,3), (3,2)\}$, indicated by (III) on the picture.

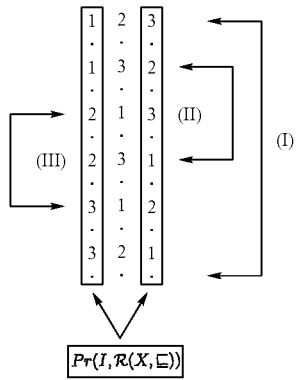

5.4 The Random Split

We define the random split operation first on an atomic random structure $\mathcal{A}_n$ and then use the Extension Process (Theorem 67) to allow applications of the random split operation to Atomic Isolated Subsets of arbitrary random structures.

5.4.1 The Random Split of a Discrete Partial Order

Definition 90 We define the random split operation on a discrete partial order $(X, \sqsubseteq))$ where say $X=\{x_1, \ldots, x_n\}$. The enumeration of the elements of X is irrelevant. Different enumerations will yield order- and label-isomorphic end results for the split operation.

For every $m \in \{1, \ldots, n\}$ we define $\Xi_x$ to be the partial order obtained on X via the transitive reflexive closure of the relation $X_x \cup \overline{X}_x$, where $X_x = \{(x_k, x_m) | 1 \leq k \leq m\}, \overline{X}_x = \{(x_m, x_l) | m < l \leq n\}$ and where the first set is defined to be empty in case $m=1$ and the second set is defined to be empty in case $m=n$.

The random split of the discrete partial order $(X, \sqsubseteq))$ is defined to be the sequence $$((X, \Xi_{x_1}), \ldots,$$

The partial order $\Xi_x$ is illustrated via the following diagram:

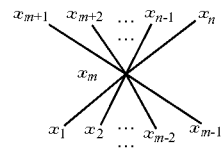

EXAMPLE 91

We illustrate the resulting sequence of partial orders obtained via a random split on the discrete four-element partial order $(X, \sqsubseteq))$, where say $X=\{x_1, x_2, x_3, x_4\}$.

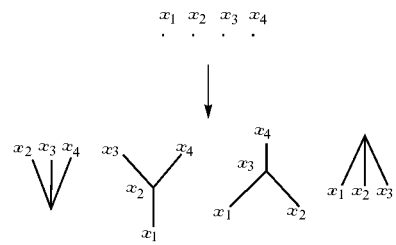

5.4.2 Random Split of a Random Structure

The general definition of the random split operation requires a formulation in terms of random structures. Since a split involves an operation on an atomic isolated subset, we first discuss the result of carrying out a split operation on an atomic random structure, $\mathcal{A}_n = \mathcal{R}_\mathcal{L}(X, \sqsubseteq)$.

We first define the random split operation on a single labeling of an atomic random structure $\mathcal{A}_n = \mathcal{R}_\mathcal{L}(X, \sqsubseteq)$ and then define the random split of $\mathcal{A}_n$ to be the result of applying this operation to each labeling of $\mathcal{A}_n$. Let $\{x_1, \ldots, x_n\}$ be an enumeration of X and let $x \in X$. The reader will remark that the pseudo-code for the random split is similar to the one used in traditional Quicksort [AHU$_{87}$]. Indeed, Quicksort is an example of an algorithm which uses a partitioning of elements based on a random split operation. The "pivot" around which the elements are partitioned is indicated by "x" in the pseudo-code below.

Pseudo-code for random split $Split_x(F)$ on a labeling F of $\mathcal{A}_n$
u:=1; v:=n; a:=F[x];
while u<v do
  while $F[x_u]$<a do u:=u+1;
  while $F[x_v]$>a do v:=v−1;
  if u<v then swap($F[x_u]$, $F[x_v]$,F)

Remark 92 Let $\mathcal{L}' = (a_1, \ldots, a_n)$ be the sorted list obtained from the set of labels $\mathcal{L}$. If m is the position of the label F(x) in the sorted list $\mathcal{L}'$ i.e. $F(x)=a_m$, then $Split_x(F)(x_m)=a_m$. Moreover the labels to the left of $a_m$ form the set of labels smaller than $a_m$, i.e. $\{a_1, \ldots, a_{m-1}\}$, and the labels to the right of am form the set of labels larger than $a_m$, i.e. $\{a_{m+1}, \ldots, a_n\}$.

We define $Split_x(\mathcal{A}_n)$ to be the set of functions obtained by applying the preceding algorithm to each of the n! labelings F of $\mathcal{A}_n$.

In the following we will identify (for each $m \in \{1, \ldots, n\}$); labelings G from $(X, \Xi_x))$ and labelings G from $Split_x(\mathcal{A}_n)$, where $G=Split_x(F)$ for some $F \in \mathcal{A}_n$ which satisfy:

$G(x_k)<G(x)$ if $k \leq m, G(x)=a_m$ and $G(x_l)>G(x)$ if $l > m$.

It is easy to verify that any choice of x will produce the same set of functions, i.e. ∀x, x'∈X. $\text{Split}_x(\mathcal{A}_n)=\text{Split}_{x'}(\mathcal{A}_n)$. Hence the choice of x does not need to be specified in this context, but of course will be specified in particular data structure operations that are based on the Split Operation since the choice of x will affect the way subsequent computations proceed.

For every choice of x∈X, we let $\mathcal{A}_n^{x,m}$ denote the set of labelings of $\mathcal{A}_n$ for which the label F(x) is the m-th element, i.e. $a_m$, in the sorted list $\mathcal{L}'$. We let $\text{Split}_x(\mathcal{A}_n^{x,m})$ denote the set of functions obtained by applying random split to all labelings F of $\mathcal{A}_n^{x,m}$ Remark 93 We remark that $\mathcal{A}_n^{x,m}$=(n−1)! and $|\mathcal{R}_\mathcal{L}(X,\Xi_m)|$= (m−1)!(n−m)!

Lemma 94 For all $\mathcal{L}$,X,χ∈X, m ≦|X|=$\mathcal{L}$,=n, we have:

1) ∀m ∈{1, . . . ,n}. $\text{Split}_\chi(\mathcal{A}_n^{x,m})=\mathcal{R}_\mathcal{L}(X,\Xi_m)$.

2) $|\text{Split}_\chi^{-1}(G) \cap (\mathcal{A}_n^{x,m})|$ is independent of G.

Proof: To show 1), we remark that the inclusion from left to right follows from the definition of the pseudo-code of the Split operation. To show the converse, let G∈R=$\mathcal{R}_\mathcal{L}(X,\Xi_m)$, then, still from the definition of the pseudo-code, it is clear that G=$\text{Split}_\chi$(F), when F∈$\mathcal{A}_n$ is obtained from G by swapping only the labels G(χ) and G(χ_m) of χ and χ_m respectively. Hence we obtain the local surjectivity of $\text{Split}_\chi$ with respect to $(\mathcal{A}_n^{x,m})$ i.e. $\text{Split}_\chi(\mathcal{A}_n^{x,m})=\mathcal{R}_\mathcal{L}(X,\Xi_m)$.

To show 2), we remark that for every G, G' ∈ $\mathcal{R}_\mathcal{L}(X,\Xi_m)$, we have G(χ)=G'(χ). Let a=G(χ). Because of the structure of the partial order (X,$\Xi_m$), it is clear that there is a permutation σ of the labels of G which satisfies σ(a)=a,∀b.b <a→σ(b)<a and b>a→σ(b)>a and which is such that G'=σ∘G. But then, it is clear that for any F∈ $(\mathcal{A}_n^{x,m})$ we have: $\text{Split}_\chi$(F)=G⇔$\text{Split}_\chi$ (σ∘F)=σ∘G, from which 2) follows immediately.

Proposition 95 For all $\mathcal{L}$, X,χ∈X,m ≦|X|=|$\mathcal{L}$|=n , we have:

$$\text{Split}_\chi: \mathcal{A}_n \mapsto ((\mathcal{R}_\mathcal{L}(X,\Xi_1),K_1), \ldots, (\mathcal{R}_\mathcal{L}(X,\Xi_n),K_n)),$$

where ∀m ∈{1, . . . ,n}.

$$K_m = \binom{m-1}{n-1}.$$

Proof: We remark that $\mathcal{A}_n^{x,m}$ forms a partition of $\mathcal{A}_n$ Combining 1) and 2) of Lemma 94, we obtain that $|\text{Split}_\chi^{-1}$(G)∩ $\mathcal{A}_n^{x,m}$=$K_m$ for some non-zero constant $K_m$. Finally, we remark that ∀m ∈{1, . . . ,n}.

$$K_m = \binom{n-1}{m-1}$$

by Remark 93.

From Proposition 95 and the Extension Process (Theorem 67), we obtain (using the notation of Theorem 67):

Theorem 96 Let R= $\mathcal{R}_\mathcal{L}(X,\sqsubseteq)$) be a random structure and let I be an atomic isolated subset of (X,$\sqsubseteq$)) , enumerated by $y_1, \ldots, y_{n'}$. Then $$\text{Ext}(I)(\text{Split}_\chi):R \mapsto (\mathcal{R}_\mathcal{L}(X,\sqsubseteq_1^*), K_1), \ldots, \mathcal{R}_\mathcal{L}(X,\sqsubseteq_n^*),K_n),$$

where $j_i∈\{1, . . . ,n\}$.

$$K_m = \binom{n-1}{m-1}.$$

The following example illustrates the effect of a split on an atomic strictly isolated subset I. This subset has no degree of freedom on the labels for the set X−I. Indeed, X−I consists of the maximum and the minimum of the underlying partial order and hence there is a unique label assigned to each of these elements. For such an atomic strictly isolated subset, the effect of a split is essentially the same as the effect of a split on atomic random structures $\mathcal{A}_n$ as discussed in Lemma 94. The example nevertheless provides a good illustration of the type of random structures generated via a split operation. Example 98 illustrates how a split operates on a more general type of atomic isolated subset I.

EXAMPLE 97

We illustrate the effect of a split on the following partial order (X, $\sqsubseteq$)) for which the elements of an isolated subset I have been indicated via the ellipse:

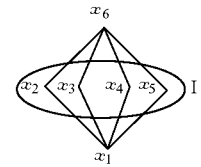

We consider the following enumeration of the elements of I: ∀i∈{1, . . . , 4}. $y_i=\chi_{i+1}$. After performing the split on I= $\{\chi_2, \ldots ,\chi_5\}$, we obtain the sequence:

$$((X,\sqsubseteq_{y_1}), \ldots, (X,\sqsubseteq_{y_4})) = ((X,\sqsubseteq_{x_2}), \ldots, (X,\sqsubseteq_{x_5}))$$

(X,$\sqsubseteq$)

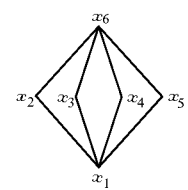

(X,$\sqsubseteq x_2$)

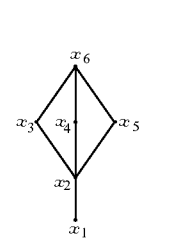

(X,$\sqsubseteq x_3$)

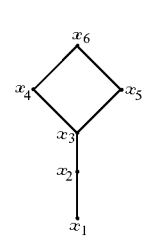

-continued

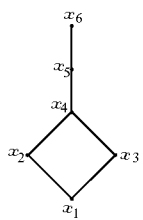
$(X, \sqsubseteq_{x_4})$

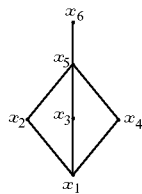
$(X, \sqsubseteq_{x_5})$

We continue the example and consider the set of labels $\mathcal{L}=\{1, 2, 3, 4, 5, 6\}$. It is easy to verify that the number of possible labelings for the partial order $(X, \sqsubseteq)$ is 24.

We consider the atomic isolated subset I of $A_n \mapsto (X, \sqsubseteq)$ determined by the four element subset $\{x_2, x_3, x_4, x_5\}$. We consider the set of labelings $\mathcal{F}$, consisting of the labelings that label the element $y_3$, i.e. $\chi_4$, with the label 4 as displayed in the following picture.

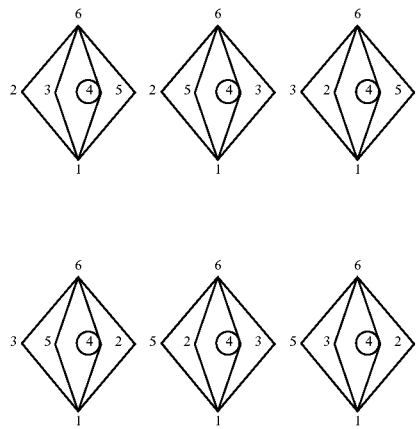

The split of the partial order $(X, \sqsubseteq)$ results in the partial order with Hasse Diagram:

Finally, we display the result of the operation Ext(I)(Split) $\mathcal{R}_{\mathcal{L}}(X, \sqsubseteq)$ on the subset of labelings $\mathcal{F}$.

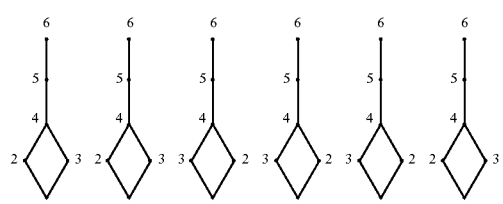

Clearly n = 4 and m = 3. Thus $$\binom{n-1}{m-1} = \binom{3}{2} = 3$$

copies of the random structure $\mathcal{R}_{\mathcal{L}}(X, \sqsubseteq_{y_4})$ have been produced.

The following example illustrates the effect of a split on an atomic isolated subset I of a given random structure $\mathcal{R}(X, \sqsubseteq)$ for which the labels on X−I can vary.

EXAMPLE 98

We consider the same tree and random structure over this tree as in Example 82. After performing a split, Ext(I)(Split)(R) determined by the atomic isolated subset I enumerated by $y_1 = \chi_1, y_2 = \chi_2$, and by the Extension Process, Theorem 67, we obtain a set of labelings for a new partial order as displayed below.

(I)

(II)

(I)

(II)

-continued

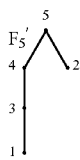
(I)

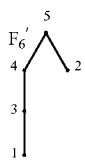
(II)

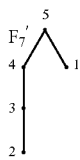
(I)

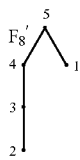
(II)

We obtain two copies of a random structure indicated by (I) and (II) above. In fact, the multiplicities determined by the Extension Theorem are:

$$K_1 = \binom{1}{0} = 1 \text{ and } K_2 = \binom{1}{1} = 1.$$

I.e. the split operation, as defined, does not automatically identify these random structures. Of course this identification can be achieved via a simple adaptation of the definition of the split operation if desired or during the time analysis later if this turns out to be useful. In that case would obtain the same end result as for the unary random product discussed in Example 82.

5.5 The Random Deletion

In this subsection we introduce two important data structure operations $\overline{Del}, Del$ of deleting a label from a random structure. These operations allow one to incorporate dynamic data structures, thereby removing a main obstacle in the determination of Average-Case Time of algorithms based on dynamic data structures, such as Heapsort. They are generalizations of two operations $Del^M$ and $Del^m$ that we introduce below.

Remark 99 We chose to implement the Deletion operations such that the label a to be deleted will be returned by the operation. The element $\chi$ labeled by a however will be removed from the partial order under consideration. It is easy to see that the operations could be defined in an alternative way such that the element $\chi$ is actually kept after deletion as a minimum of the partial order, where a is kept as the label of this new minimum. We prefer to interpret the deletion operation in the usual way, i.e. leading to the removal of an element.

5.5.1 Deleting an Extremal Label

Definition 100 Consider $(X, \sqsubseteq))$ a finite partial order. For any extremal element e of the partial order, we define $(X, \sqsubseteq))-\{e\}=(X-\{e\}, \sqsubseteq_e)$, where $\sqsubseteq_e$ is obtained from the binary relation $\sqsubseteq$ by removing all pairs of $\sqsubseteq$ which contain the element e.

We leave the straightforward proof of the following lemma to the reader.

Lemma 101 Let $(X, \sqsubseteq))$ be a finite partial order and let e be an extremal element of the partial order. $(X, \sqsubseteq))-\{e\}=(X-\{e\}, \sqsubseteq_e)$ is a partial order which we refer to as the result of deleting the extremal element e from the given partial order $(X, \sqsubseteq))$.

We define the Random Deletion operations on a partial order.

Definition 102 Given a finite partial order $(X, \sqsubseteq))$. $Del(X, \sqsubseteq))$ is defined to be the sequence of partial orders $(X-\{\chi\}, \sqsubseteq_x)_{x \in m(X)})_{\chi \in m(X)}$ while $\overline{Del}(X, \sqsubseteq))$ is defined to be the sequence of partial orders $(X-\{\chi\}, \sqsubseteq_x)_{x \in M(X)})_{\chi \in M(X)}$.

We recall that the greatest (least) label must occur at a maximal (minimal) element (cf. Remark 9).

Definition 103 We define the operation of deleting the largest label a from a given labeling F as follows: $Del^M(F) = F\restriction(X-\chi)$ where $\chi$ is the element labeled with a. We define the operation of deleting the largest label a from a given random structure R to be the result of applying this operation to each labeling of R, i.e. $Del^M(R) = \{Del^M(F) | F \in R\}$. We will informally refer to $Del^M(R)$ as the result of deleting the maximum element of the random structure $\mathcal{R}_\mathcal{L}(X, \sqsubseteq))$. Similar one can define $Del^m$ in two stages, first as an operation on labelings and subsequently as an operation on random structures.

We state the following RS-preservation result for the operation $Del^M$ which returns a sequence of random structures, each of which has multiplicity 1. Similar results hold for the operation $Del^m$.

Proposition 104 If $\mathcal{R}_\mathcal{L}(X, \sqsubseteq)$ is a random structure and a the largest label of $\mathcal{L}$ then:

1) $\mathcal{R}_{\mathcal{L}-a}(X-x, \sqsubseteq_x)) = \{F\restriction(X-\chi) | F \in \mathcal{R}(X, \sqsubseteq), F(\chi)=a\}$.

2) $Del^M \mathcal{R}_\mathcal{L}(X, \sqsubseteq))) = \mathcal{R}_{\mathcal{L}-\{a\}}(X-\{\chi\}, \sqsubseteq_x)_{x \in m(X)}$ Proof: Exercise.

We illustrate the deletion of the minimum label via $Del^m$ on the following example.

EXAMPLE 105

We circle the label 1 to be deleted.

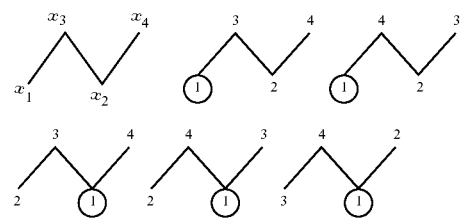

The effect of deleting the label 1 is given by:

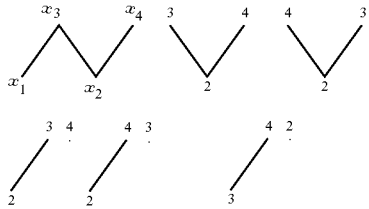

Hence we obtain two random structures, consisting of the labelings from the set $\{2,3,4\}$ of a connected V-shaped partial order and of a partial order consisting of a two point component and a single element component.

The effect of deleting the label 2 on the other hand does not yield a sequence of random structures. This is explained by the fact that the minimum label always has to occur at a minimal element. The label 2 does not and for instance occurs once at a maximal element. If we were to delete the label 2 from each of the five labelings, the result would be the following set of labelings, which do not form a sequence of random structures:

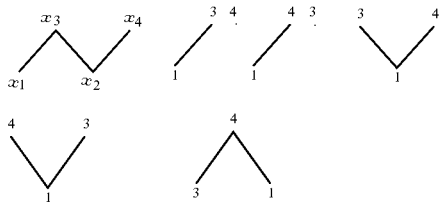

The operations of deleting an extremal label will take as inputs the labelings from a random structure, where these labelings are stored in a variable X. Hence the operations will be denoted as: $Del^M(X)$ and $Del^m(X)$ for the deletion of a maximal label and a minimal label respectively. These operations remove, for any given labeling, the extremal element from the partial order corresponding to the largest label. The operations return this largest label and replace the random structure by a new sequence of random structures as described above.

5.5.2 Percolation and Deletion of Arbitrary Labels

We consider here the case of labels for elements which are not necessarily extremal. It is clear that the deletion of an internal label cannot simply occur by removing a label from all possible labelings where connections with other elements are deleted in a similar way as for the deletion of an extremal label. The same problem arises as for the deletion of the label 2 in Example 105.

In order to delete an arbitrary label a from a random structure, for a given labeling F, we proceed as follows in two steps. First we percolate an internal label to a position where it becomes a label of an extremal element. Then we carry out the deletion of the newly created extremal label as described in the previous section.

In the following we will assume that the label a to be deleted actually occurs as a label in the random structure.

Percolation

Percolation of a label a is carried out as follows:

Search for the index i of the element $\chi_i$ with label a. This search can start for instance at the minimal (or maximal) labels, exhaustively searching labels at every level until the label in question is found.

We sketch two methods to remove the label, via downwards or upwards percolation, each of which can be applied in our context.

We describe the process of percolating an element downwards.

Perc

Here we replace the value of a by a value less than any label from the labeling F under consideration. This value is only a technical aid and is indicated by $a^-$. The label $a^-$, which will become a part of the given labeling, is then pushed down in the usual way, i.e. the process is exactly the opposite as in the definition of ⊗ where we insert one element into a random structure.

The label $a^-$ is systematically swapped with the largest label of among the elements which are immediately below the element labeled with $a^-$, in case there are at least two elements immediately below the given element, or with the label of the single element immediately below the element labeled with $a^-$ (depending on which is the case) until label $a^-$ becomes the label of a minimal element. Of course, in case $a^-$ was already a label of a minimal element, no swaps are necessary.

Remark 106 The above distinction between more than one element and a single element immediately below a given element means that in practice the algorithm will need n −1 comparison in case there are n ≧2 children below the node under consideration (in order to determine the maximum label of the children) and, at first glance, it would appear that no comparisons need to be made in case of a single child below the node under consideration. Indeed, in case of a single child, we can immediately perform a swap since the parent node is labeled with $a^-$ which by definition is smaller than the label of the unique child. However, in practice one also needs to determine whether a parent has one or more children, which inherently involves a comparison. In order to obtain a more fair representation of cost, we will assume in the following that heaps are full binary trees, i.e. every parent has exactly two children, some of which may be the empty tree. A leaf then is a node for which both children are empty. In case of a single child, one comparison will be counted to determine this situation. We will return to this issue in the analysis of Percolating Heapsort.

Next we describe the process of percolating an element upwards.

Perc

We can alternatively replace the label of a by a value which is larger than all labels from F, denoted by $a^+$ and push-up the label in a similar way.

Deletions of Arbitrary Labels

Finally, the operations Del and $\overline{Del}$ are again first defined on labelings and then extended to random structures.

To define the operations on labelings, we consider two inputs: an index k and a labeling F.

We can now define the deletion of an arbitrarily selected label of a given labeling, which generalises the deletion of extremal labels.

Del(k,F) is defined to be the operation of percolating the k-th smallest label a downwards as a label $a^-$ followed by the deletion of the extremal element labeled by $a^-$. The output returned is the deleted label and the random structure is updated to be the newly obtained sequence of random structures, i.e. a sequence of partial orders all labeled from the same set of labels to form the random structures. The definition of $\overline{Del}(k,F)$ is similar.

We note that in contrast with the deletion operation which generates a sequence of random structures, the percolation operation only generates a single random structure.

For deletion operations we set aside in the definition of data structure operations a countable set of storage variables U, V, W ... which are used to make allocations of the deleted labels to a singleton random variable, i.e. a random variable of size one. These can then be inter combined of course with the join operation.

The Delete operations hence return the deleted label and update the random structure to a new sequence of random structures as described above.

We illustrate both deletion processes in the following example.

EXAMPLE 107

Consider the partial order $(X, \sqsubseteq)$ given by the following Hasse diagram:

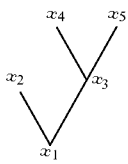

For a given set of labels $\mathcal{L}=\{1, 2, 3, 4, 5\}$ we obtain the following labelings:

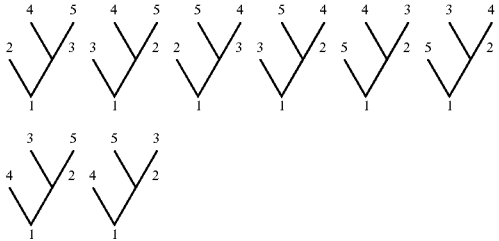

To continue the example, we illustrate the result of removing the second smallest label, which for the case of our example is the label 2, from the above random structure via the $\overline{\text{Del}}$ method and the Del method respectively.

We first illustrate the $\overline{\text{Del}}$ method and display the change of the label 2 to $2^+$, the subsequent end result of calling push-up on this new label and finally we display the resulting sequence of random structures. The label 2 is then used to label the element of a singleton random structure U.

We illustrate below the effect of removing the second smallest label via the $\overline{\text{Del}}$ method on the first four labelings.

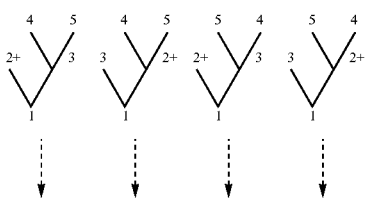

-continued

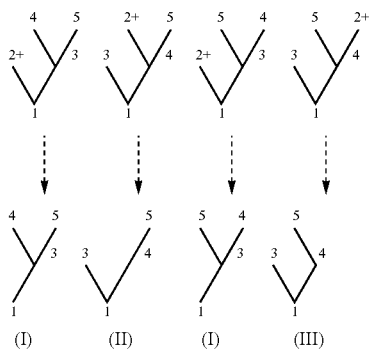

We illustrate the effect on the next four labelings.

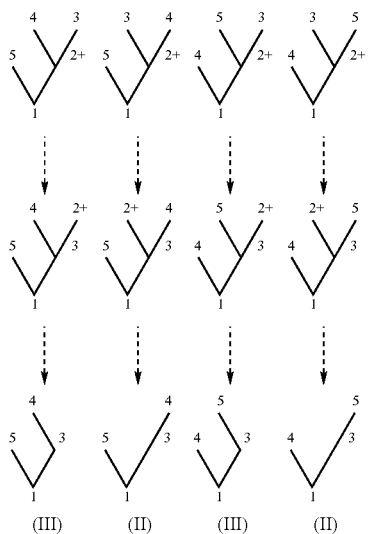

Hence we obtain a sequence of three new random structures, identified by (I), (II) and (III), each of which is labeled from the set of labelings $\{1, 3, 4, 5\}$. Of course, one can see that (II) and (III) are identical. Hence they can be identified during an analysis of the deletion process. Since however the copies created in this way depend on the structure of the original partial order, we will not identify the copies at this stage and treat each as a partial orders would require too much time in general. Later on, in a complexity analysis of an algorithm involving a deletion process, if needed, we can make the necessary identifications during the set up of the recurrence equations depending on the partial order under consideration.

Removing label 2 via the Del method:

We only illustrate the end result which consists of a single new random structure with an extra singleton random structure V labeled with 2:

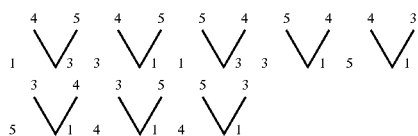

The following result states that the Deletion operation is RS-preserving. The proof is similar to (and essentially contained in) the proof of the RS-preservation of the Random Product since both operations are based on the push-down/push-up operations. Hence we will not include the proof here.

Theorem 108 Let $R=\mathcal{R}_{\mathcal{L}}(X\sqsubseteq)))$ be a random structure and $k \in \{1, \ldots, |X|\}$. The operation $\overline{\mathrm{Del}}(k,R)$ is RS-preserving, $$\overline{\mathrm{Del}}(k):R \mapsto (\mathcal{R}_{\mathcal{L}-\{a\}}(X-\{\chi\}, \sqsubseteq_x))_{x \in M(X)},$$

where a is the k-th smallest label of $\mathcal{L}$. A similar result holds for Del(k). Both operations lead to random sequences for which the multiplicities are constant 1.

Remark 109 We remark that both deletion operations transform the empty Random Structure ∅ to ∅.

As for the previous operations, all versions of the random deletion can be extended via the Extension Process (Theorem 67) to isolated subsets and finally extended to arbitrary random sequences via Definition 26.

5.6 Contractive Operations Revisited

We provide two counter-examples demonstrating that the Extension Process can not be generalized to isolated subsets for the case of contractive operations.

COUNTER-EXAMPLE 110

Deletion

We illustrate that the deletion operation on isolated subsets does not allow for an extension as in The Extension Process (Theorem 67).

Consider the partial order given in Example 12f) and the corresponding random structure $\mathcal{H}_4$ of heaps of size 4. We consider the isolated subset $I = x_1, x_2 \emptyset$ (cf. Example 12 f)). If we apply the deletion operation Del to the four copies of the random structure $S_2$ determined by this isolated subset, then we obtain the following heaps, which do not form a random structure. Indeed, randomness preservation is excluded since the cardinality of $H_3$ does not divide the cardinality of $\mathcal{H}_4$.

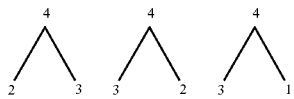

COUNTER-EXAMPLE 111

Strong Projection

Consider the same random structure $\mathcal{H}_4$ discussed in the previous counter-example and the isolated subset $I = x_1, x_2$. Consider a strong projection on the isolated subset $J = \{\chi_1\}$ of the set I. The result is displayed below. Once again, we do not obtain a random structure.

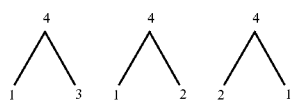

5.7 Uniformly RS-Preserving Functions

Uniformly RS-preserving functions have been introduced in Definition 22. By Remark 23 and the fact that the Random Product and the Random Projection are strongly RS-Preserving, it follows that these operations are uniformly RS-preserving. We leave it as a straightforward exercise to verify that the Random Split is uniformly RS-preserving.

However the Random Deletion is not uniformly RS-preserving. This can be readily verified from Example 107. If one applies the Random Deletion operation $\mathrm{Del}^M$ to each of the eight labelings displayed in Example 107, a partition yielding an RS-representation of this operation necessarily constitutes of three components: one component of cardinality 2 and two components of cardinality 3. This follows from an inspection of the three partial orders corresponding to the Random Sequence which has been obtained as the result of the deletion.

6 Compositional Determination of Average Time

6.1 Composition and Affine Combinations

In the following we state the results for RS-preserving data structure operations.

Remark 112 1) Let P be a data structure operation and R and R' two random sequences, where $R=[\vec{R}_p, \vec{K}_p]$ and $P: [\vec{R}_p, \vec{K}_p] \to R'$. As usual, the exact time of P on an input labeling F, denoted by $T_P(F)$, is the total number of comparisons made by P during the execution of the data structure operation P for the input F. We will indicate the average time for a data structure operation by $\overline{T}_P(R)$, which is warranted by the fact that our data structure operations are RS-preserving and hence can be interpreted as operating on random structures. So the average time $\overline{T}_P$ is given by:

$$\overline{T}_P(R) = \frac{\sum_{i=1}^{i=p} K_i \times \sum_{F \in R_i} T_P(F)}{|R|}$$

$$= \frac{\sum_{i=1}^{i=p} K_i \times \sum_{F \in R_i} T_P(F)}{\sum_{i=1}^{p} K_i \times |R_i|}.$$

2) For the particular case where $R=(R_1, K_1)$, the previous equality reduces to:

$$\overline{T}_P(R) = \overline{T}_P(R_1).$$

The following proposition shows that the average time, as a consequence of RS-preservation, can be expressed as an affine combination in terms of the average times of the components of the input Random Sequence.

Proposition 113 Let $R=[\vec{R}_p, \vec{K}_p]$ then $$\overline{T}_P(R) = \sum_{i=1}^{i=p} \alpha_i \times \overline{T}_P(R_i),$$

where $$\forall i \in \{1, \ldots, p\}.$$

$$\alpha_i = \frac{K_i \times |R_i|}{\sum_{i=1}^{p} K_i \times |R_i|}.$$

Proof: The result follows since $\Sigma_{F \in R_i} T_p(F) = \overline{T}_P(R_i) \times 51 R_i|$.

Theorem 114 (Compositionality) Consider RS-preserving data structure operations P and Q such that $P:R \to R'$ and $Q:R' \to R''$. Assume that $R=[\vec{R}_p, \vec{K}_p]$ and that $\forall i \in \{1, \ldots, p\}$. $P(R_i)=[(R_{(i,1)}, L_{(i,1)}), \ldots, (R_{(i,q(i))}, L_{(i,q(i))})]$.

Define $\forall i \in \{1, \ldots, p\}$. $R_i' = [(R_{(i,1)}, M_{(i,1)}) \ldots, (R_{(i,q(i))}, M_{(i,q(i))})]$, where each $M_{(i,j)}$ is a multiple of $L_i$, i.e. $M_{(i,j)} = L_{(i,j)} \times K_i$. Finally let $P(R) = R' = [R_p']$. Then:

$$\overline{T}_{P;Q}(R) = \overline{T}_P(R) + \overline{T}_Q(R'),$$

where both average times are expressible as affine combinations:

$$\overline{T}_P(R) = \sum_{i=1}^{i=p} \alpha_i \times \overline{T}_P(R_i)$$

and $$\overline{T}_Q(R') = \sum_{i=1}^{p} \sum_{j=1}^{q(i)} \beta_{(i,j)} \times \overline{T}_Q(R_{(i,j)}),$$

where $\forall i \in \{1, \ldots, p\} \forall j \in \{1, \ldots, p(i)\}.$ $$\alpha_i = \frac{K_i \times |R_i|}{\sum_{i=1}^{p} K_i \times |R_i|} \text{ and } \beta_{(i,j)} = \frac{M_{i,j} \times |R_{(i,j)}|}{|R'|}.$$

Proof:

$$\overline{T}_{P;Q}(R) = \frac{\sum_{i=1}^{p} K_i \times \sum_{F \in R_i} (T_{P;Q}(F))}{|R|}$$

$$= \frac{\sum_{i=1}^{p} K_i \times \sum_{F \in R_i} ((T_P(F) + T_Q(P(F)))}{|R|}$$

$$= \overline{T}_P(R) + \frac{\sum_{i=1}^{p} K_i \times \sum_{F \in R_i} (T_Q(P(F)))}{|R|}.$$

We remark that $$\frac{\sum_{i=1}^{p} K_i \times \sum_{F \in R_i} (T_Q(P(F)))}{|R|} = \frac{\sum_{i=1}^{p} K_i \times L_{(i,j)} \times \sum_{G \in R_{(i,j)}} T_Q(G)}{|R|}$$

$$= \frac{\sum_{i=1}^{p} \sum_{j=1}^{q(i)} M_{i,j} \times \sum_{G \in R_{(i,j)}} T_Q(G)}{|R|}$$

$$= \frac{\sum_{i=1}^{p} \sum_{j=1}^{q(i)} M_{i,j} \times \sum_{G \in R_{(i,j)}} T_Q(G)}{|R|}$$

$$= \frac{\sum_{i=1}^{p} \sum_{j=1}^{q(i)} M_{i,j} \times |R_{(i,j)}| \times \overline{T}_Q(R_{(i,j)})}{|R|}$$

$$= \overline{T}_Q(R'),$$

where the last equality follows from Proposition 113 and the fact that $|R| = |R'|$.

We continue to illustrate informally on a basic example that the preservation of Random Structures is crucial for Average-Time Analysis. We present an example of a toy program "PROJ" which we refer to as "the projection program" and which nicely illustrates how control over the number of copies of Random Structures produced in the output multi-set is crucial in Average-Case Time analysis.

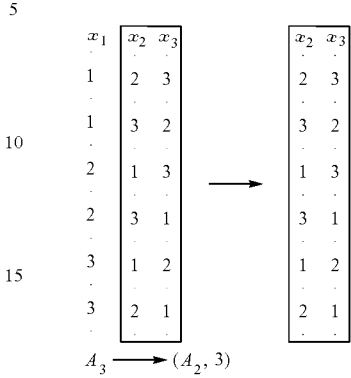

Its pseudo-code is described as follows: PROJ takes lists of size 3 and returns the tail of the input list, i.e. the input list without the first element, as output. One aim of the work is to interpret $\mathcal{MOQA}$ programs as transformation from Random Structures to Random Structures. In fact we recall that will in general consider more general transformations from "Random Sequences" to "Random Sequences". PROJ illustrates a Random Structure Preserving transformation.

The input-output relation for PROJ is displayed above, where $\chi_1, \chi_2, \chi_3$ represent the elements of the input list of size 3 and $\chi_2, \chi_3$ are the elements of the output list of size 2.

It is clear that the program PROJ transforms the Random Structure $\mathcal{L}$ to three copies of the Random Structure $\mathcal{A}_2$, after identification up to order-isomorphism. Indeed, the first two output lists form the set $\{(2,3), (3,2)\}$, the second two output lists form the set $\{(1,3), (3,1)\}$ and the final two form the set $\{(1,2), (2,1)\}$. Hence after identification up to order-isomorphism we obtain 3 copies of the Random Structure $\mathcal{A}_2$.

Identification up to order-isomorphism is typically required to make the Average-Case Time analysis feasible. To ensure that this identification is possible, we need to guarantee that the resulting output multi-set is once again distributed in a specific way. We will require in particular that the output multi-set will consist of several copies of a Random Structure (Strong Random Structure Preservation) or more generally consists of a Random Sequence where each Random Structure in the sequence is copied a number of times. The multiplicity of these copies plays a crucial role in carrying out the Average-Case Time analysis. We illustrate this on our example PROJ under the assumption that PROJ is composed with another program, say P. Through IO-Compositionality combined with the fact that PROJ is Random Structure Preserving, the average time of PROJ; P can be specified via the linear combination:

$$\overline{T}_{PROJ;P}(\mathcal{A}_3) = \overline{T}_{PROJ}(\mathcal{A}_3) + \overline{T}_P(\mathcal{A}_2).$$

Indeed, by IO-Compositionality and the fact that PROJ is Random Structure preserving we know that:

$$\overline{T}_{PROJ;P}(\mathcal{A}_3) = \overline{T}_{PROJ}(\mathcal{A}_3) + \overline{T}_P(O_{PROJ}(\mathcal{A}_3))$$

$$= \overline{T}_{PROJ}(\mathcal{A}_3) + \overline{T}_P(\{(\mathcal{A}_2, 3)\})$$

However

-continued $$\overline{T}_P(\{(A_2, 3)\}) = \frac{\sum_{l \in \{(A_2,3)\}} T_P(l)}{|\{(A_2, 3)\}|} = \frac{3 \sum_{l \in A_2} T_P(l)}{3 \times 2} = \overline{T}_P(A_2).$$

Hence we obtain the linear expression: $T_{PROJ, P}(A_3) = \overline{T}_{PROJ}(A_3) + \overline{T}_P(A_2)$.

So it is clear that, for the case of the above given basic examples, IO-Compositionality and Random Structure Preservation implies Linear-Compositionality. Since IO-Compositionality is guaranteed to hold for the Average-Case Time measure, we can state more concisely, for the case of the above examples, that Random Structure Preservation implies Linear-Compositionality.

References

[AHU87] A. Aho, J. Hopcroft and J. Ullman. *Data structures and algorithms*. Addison-Wesley Series in Computer Science and Information Processing, Addison-Wesley, 1987.

[DP$_{90}$] B. A. Davey, H. A. Priestley, *Introduction to Lattices and Order*, Cambridge University Press, 1990.

The invention claimed is:

1. A method of developing software code for executing on a target digital processor using a memory in which it maintains data structures having elements, each of the elements storing data which is represented by a label, and at least some links between the elements being created by the target processor as data is being processed, the method comprising the steps of:
    (a) writing the software code with data structure processing operations which comply with random structure preservation rules, and
    (b) a static analysis timing tool automatically:
        (i) parsing the code developed in step (a) to identify all operations,
        (ii) determining from an operation and all possible input states for that operation an average time value for execution of the operation by a target data processor, and storing said average time value,
        (iii) determining from the operation and all possible input states all possible output states for that operation,
        (iv) repeating steps (ii) and (iii) for each next operation, using the all possible output states determined in step (iii) as all possible input states, and
        (v) generating an output total average time which is a sum of all average times stored in step (ii); and
    wherein said rules require the labels to be comparable;
    wherein the rules require directionality in links between elements and labels are assigned to elements to respect directionality of the links; and
    wherein all directions of links of a data structure indicate the same label comparison ordering.

2. The method as claimed in claim 1, wherein the timing tool uses pre-stored values for all possible input states for the first operation, and the output of step (iii) for the subsequent operation.

3. The method as claimed in claim 1, wherein the rules require random sequence preservation, in which there is random structure preservation for operations performed on all random structures in a random sequence.

4. The method as claimed in claim 1, wherein some elements store a pair of a label and a piece of data.

5. The method as claimed in claim 1, wherein a rule requires that all labels of a particular data structure are different.

6. A method of developing software code for executing on a target digital processor using a memory in which it maintains data structures having elements, each of the elements storing data which is represented by a label, and at least some links between the elements being created by the target processor as data is being processed, the method comprising the steps of:
    (a) writing the software code with data structure processing operations which comply with random structure preservation rules, and
    (b) a static analysis timing tool automatically:
        (i) parsing the code developed in step (a) to identify all operations,
        (ii) determining from an operation and all possible input states for that operation an average time value for execution of the operation by a target data processor, and storing said average time value,
        (iii) determining from the operation and all possible input states all possible output states for that operation,
        (iv) repeating steps (ii) and (iii) for each next operation, using the all possible output states determined in step (iii) as all possible input states, and
        (v) generating an output total average time which is a sum of all average times stored in step (ii),
    wherein said rules require that in an operation only one labeling of a data structure is used at any given time and the output of the operation is another data structure with a particular labeling, and this is repeated for every labeling of a data structure.

7. The method as claimed in claim 6, wherein an operation on a random structure is grouped into one or more random structures, namely a random sequence of random structures.

8. The method as claimed in claim 7, wherein if some of the random structures in a random sequence are identical, for at least some specified operations the rules require that they are grouped together and represented by a copy of the random structure together with a multiplicity number indicating how many times it appears in the random sequence.

9. The method as claimed in claim 1, wherein the timing tool:
    initially takes a random structure, consisting of initial input states, and the first operation of the program code on that random structure,
    calculates the random sequence outputted by the operation,
    takes that random sequence and the subsequent operation is performed on that random sequence,
    takes each random structure in that random sequence and applies the principles of how an operation changes a structure to determine its associated random sequence,
    replaces the random structures in the original random sequence, whereby the new random sequences reflecting the consequences of the operation on the random structures in the original random sequence, and
    continues by applying the next operation and repeats iterations until program completion and the final random sequence is produced.

10. The method as claimed in claim 9, wherein the timing tool takes an original random structure and generates a new sequence of data structures based on said rules for operations and proceeds to compute multiplicities in the output random sequence.

11. The method as claimed in claim 1, wherein an operation is a product operation in which input data structures are connected by linking elements in a manner which preserves the directionality of links of both input data structures.

12. The method as claimed in claim 11, wherein the product operation comprises the further steps of re-organizing the labels of the output data structure to preserve consistent directionality.

13. The method as claimed in claim 12, wherein the further steps are performed by push-up and push-down helper methods.

14. The method as claimed in claim 11, wherein the input data structures are isolated sets, the isolated sets have the same elements directly above them and directly below them, and both sets are distinct, having null intersection.

15. A method of developing software code for executing on a target digital processor using a memory in which it maintains data structures having elements, each of the elements storing data which is represented by a label, and at least some links between the elements being created by the target processor as data is being processed, the method comprising the steps of:
   (a) writing the software code with data structure processing operations which comply with random structure preservation rules, and
   (b) a static analysis timing tool automatically:
      (i) parsing the code developed in step (a) to identify all operations,
      (ii) determining from an operation and all possible input states for that operation an average time value for execution of the operation by a target data processor, and storing said average time value,
      (iii) determining from the operation and all possible input states all possible output states for that operation,
      (iv) repeating steps (ii) and (iii) for each next operation, using the all possible output states determined in step (iii) as all possible input states, and
      (v) generating an output total average time which is a sum of all average times stored in step (ii); and
   wherein an operation is a split operation which adds links between elements of an input data structure according to comparisons of labels with a particular element.

16. The method as claimed in claim 15, wherein a rule requires that the input data structure must be discrete, however the rule allows that the input data structure is a discrete isolated subset of another data structure.

17. The method as claimed in claim 16, wherein the output of a split operation is a data structure in which all elements fall into one of three categories, namely a set in which the elements store data with labels greater than that of the particular element, the particular element, and a set of elements which store data having labels less than that of the particular element.

18. The method as claimed in claim 1, wherein an operation is a projection operation in which a copy is performed of a data structure to another data structure, with preservation of directionality between elements.

19. A method of developing software code for executing on a target digital processor using a memory in which it maintains data structures having elements, each of the elements storing data which is represented by a label, and at least some links between the elements being created by the target processor as data is being processed, the method comprising the steps of:
   (a) writing the software code with data structure processing operations which comply with random structure preservation rules, and
   (b) a static analysis timing tool automatically:
      (i) parsing the code developed in step (a) to identify all operations,
      (ii) determining from an operation and all possible input states for that operation an average time value for execution of the operation by a target data processor, and storing said average time value,
      (iii) determining from the operation and all possible input states all possible output states for that operation,
      (iv) repeating steps (ii) and (iii) for each next operation, using the all possible output states determined in step (iii) as all possible input states, and
      (v) generating an output total average time which is a sum of all average times stored in step (ii); and
   wherein an operation is a delete operation, in which a label is deleted from a data structure, and wherein in case the label to be deleted is stored in a maximal element of the data structure or in a minimal element of the data structure, the label and the element at which it is stored can be outright deleted; wherein in case a label is not attached to a minimal or to a maximal element, then the label, throughout the remainder of the delete operation, will be regarded as the smallest label or the largest label of the data structure; and wherein the delete operation then performs a push-down operation or a push-up operation on the altered label until the label reaches a minimal element or a maximal element; wherein after that the label is restored to its original value at which it no longer is regarded as the smallest or largest label and the label and the maximal element or minimal element at which it is stored are deleted.

20. An automatic software code development system storing rules, and comprising functions for developing software code in a method of claim 1 according to said rules.

21. A The computer readable medium comprising software code for performing a method of claim 1 when executing on a digital processor.

\* \* \* \* \*